US009309714B2

(12) United States Patent
Nieminen et al.

(10) Patent No.: US 9,309,714 B2
(45) Date of Patent: Apr. 12, 2016

(54) ROTATING SPACER APPLICATOR FOR WINDOW ASSEMBLY

(71) Applicant: Guardian IGU, LLC, Avoca, WI (US)

(72) Inventors: Raimo T. Nieminen, Lempaala (FI); Eric B. Rapp, Avoca, WI (US)

(73) Assignee: GUARDIAN IG, LLC, Sun Prairie, WI (US)

( * ) Notice: Subject to any disclaimer, the term of this patent is extended or adjusted under 35 U.S.C. 154(b) by 376 days.

(21) Appl. No.: 13/657,660

(22) Filed: Oct. 22, 2012

(65) Prior Publication Data

US 2013/0047404 A1 Feb. 28, 2013

Related U.S. Application Data

(63) Continuation-in-part of application No. 12/270,215, filed on Nov. 13, 2008, now Pat. No. 8,596,024, and a continuation-in-part of application No. 13/157,866, filed on Jun. 10, 2011.

(Continued)

(51) Int. Cl.

| | |
|---|---|
| ***E06B 3/663*** | (2006.01) |
| ***E06B 3/673*** | (2006.01) |
| *B23P 11/00* | (2006.01) |
| *B23P 19/00* | (2006.01) |

(52) U.S. Cl.

CPC ......... *E06B 3/66323* (2013.01); *E06B 3/67313* (2013.01); *E06B 3/67326* (2013.01); *E06B 3/67373* (2013.01); *E06B 2003/66385* (2013.01); *Y10T 29/49826* (2015.01); *Y10T 29/53* (2015.01)

(58) Field of Classification Search

USPC ........... 156/99, 100, 101, 102, 103, 104, 105, 156/106, 107, 108, 109, 443, 446, 459, 468, 156/523, 574; 29/897.312, 464, 466, 468

See application file for complete search history.

(56) References Cited

U.S. PATENT DOCUMENTS

| | | | |
|---|---|---|---|
| 32,436 | A | 5/1861 | Scofield |
| 367,236 | A | 7/1887 | Eeinhaedt |
| 423,704 | A | 3/1890 | Simpson |
| 1,310,206 | A | 7/1919 | Mowat |
| 2,235,680 | A | 3/1941 | Haven et al. |
| 2,597,097 | A | 5/1952 | Haven |
| 2,618,819 | A | 11/1952 | Goodwillie |

(Continued)

FOREIGN PATENT DOCUMENTS

| | | |
|---|---|---|
| AT | 379860 | 3/1986 |
| CA | 1290624 | 10/1991 |

(Continued)

OTHER PUBLICATIONS

"Edgetech I.G., Super Spacer® Cushion Edge™, Decorative Glass, Foam Space . . . ", http://www.edgetechig.com/SuperSpacer/CushionEdge.aspx May 23, 2011, 1 page.

(Continued)

*Primary Examiner* — Essama Omgba

(74) *Attorney, Agent, or Firm* — Remarck Law Group PLC

(57) ABSTRACT

A spacer applicator assembly has tooling with a plurality of retention devices. An actuator is coupled to the tooling, where the actuator is adapted to continuously rotate the tooling about an axis in a first direction and the tooling is adapted to move in a direction that is generally parallel to the axis.

18 Claims, 54 Drawing Sheets

Related U.S. Application Data

(60) Provisional application No. 60/987,681, filed on Nov. 13, 2007, provisional application No. 61/049,593, filed on May 1, 2008, provisional application No. 61/049,599, filed on May 1, 2008, provisional application No. 61/038,803, filed on Mar. 24, 2008, provisional application No. 61/353,545, filed on Jun. 10, 2010, provisional application No. 61/424,545, filed on Dec. 17, 2010, provisional application No. 61/386,732, filed on Sep. 27, 2010.

(56) References Cited

U.S. PATENT DOCUMENTS 2,708,774 A 5/1955 Seelen
3,027,608 A 4/1962 Ryan
3,045,297 A 7/1962 Ljungdahl
3,143,009 A 8/1964 Pfeiffer
3,645,121 A 2/1972 Pfeiffer et al.
3,756,060 A 9/1973 Bindernagel
3,796,080 A 3/1974 Munchbach
3,839,137 A 10/1974 Davis et al.
3,921,359 A 11/1975 Brichard et al.
3,956,998 A 5/1976 Bavetz
3,981,111 A 9/1976 Berthagen
4,002,048 A 1/1977 Pozsgay
4,027,517 A 6/1977 Bodnar
4,057,944 A 11/1977 Wyatt, Jr. et al.
4,057,945 A 11/1977 Kessler
4,080,482 A 3/1978 Lacombe
4,098,722 A 7/1978 Cairns et al.
4,113,905 A 9/1978 Kessler
4,114,342 A 9/1978 Okawa
4,222,213 A 9/1980 Kessler
4,226,063 A 10/1980 Chenel
4,244,203 A 1/1981 Pryor et al.
4,382,375 A 5/1983 Yamamoto et al.
4,400,338 A 8/1983 Rundo
4,408,474 A 10/1983 Hutzenlaub et al.
4,431,691 A 2/1984 Greenlee
4,499,703 A 2/1985 Rundo
4,536,424 A 8/1985 Laurent
4,551,364 A 11/1985 Davies
4,561,929 A 12/1985 Lenhardt
4,567,710 A 2/1986 Reed
4,576,841 A 3/1986 Lingemann
4,580,428 A 4/1986 Brettbacher et al.
4,654,057 A 3/1987 Rhodes
4,658,553 A 4/1987 Shinagawa
4,716,686 A 1/1988 Lisec
4,719,728 A 1/1988 Eriksson et al.
4,720,950 A 1/1988 Bayer et al.
4,743,096 A 5/1988 Wakai et al.
4,743,336 A 5/1988 White
4,769,105 A * 9/1988 Lisec ............................ 156/468
4,780,164 A 10/1988 Rueckheim et al.
4,791,773 A 12/1988 Taylor
4,803,775 A 2/1989 Lisec
4,808,452 A 2/1989 McShane
4,815,245 A 3/1989 Gartner
4,831,799 A 5/1989 Glover et al.
4,835,130 A 5/1989 Box
4,835,926 A 6/1989 King
4,836,005 A 6/1989 Lisec
4,850,175 A 7/1989 Berdan
4,854,022 A 8/1989 Lisec
4,866,967 A 9/1989 Sporenberg et al.
4,885,926 A 12/1989 Lisec
4,886,095 A 12/1989 Lisec
4,886,410 A 12/1989 Lisec
4,949,666 A 8/1990 Lisec
5,052,164 A 10/1991 Sandow
5,079,054 A 1/1992 Davies
5,080,146 A 1/1992 Arasteh
5,087,489 A 2/1992 Lingemann
5,088,258 A 2/1992 Schield et al.
5,113,678 A 5/1992 Mannaka et al.
5,120,584 A 6/1992 Ohlenforst et al.
5,167,756 A 12/1992 Lenhardt
5,182,931 A 2/1993 Noe et al.
5,209,034 A 5/1993 Box et al.
5,254,377 A 10/1993 Lingemann
5,280,832 A 1/1994 Lisec
5,290,611 A 3/1994 Taylor
5,295,292 A 3/1994 Leopold
5,302,425 A 4/1994 Taylor
5,313,762 A 5/1994 Guillemet
5,361,476 A 11/1994 Leopold
5,377,473 A 1/1995 Narayan
5,391,416 A 2/1995 Kunert
5,394,671 A 3/1995 Taylor
5,394,725 A 3/1995 Lisec
5,413,156 A 5/1995 Lisec
5,439,716 A 8/1995 Larsen
5,441,779 A 8/1995 Lafond
5,443,871 A 8/1995 Lafond
5,461,840 A 10/1995 Taylor
5,485,709 A 1/1996 Guillemet
5,512,341 A 4/1996 Newby et al.
5,514,428 A 5/1996 Kunert
5,531,047 A 7/1996 Leopold et al.
5,553,440 A 9/1996 Bulger et al.
5,564,631 A 10/1996 Leopold
5,567,258 A 10/1996 Lee et al.
5,568,714 A 10/1996 Peterson
5,573,618 A 11/1996 Rueckheim
5,581,971 A 12/1996 Peterson
5,601,677 A 2/1997 Leopold
5,617,699 A 4/1997 Thompson
5,630,306 A 5/1997 Wylie
5,644,894 A 7/1997 Hudson
5,655,282 A 8/1997 Hodek et al.
5,658,645 A 8/1997 Lafond
5,675,944 A 10/1997 Kerr et al.
5,679,419 A 10/1997 Larsen
5,705,010 A 1/1998 Larsen
5,714,214 A 2/1998 Larsen
5,759,665 A 6/1998 Lafond
5,773,135 A 6/1998 Lafond
5,775,393 A 7/1998 Kovacik
5,813,191 A 9/1998 Gallagher
5,851,609 A 12/1998 Baratuci et al.
5,855,132 A 1/1999 Cozzi
5,873,256 A 2/1999 Denniston
5,879,764 A 3/1999 Chu et al.
5,888,341 A * 3/1999 Lafond ......................... 156/468
5,890,289 A 4/1999 Guillemet
6,035,602 A 3/2000 Lafond
6,079,242 A 6/2000 Allegro et al.
6,092,375 A 7/2000 Denniston
6,109,084 A 8/2000 Hutzenlaub et al.
6,115,989 A 9/2000 Boone et al.
6,131,364 A 10/2000 Peterson
6,148,890 A * 11/2000 Lafond ......................... 156/361
6,158,483 A 12/2000 Trpkovski
6,183,879 B1 2/2001 Deeley
6,197,129 B1 3/2001 Zhu
6,223,414 B1 5/2001 Hodek et al.
6,250,026 B1 6/2001 Thompson, Jr.
6,266,940 B1 7/2001 Reichert
6,289,641 B1 9/2001 McCandless
6,295,788 B2 10/2001 Reichert
6,345,485 B1 2/2002 Boone et al.
6,351,923 B1 3/2002 Peterson
6,355,328 B1 3/2002 Baratuci et al.
6,370,838 B1 4/2002 Evason et al.
6,415,561 B2 7/2002 Thompson, Jr.
6,477,812 B2 11/2002 Boone et al.
6,481,222 B1 11/2002 Denniston
6,488,996 B1 12/2002 Ino et al.
6,497,130 B2 12/2002 Nilsson
6,500,516 B2 12/2002 Bourlier
6,528,131 B1 3/2003 Lafond
6,581,341 B1 6/2003 Baratuci

(56) References Cited

U.S. PATENT DOCUMENTS

| | | | |
|---|---|---|---|
| 6,622,456 B2 | 9/2003 | Almasy | |
| 6,686,002 B2 | 2/2004 | Auerbach | |
| 6,715,244 B2 | 4/2004 | Boone et al. | |
| 6,796,102 B2 | 9/2004 | Virnelson et al. | |
| 6,823,644 B1 | 11/2004 | Peterson | |
| 6,877,292 B2 | 4/2005 | Baratuci et al. | |
| 6,887,292 B2 | 5/2005 | Thorwesten | |
| 7,008,492 B2 | 3/2006 | Lisec | |
| 7,107,729 B2 | 9/2006 | Baratuci et al. | |
| 7,132,151 B2 | 11/2006 | Rasmussen | |
| 7,275,570 B2 | 10/2007 | McGlinchy | |
| 7,347,909 B2 | 3/2008 | Reichert | |
| 7,357,169 B2 * | 4/2008 | Vianello et al. | 156/566 |
| 7,445,682 B2 | 11/2008 | James et al. | |
| 7,448,246 B2 | 11/2008 | Briese | |
| 7,523,776 B2 * | 4/2009 | Lisec | 156/468 |
| 7,827,761 B2 | 11/2010 | Buchanan et al. | |
| 7,856,791 B2 | 12/2010 | Rosskamp et al. | |
| 7,866,033 B2 | 1/2011 | James | |
| 7,901,526 B2 | 3/2011 | James | |
| 8,381,382 B2 | 2/2013 | Wunnicke et al. | |
| 8,397,780 B2 | 3/2013 | Vianello | |
| 8,474,400 B2 | 7/2013 | McGlinchy | |
| 8,586,193 B2 | 11/2013 | Rapp et al. | |
| 8,967,219 B2 * | 3/2015 | Nieminen | E06B 3/66323 156/443 |
| 9,187,949 B2 * | 11/2015 | Trpkovski | E06B 3/66309 |
| 2001/0015037 A1 | 8/2001 | Thompson | |
| 2001/0032436 A1 | 10/2001 | Riegelman | |
| 2003/0041557 A1 | 3/2003 | Trpkovski et al. | |
| 2003/0074859 A1 | 4/2003 | Reichert et al. | |
| 2003/0097818 A1 | 5/2003 | Almasy | |
| 2003/0101664 A1 | 6/2003 | Trpkovski | |
| 2003/0178127 A1 | 9/2003 | Lisec | |
| 2003/0230045 A1 | 12/2003 | Krause et al. | |
| 2005/0055901 A1 | 3/2005 | Valentz et al. | |
| 2005/0074566 A1 | 4/2005 | Rouanet et al. | |
| 2005/0166546 A1 | 8/2005 | Reichert | |
| 2005/0167028 A1 | 8/2005 | Reichert | |
| 2005/0178078 A1 | 8/2005 | Valentz et al. | |
| 2005/0227025 A1 | 10/2005 | Baratuci et al. | |
| 2006/0065345 A1 | 3/2006 | James et al. | |
| 2006/0076110 A1 * | 4/2006 | Lisec | 156/361 |
| 2006/0101739 A1 | 5/2006 | Baratuci et al. | |
| 2006/0105158 A1 | 5/2006 | Fritz et al. | |
| 2006/0130427 A1 | 6/2006 | Hodek et al. | |
| 2006/0201606 A1 | 9/2006 | Lisec | |
| 2007/0077376 A1 | 4/2007 | Mamiya et al. | |
| 2007/0087140 A1 | 4/2007 | Dierks | |
| 2007/0116907 A1 | 5/2007 | Landon et al. | |
| 2007/0131338 A1 | 6/2007 | Lisec | |
| 2007/0160781 A1 | 7/2007 | Landon et al. | |
| 2007/0178256 A1 | 8/2007 | Landon | |
| 2007/0178257 A1 | 8/2007 | Landon | |
| 2009/0120018 A1 | 5/2009 | Trpkovski | |
| 2009/0120019 A1 | 5/2009 | Trpkovski | |
| 2009/0120035 A1 | 5/2009 | Trpkovski | |
| 2009/0120036 A1 | 5/2009 | Trpkovski | |
| 2009/0123694 A1 | 5/2009 | Trpkovski | |
| 2009/0223150 A1 | 9/2009 | Baratuci et al. | |
| 2009/0301637 A1 | 12/2009 | Reichert | |
| 2010/0065580 A1 | 3/2010 | McGlinchy | |
| 2010/0200164 A1 | 8/2010 | Lisec | |
| 2010/0255224 A1 | 10/2010 | Gubbels et al. | |
| 2011/0104512 A1 | 5/2011 | Rapp et al. | |
| 2012/0011722 A1 | 1/2012 | Briese | |
| 2012/0151857 A1 | 6/2012 | Heikkila et al. | |
| 2012/0177827 A1 | 7/2012 | Trpkovski | |
| 2012/0266455 A1 | 10/2012 | Schuler et al. | |
| 2013/0042552 A1 | 2/2013 | Trpkovski | |

FOREIGN PATENT DOCUMENTS

| | | |
|---|---|---|
| CH | 630993 | 7/1982 |
| DE | 1 259 823 | 2/1968 |
| DE | 6903785 | 10/1969 |
| DE | 1 904 907 | 8/1970 |
| DE | 3529434 | 2/1986 |
| DE | 4101277 | 7/1992 |
| DE | 196 42 669 | 3/1998 |
| DE | 20200349 | 5/2003 |
| EP | 0054251 | 6/1982 |
| EP | 0056762 A | 7/1982 |
| EP | 0 139 262 | 5/1985 |
| EP | 0 268 886 | 6/1988 |
| EP | 0 403 058 | 12/1990 |
| EP | 0 500 483 | 8/1992 |
| EP | 2177703 | 4/2010 |
| FR | 2525314 | 10/1983 |
| FR | 2744165 | 8/1997 |
| GB | 1508778 | 4/1978 |
| GB | 1579726 | 11/1980 |
| GB | 2 181 773 | 4/1987 |
| GB | 2389138 | 12/2003 |
| WO | WO-03074830 | 9/2003 |
| WO | WO-2004009944 | 1/2004 |
| WO | WO-2009064905 | 5/2009 |
| WO | WO-2009064909 | 5/2009 |
| WO | WO-2009064915 | 5/2009 |
| WO | WO-2009064919 | 5/2009 |
| WO | WO-2009064921 | 5/2009 |
| WO | WO-2011008860 | 1/2011 |

OTHER PUBLICATIONS

International Search Report and Written Opinion mailed Jan. 22, 2009, International Application No. PCT/US2010/083441, corresponding to U.S. Appl. No. 12/270,289 (10 pages).

International Search Report and Written Opinion mailed Jan. 22, 2009, International Application No. PCT/US2010/083449, corresponding to U.S. Appl. No. 12/270,362 (8 pages).

International Search Report and Written Opinion mailed Jan. 22, 2009, International Application No. PCT/US2010/083435, corresponding to U.S. Appl. No. 12/270,393 (7 pages).

"Replacement Window Spacers: The Swiggle Spacer System", http://www.replacement-windows.com/spacers-swiggle-system.php (downloaded from web site Oct. 10, 2011) 2 pages.

"File History", for co-owned U.S. Appl. No. 12/270,362, entitled "Sealed Unit and Spacer with Stabilized Elongate Strip", filed Nov. 13, 2008 (190 pages).

"File History" for co-owned U.S. Appl. No. 12/270,393, Entitled "Material with Undulating Shape," filed Nov. 13, 2008 (203 pages).

"File History", for co-owned U.S. Appl. No. 12/270,289, Entitled "Reinforced Window Spacer," filed Nov. 13, 2008 (300 pages).

"Intercept® Spacer Technologies: Your Best Answer to Energy Star® and EN-1279, GED Integrated Solutions,", http://www.gedusa.com/intercept.php (Jun. 28, 2011 9:08:36 AM), 2 pages.

"International Search Report and Written Opinion", in co-pending Application PCT/US2011/039994, dated Nov. 17, 2011, (15 pages).

"PCT Notification Concerning Transmittal of International Preliminary Report on Patentability", from International Application No. PCT/US2008/083435, corresponding to U.S. Appl. No. 12/270,393, issued May 18, 2010, pp. 1-6.

"PCT Notification Concerning Transmittal of International Preliminary Report on Patentability", from International Application No. PCT/US2008/083441, corresponding to U.S. Appl. No. 12/270,289, issued May 18, 2010, pp. 1-8.

"PCT Notification Concerning Transmittal of International Preliminary Report on Patentability", from International Application No. PCT/US2008/083449, corresponding to U.S. Appl. No. 12/270,362, issued May 18, 2010, pp. 1-7.

"PCT Notification Concerning Transmittal of International Preliminary Report of Patentability", from International Application No. PCTIUS2011/039994, mailed Dec. 20, 2012, pp. 1-10.

Response to Communication pursuant to Rule 161(1) and Rule 162 EPC dated Feb. 19, 2013, from co-owned EP Patent Application 11727084.3 filed on Jun. 7, 2013 (15 pages).

* cited by examiner

ROTATING SPACER APPLICATOR FOR WINDOW ASSEMBLY

RELATED APPLICATIONS

This application is a continuation-in-part of U.S. Patent Application No. 12/270,215, filed Nov. 13, 2008, which claims priority to U.S. Provisional Application No. 60/987,681, filed on Nov. 13, 2007, titled "WINDOW ASSEMBLY AND WINDOW SPACER"; and to U.S. Provisional Application No. 61/049,593, filed on May 1, 2008, titled "WINDOW ASSEMBLY AND WINDOW SPACER"; and to U.S. Provisional Application No. 61/049,599, filed on May 1, 2008, titled "MANUFACTURE OF WINDOW ASSEMBLY AND WINDOW SPACER"; and to U.S. Provisional Application No. 61/038,803, filed on Mar. 24, 2008, titled "WINDOW ASSEMBLY AND WINDOW SPACER"; the disclosures of which are each hereby incorporated by reference in their entirety.

This application is related to the following U.S. patent applications: "TRIPLE PANE WINDOW SPACER, WINDOW ASSEMBLY AND METHODS FOR MANUFACTURING SAME", U.S. 2012/0151857, filed Dec. 15, 2011 Ser. No. 13/326,501; "SEALED UNIT AND SPACER", U.S. 2009/0120035, filed Nov. 13, 2008 Ser. No. 12/270,215; "BOX SPACER WITH SIDEWALLS", U.S. 2009/0120036, filed Nov. 13, 2008 Ser. No. 12/270,315; "REINFORCED WINDOW SPACER", U.S. 2009/0120019, filed Nov. 13, 2008 Ser. No. 12/270,289; "SEALED UNIT AND SPACER WITH STABILIZED ELONGATE STRIP", U.S. 2009/0120018, filed Nov. 13, 2008 Ser. No. 12/270,362; "MATERIAL WITH UNDULATING SHAPE" U.S. 2009/0123694, filed Nov. 13, 2008 Ser. No. 12/270,393; and "STRETCHED STRIPS FOR SPACER AND SEALED UNIT", U.S. 2011/0104512, filed Jul. 14, 2010 Ser. No. 12/836,350; "WINDOW SPACER, WINDOW ASSEMBLY AND METHODS FOR MANUFACTURING SAME", U.S. Provisional Patent Application Ser. No. 61/386,732, filed Sep. 27, 2010 "SPACER JOINT STRUCTURE", filed on the even date herewith Ser. No. 13/657,526; "ROTATING SPACER APPLICATOR FOR WINDOW ASSEMBLY", filed on the even date herewith Ser. No. 13/657,660; "SPACER HAVING A DESICCANT", filed on the even date herewith Ser. No. 61/716,861; "ASSEMBLY EQUIPMENT LINE AND METHOD FOR WINDOWS", filed on the even herewith Ser. No. 61/716,871; "TRIPLE PANE WINDOW SPACER HAVING A SUNKEN INTERMEDIATE PANE", filed on the even date herewith Ser. No. 61/716,915, which are all hereby incorporated by reference in their entirety.

SUMMARY

The technology disclosed herein generally relates to spacer applicator assembly that has tooling comprising a plurality of retention devices, where at least one of the retention devices is movable in a first direction. An actuator is coupled to the tooling, and is adapted to rotate the tooling about an axis. The tooling is adapted to move in a direction that is generally parallel to the axis. The retention devices can be spacer retention devices or pane retention devices.

In another implementation of the current technology, a spacer applicator has a rotatable mount configured to secure a pane. A spacer feed assembly is adjacent to the mount, where the feed assembly is configured to position and feed a spacer. A rotary actuator assembly is coupled to the mount and is configured to rotate the mount about an axis. The mount is further configured to be linearly actuated.

The technology disclosed herein also relates to a system for applying a spacer to a pane of a window assembly. A storage spool has a length of a spacer and a corner registration mechanism is adapted to score the spacer at defined locations. A filler station is adapted to insert a filler material into an interior region of the spacer and a sealant extruder adapted to apply sealant to first and second sides of the spacer. A cutter is adapted to cut the spacer to a desired length. A spacer applicator is adapted to automatically shape the spacer into a frame and assemble the spacer frame onto a pane.

One method disclosed herein relates to a method of applying a spacer to a pane, where a length of a spacer is received at a spacer applicator and an end portion of the spacer is engaged to one of a plurality of spacer retention devices. Tooling of the spacer applicator is rotated about an axis so that the spacer surrounds the plurality of spacer retention devices. The spacer applicator is moved in a direction that is generally parallel to the axis so that the spacer engages a surface of the first pane.

In an alternative method disclosed herein, a pane having an edge is secured to a mount, and the edge of the pane is adjacent a channel defined by a spacer. The mount is rotated, thereby rotating the pane and thereby wrapping the spacer around the edge of the pane.

In one embodiment of the current technology, a spacer applicator assembly has tooling with a plurality of spacer retention devices. An actuator is coupled to the tooling, where the actuator is adapted to continuously rotate the tooling about an axis in a first direction and the tooling is adapted to move in a direction that is generally parallel to the axis.

In yet another method of the current technology, a spacer length is shaped by rotating a tooling of the spacer applicator about an axis in a first direction so that a first spacer surrounds a portion of the tooling and then rotating the tooling of the spacer applicator about the axis in the first direction so that a second spacer surrounds a portion of tooling. "Unwinding" of the spacer applicator assembly is unnecessary.

In another method of shaping a spacer length, a spacer is fed to tooling on a rotatable mount. A portion of the tooling is actuated to translate the portion of the tooling and the mount is rotated, thereby wrapping the spacer around a portion of the tooling. The rotatable mount is configured to continuously rotate about an axis in one direction.

In yet another embodiment, a spacer applicator has a rotatable mount configured to secure a pane and a spacer feed assembly adjacent to the mount, configured to position and feed a spacer. A rotary actuator assembly is coupled to the mount and configured to rotate the mount about an axis, and the mount is further configured to be linearly actuated. One or more slip rings are disposed between a power source and the rotatable mount.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Window Assembly and Spacer Embodiments in FIGS. 1-5

Figure 1:
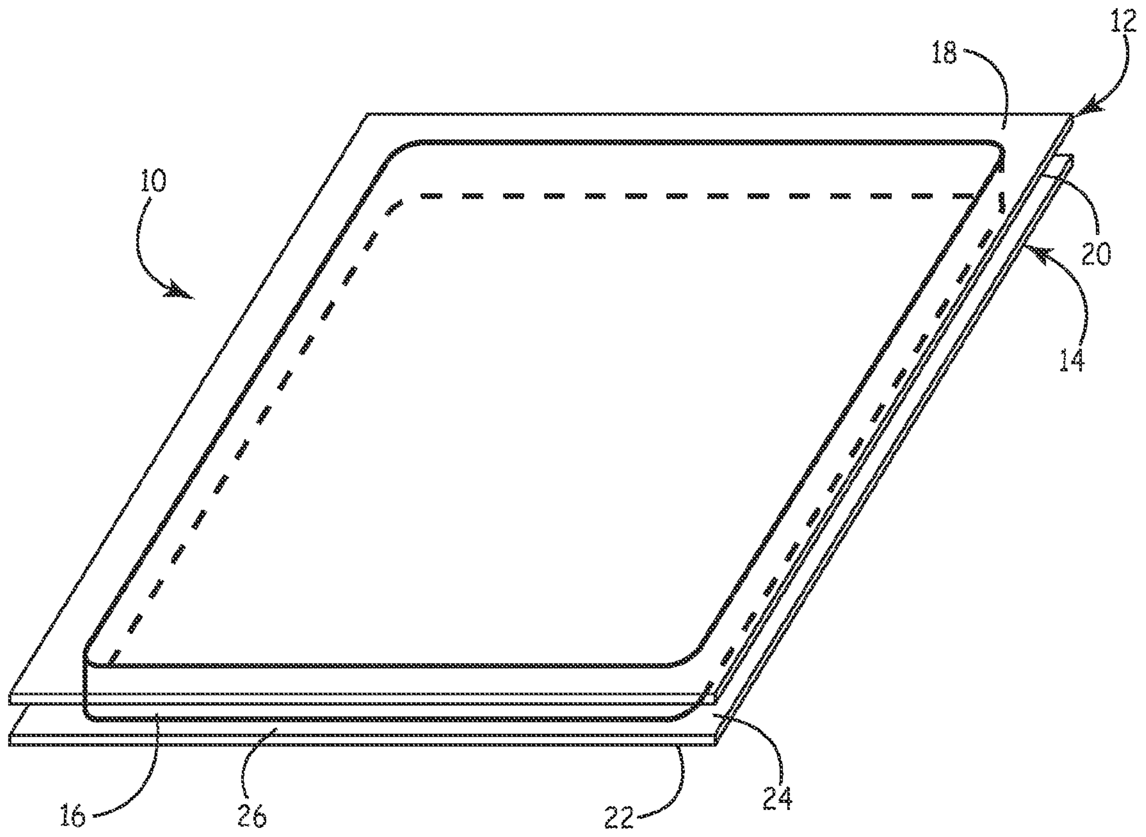
FIG. 1 is a perspective view of a window assembly.

Referring now to FIG. 1, a window assembly 10 is shown. The window assembly 10 includes a first pane 12, a second pane 14 and a spacer 16 disposed between the first and second panes 12, 14.

In the subject embodiment, the first and second panes 12, 14 are adapted to allow at least some light to pass through the panes 12, 14. The first and second panes 12, 14 are made of a translucent or transparent material. In the subject embodiment, the first and second panes 12, 14 are made of a glass material. In another embodiment, the first and second panes 12, 14 are made of a plastic material.

Figure 2:
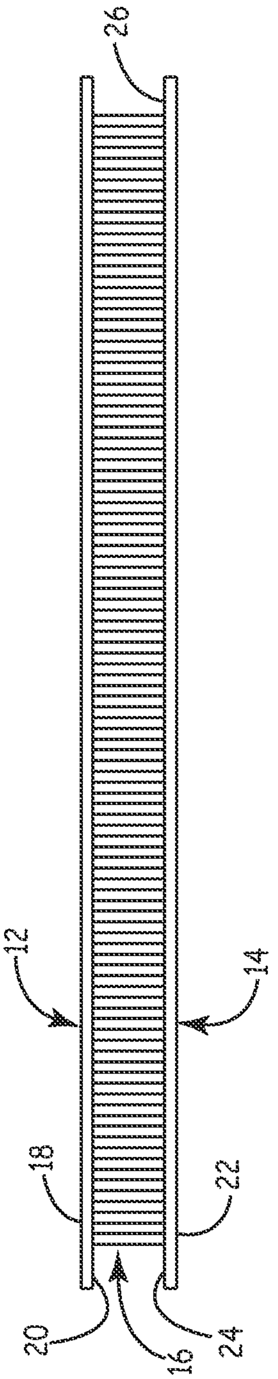
FIG. 2 is a side view of the window assembly of FIG. 1.

Referring now to FIG. 2, the first pane 12 includes a first surface 18 and an oppositely disposed second surface 20. The second pane 14 includes a first surface 22 and an oppositely disposed second surface 24.

The spacer 16 is disposed between the first and second panes 12, 14 to keep the first and second panes 12, 14 spaced apart from each other. The spacer 16 is adapted to withstand compressive forces applied to the first and second panes 12, 14 and/or to maintain a desired space between the first and second panes 12, 14.

The spacer 16 is sealingly engaged to each of the first and second panes 12, 14 at an edge portion 26 of each of the first and second panes 12, 14. In the depicted embodiment, the spacer 16 is sealingly engaged to the second surface 20 of the first pane 12 and the second surface 24 of the second pane 14.

Figure 3:
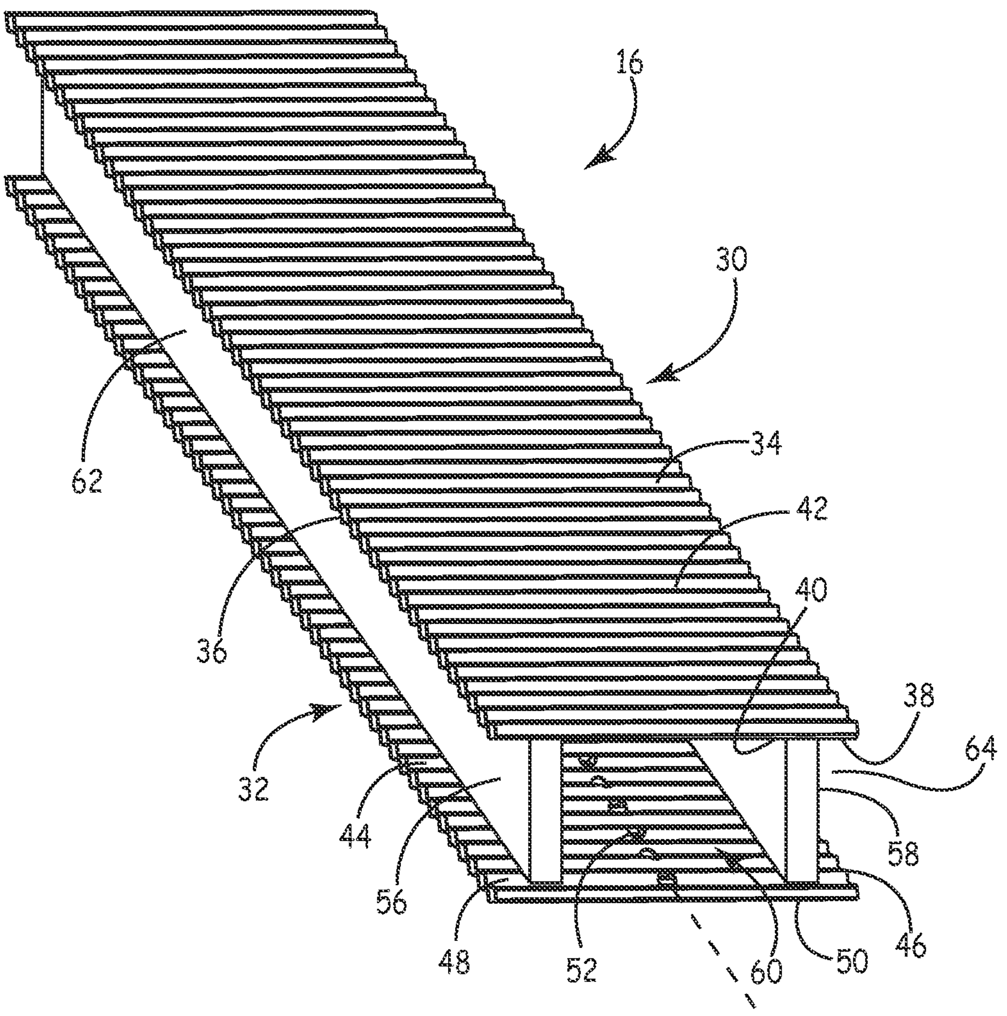
FIG. 3 is a perspective view of a spacer suitable for use with the window assembly of FIG. 1.

Referring now to FIG. 3, the spacer 16 is shown. A spacer suitable for use with the window assembly 10 has been described in U.S. Patent Application Publication No. 2009/0120036 and U.S. Patent Application Publication Nos. 2009-0120035, the disclosures of which is hereby incorporated by reference in its entirety.

The spacer 16 includes a first strip 30 of material and a second strip 32 of material. The first and second strips 30, 32 are generally flexible in both bending and torsion. In some embodiments, bending flexibility allows the spacer 16 to be bent to form non-linear shapes (e.g., curves). Bending and torsional flexibility also allows for ease of window manufacturing. Such flexibility includes either elastic or plastic deformation such that the first and second strips 30, 32 do not fracture during installation into window assembly 10. Some embodiments of spacer 16 include strips that do not have substantial flexibility, but rather are substantially rigid. In some embodiments, the first and second strips 30, 32 are flexible, but the resulting spacer 16 is substantially rigid.

In one embodiment, the first and second strips 30, 32 are formed from a metal material or a plastic material. In the depicted embodiment, each of the first and second strips 30, 32 has a plurality of undulations 34. In one embodiment, the undulations 34 are arcuate in shape. In another embodiment, the undulations 34 have one of a sinusoidal, square, rectangular, triangular or other shape.

In one embodiment, the undulations 34 are adapted to provide flexibility to the first and second strips 30, 32. In another embodiment, the undulations 34 are adapted to resist permanent deformation (e.g., kinks, fractures, etc.). In another embodiment, the undulations 34 may also increase the structural stability of the first and second strips 30, 32 and improve the ability of the spacer 16 to withstand compressive and torsional loads.

The first strip 30 includes a first side portion 36 and an oppositely disposed second side portion 38. The first strip 30 further includes a first surface 40 and an oppositely disposed second surface 42.

The second strip 32 includes a first side portion 44 and an oppositely disposed second side portion 46. The second strip 32 further includes a first surface 48 and an oppositely disposed second surface 50.

The second strip 32 includes a plurality of passages 52 that extend through the first and second surfaces 48, 50 of the second strip 32. In the depicted embodiment, the passages 52 are generally aligned along a central longitudinal axis 54 of the second strip 32. Other embodiments include other arrangements of passages 52, such as multiple rows of passages 52. Passages can be openings or apertures of any shape including slits, circular apertures, or the like.

The spacer 16 includes a first sidewall 56 and a second sidewall 58. The first and second sidewalls 56, 58 extend between the first strip 30 and the second strip 32. In the depicted embodiment, the first sidewall 56 is engaged to the first side portion 36 on the first surface 40 of the first strip 30 and the first side portion 44 on the first surface 48 of the second strip 32. In one embodiment, the first and second sidewalls 56, 58 extend the length of the first and second strips 30, 32.

Each of the first and second elongate strips 30, 32 includes a first elongate edge and a second elongate edge. The first elongate edge is at the edge of the first side portion 36, 44 of each strip and the second elongate edge is at the edge of the second side portion 38, 46 of each strip. The first extruded sidewall 56 is closer to the first side portion 36, 44 of each strip 30, 32 than to the second side portion 38, 46 of each strip 30, 32. The first sidewall 56 is offset from the first edge of the first elongate strip 30 and from the first edge of the second elongate strip 32 by a first offset distance. The second extruded sidewall 58 is closer to the second side portion 38, 46 of each strip 30, 32 than to the first side portion 36, 44 of each strip 30, 32. The second sidewall 58 is offset from the second edge of the first elongate strip and from the second edge of the second elongate strip by a second offset distance that will be substantially similar to the first offset distance.

In one embodiment, the first and second sidewalls 56, 58 are manufactured from a plastic material. The plastic material can be extruded, rolled or molded to form the first and second sidewall 56, 58.

The first and second strips 30, 32 and the first and second sidewalls 56, 58 cooperatively define an interior region 60 of the spacer 16. In one embodiment, a filler material is added to the interior region 60. An exemplary filler material that may be added to the interior region 60 is a desiccant material. In the event that moisture is disposed between the first and second panes 12, 14, the moisture passes through the passages 52 of the second strip 32 and is absorbed by the desiccant material in the interior region 60 of the spacer 16.

The first side portion 36 of the first strip 30, the first sidewall 56 and the first side portion 44 of the second strip 32 cooperatively define a first side 62 of the spacer 16. The second side portion 38 of the first strip 30, the second sidewall 58 and the second side portion 46 of the second strip 32 cooperatively define a second side 64 of the spacer 16. The interior region 60 is disposed between the first and second sides 62, 64 of the spacer 16.

Figure 4:
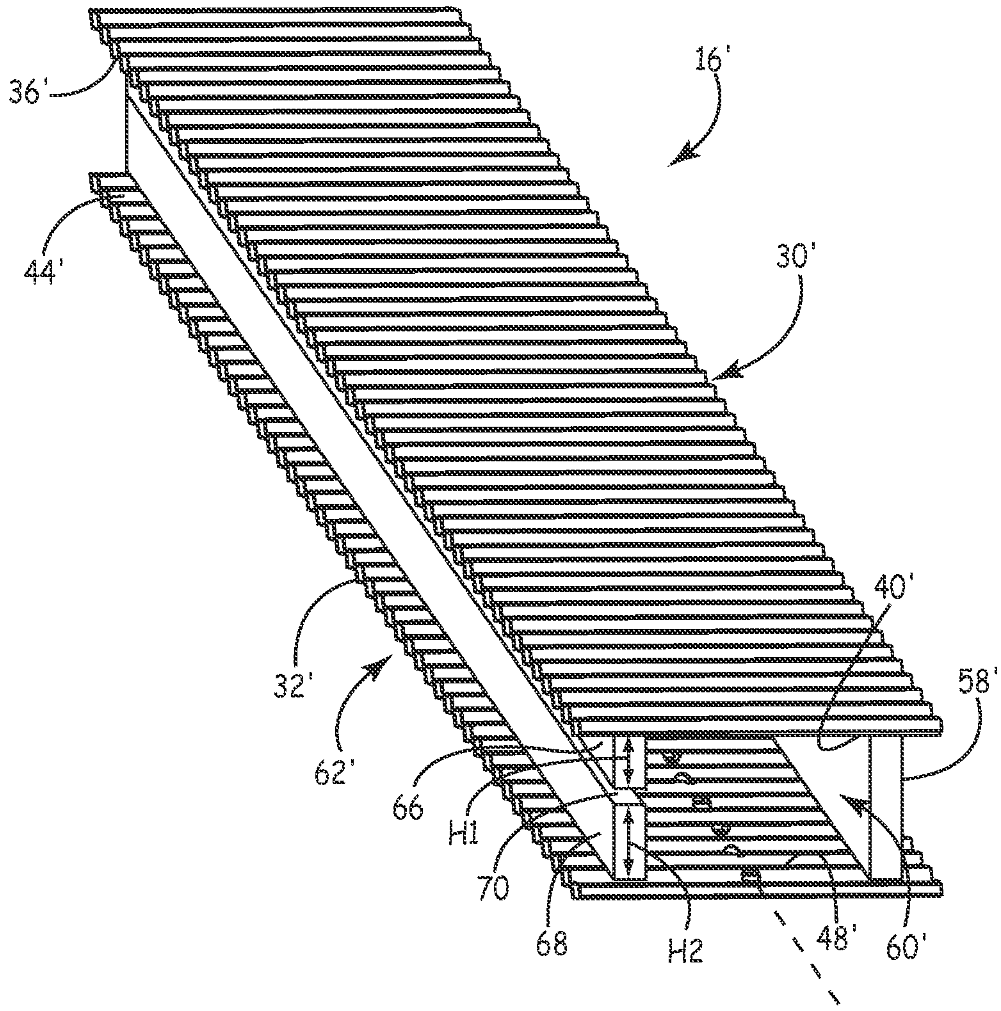
FIG. 4 is a perspective view of an alternate embodiment of a spacer suitable for use with the window assembly of FIG. 1.

Referring now to FIG. 4, an alternate embodiment of a spacer 16' is shown. The spacer 16' is similar to the previously described spacer 16. Features of the spacer 16' that are similar to features of the previously described spacer 16 have the same reference numeral with the addition of apostrophes or prime designations ('). As these features were previously described, these features will not be described further. New features of the spacer 16' have reference numerals higher than 64.

The spacer 16' includes first and second strips 30', 32', a first sidewall assembly 65 and a second sidewall 58'. In the depicted embodiment, the first and second strips 30', 32' and the second sidewall 58' are similar to the ones described above.

The first sidewall assembly 65 includes a first wall 66 and a second wall 68. In one embodiment, a height H1 of the first wall 66 is about equal to a height H2 of the second wall 68. In another embodiment, the height H1 of the first wall 66 is greater than the height H2 of the second wall 68. In another embodiment, the height H2 of the second wall 68 is greater than the height H1 of the first wall 66.

The first wall 66 is engaged to the first strip 30' while the second wall 68 is engaged to the second strip 32'. In the depicted embodiment, the first wall 66 is engaged to a first side portion 36' on a first surface 40' of the first strip 30' while the second wall 68 is engaged to a first side portion 44' on a first surface 48' of the second strip 32'.

Figure 5:
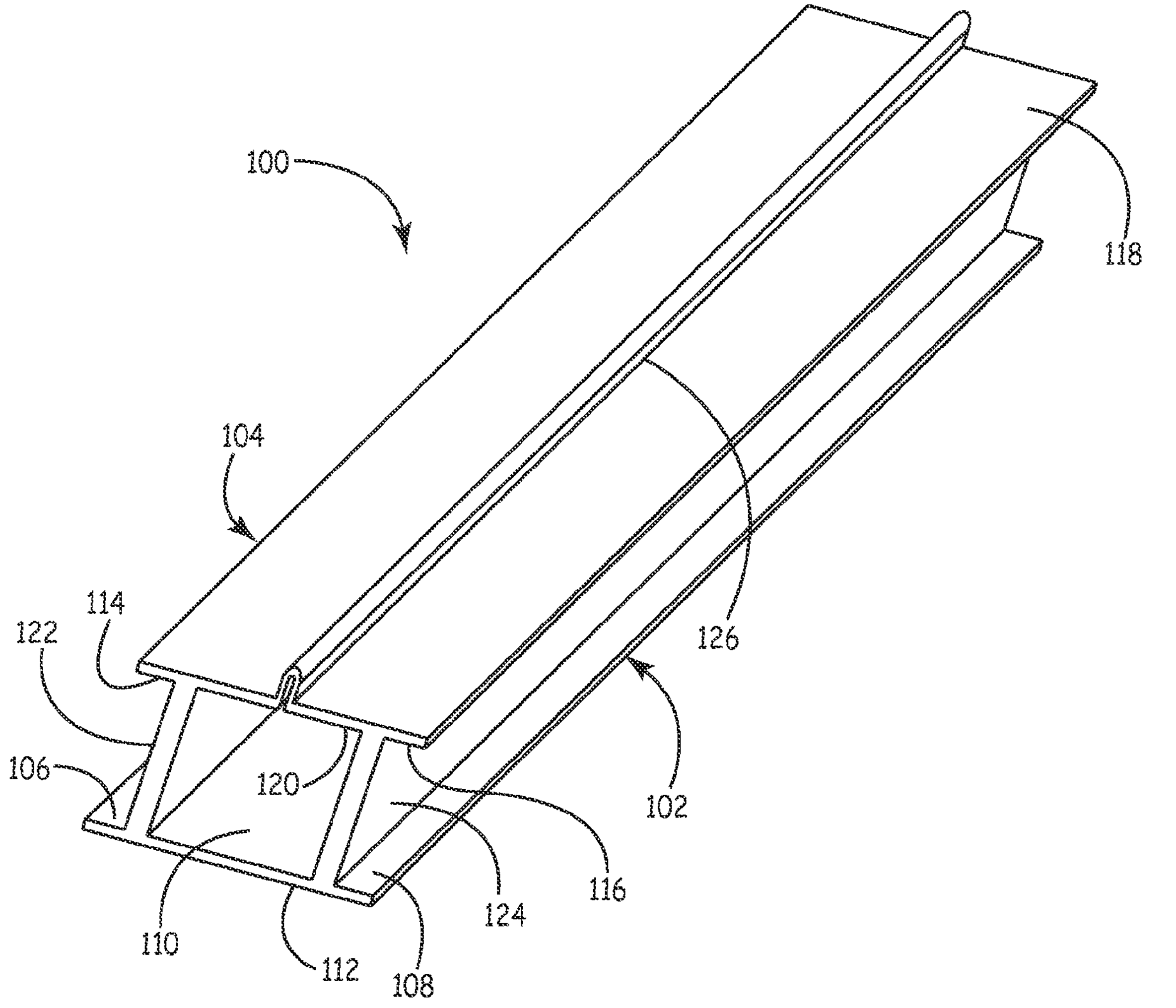
FIG. 5 is a perspective view of an alternate embodiment of a spacer suitable for use with the window assembly of FIG. 1.

The first and second walls 66, 68 define a channel 70 that extends through the first sidewall assembly 65 The channel 70 separates the first and second walls 66, 68 of the first sidewall assembly 65 so that a first side 62' of the spacer 16' is open to an interior region 60' through the channel 70. In the depicted embodiment, the channel 70 extends the length of the spacer 16'. In the embodiment shown, the channel 70 is centrally disposed between the first and second strips 30', 32'. In another embodiment, the channel 70 is disposed closer to the first strip 30' than the second strip 32'. In one embodiment, the channel 70 is potentially advantageous as it allows for greater flexibility of the spacer 16' in bending and torsion as compared to the spacer 16. In another embodiment, the channel 70 is potentially advantageous as it allows for insertion of a filler into the interior region 60' of the spacer 16'. Referring now to FIG. 5, an alternate embodiment of a spacer 100 is shown. The spacer 100 includes a first strip 102 and a second strip 104. In one embodiment, the first and second strips 102, 104 are made from a material consisting of metal, plastic and combinations thereof. In one embodiment, the first and second strips include a plurality of undulations (not shown in FIG. 5) similar to those shown in FIG. 3.

The first strip 102 includes a first side portion 106 and an oppositely disposed second side portion 108. The first strip 102 further includes a first surface 110 and an oppositely disposed second surface 112.

The second strip 104 includes a first side portion 114 and an oppositely disposed second side portion 116. The second strip 104 further includes a first surface 118 and an oppositely disposed second surface 120. Similar to the spacer embodiments described above, the first and second strips 102, 104 can define undulations.

The spacer 100 includes a first sidewall 122 and a second sidewall 124. Each of the first and second sidewalls 122, 124 can be made of one or more pieces. The first and second sidewalls 122, 124 extend between the first strip 102 and the second strip 104. In the depicted embodiment, the first sidewall 122 is engaged to the first side portion 106 on the first surface 110 of the first strip 102 and the first side portion 114 on the second surface 120 of the second strip 104. In one embodiment, the first and second sidewalls 122, 124 extend the length of the first and second strips 102, 104.

The second strip 104 of the spacer 100 includes an alignment member 126. The alignment member 126 extends outwardly from the first surface 118 of the second strip 104. In the depicted embodiment, the alignment member 126 is centrally disposed on the second strip 104 and extends the length of the second strip 104. In one embodiment, the alignment member 126 is integrally formed from the second strip 104. In another embodiment, the alignment member 126 is a separate component that is engaged to the second strip 104. Many additional spacer embodiments can be used with the system described herein, including spacers constructed of foam, for example.

Figure 6:
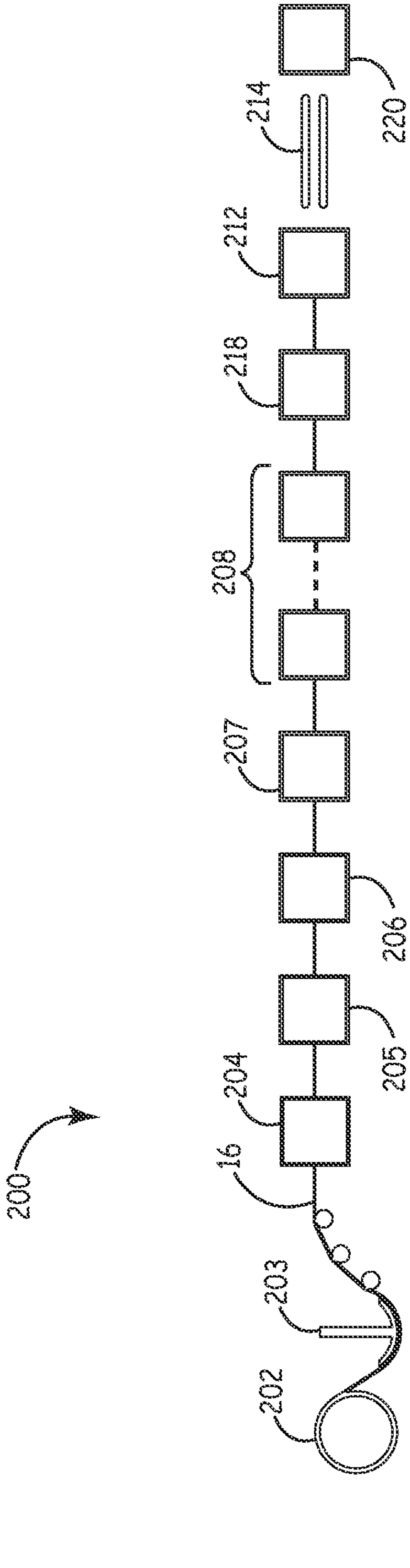
FIG. 6 is a schematic representation of a system for applying the spacer to a window pane.
Figure 7:
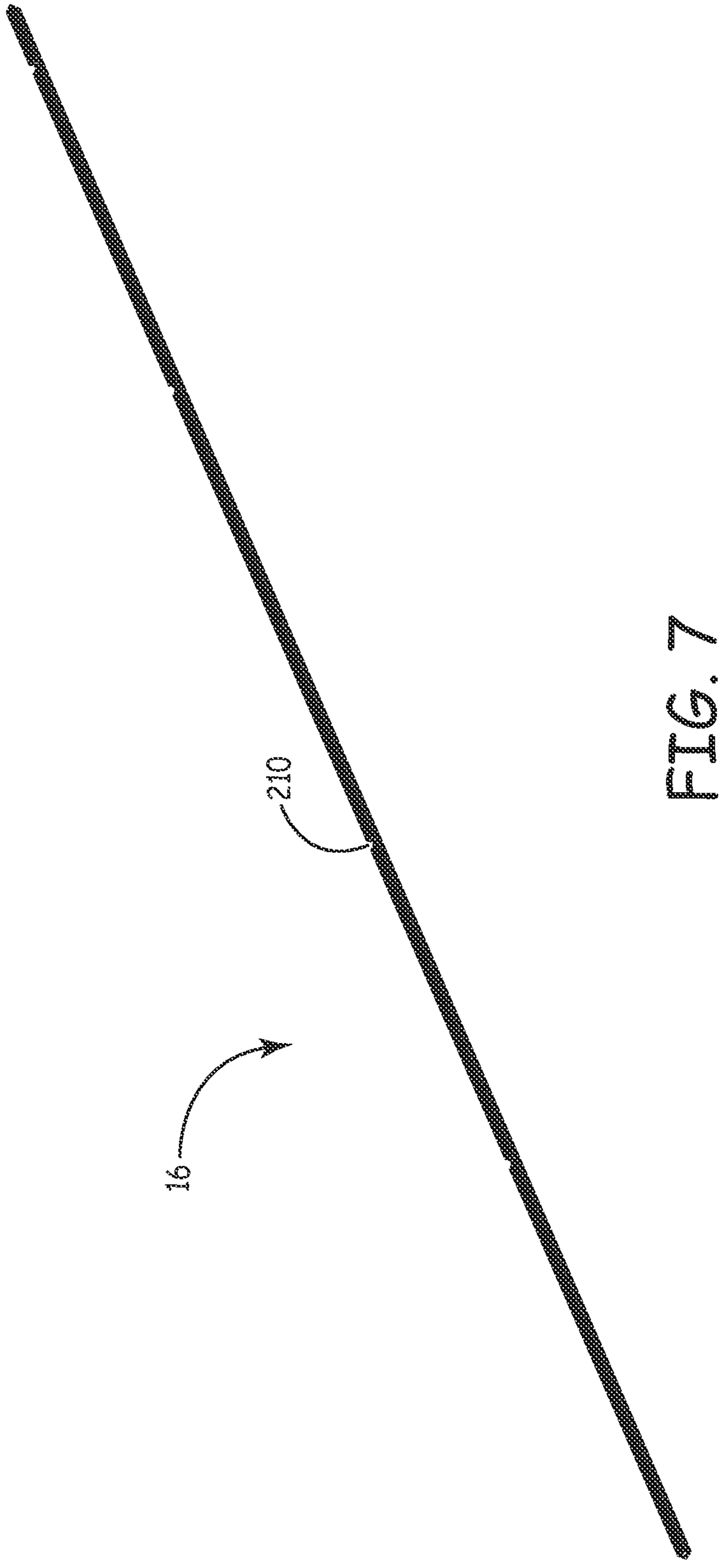
FIG. 7 is a perspective view of the spacer having a plurality of notches.
Figure 8:
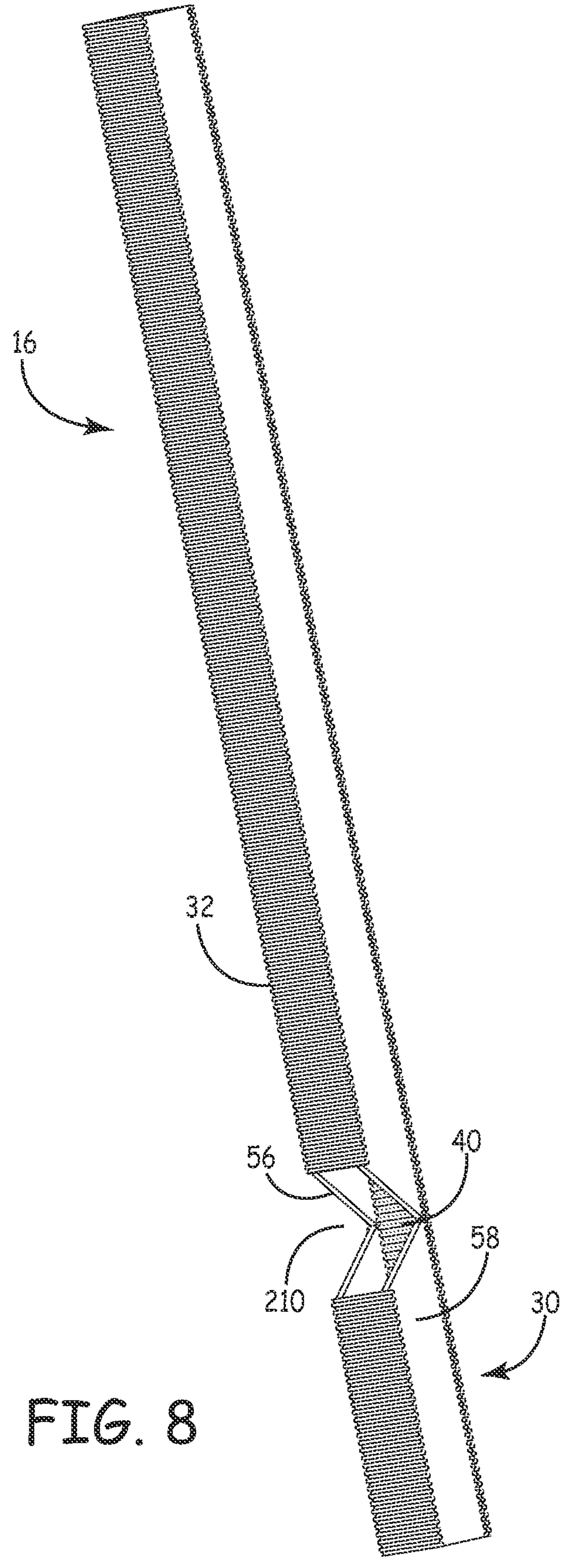
FIG. 8 is an enlarged perspective view of the spacer of FIG. 7.

System Description FIGS. 6-8

Referring now to FIG. 6, a system 200 for applying a spacer 16, such as that depicted in FIG. 3, to one of the first and second panes 12, 14 of the window assembly 10 is shown. The system 200 is adapted to prepare and apply the spacer 16 to the first and second panes 12, 14 of the window assembly 10. In one embodiment, the process of preparing and applying the spacer 16 to the first and second panes 12, 14 takes less than about 15 seconds per window assembly 10. In another embodiment, the process takes between about 8 to 15 seconds. In one embodiment, the process is electronically controlled and does not require much manual interaction.

In system 200, the spacer 16 is coiled on a storage spool 202. In one embodiment, the spacer 16 is continuously wrapped about the storage spool 202.

In the depicted embodiment, the spacer 16 from the storage spool 202 is fed through a tensioner 203, such as a dancer component, into a heater 204. The heater 204 applies heat to the spacer 16 as the spacer 16 is uncoiled from the storage spool 202. In one embodiment, the heat supplied by the heater 204 is at a temperature that is adapted to remove any arcuate shape (e.g., memory) from the spacer 16 resulting from the spacer 16 being stored on the storage spool 202.

From the heater 204, the spacer 16 is passed through a slitting station 205, where channels 70 (See FIG. 4) are introduced to the structure of the first side 62' of the spacer 16', as described in the discussion of FIG. 4, above. Those having skill in the art will appreciate that a variety of approaches can be used to form channels 70 in a side of the spacer 16'.

The system 200 also includes a filler station 206. The filler station 206 is adapted to insert a filler material into the interior region 60 of the spacer 16, such as the spacer of FIG. 3. In one embodiment, the filler material is inserted through the channel 70 of the spacer 16' of FIG. 4. In one embodiment, the filler material includes at least a desiccant material, such as a matrix desiccant. In another embodiment, the spacer on the spool already has a filler material. In such embodiments, the filler is inserted into the spacer during manufacture of the spacer, for example.

The spacer 16 can be fed into a welding station 207 in some embodiments of the system that also incorporate a slitting station 205. The welding station 207 is configured to re-seal a channel 70 in the sidewall of the spacer 16'. In some examples, the welding station includes ultrasonic or micro-torch devices.

The spacer 16 is fed into one or more corner registration mechanism stations 208. Each corner registration mechanism 208 is adapted to score the spacer 16 at a defined location. In the subject embodiment, the corner registration mechanism 208 is adapted to cut notches 210 (shown in FIGS. 7 and 8) into the spacer 16 at given intervals. The intervals between the adjacent notches 210 are chosen based on the dimensions of the first pane 12 or the second pane 14. As the spacer 16 is fed through the corner registration mechanism 208, the length of the spacer 16 is calculated, monitored or measured. At predetermined intervals, the notches 210 are cut by the corner registration mechanism 208.

In the depicted embodiment of FIGS. 7 and 8, the notches 210 are generally V-shaped. Each notch 210 extends through the second strip 32, the first and second sidewalls 56, 58 and at least partially through the first surface 40 of the first strip 30. In the depicted embodiment, the notch 210 defines an angle that is about 90 degrees, although the angle of the corner notch 210 can have different measurements depending on the desired angle measurement of the resultant corner in the formed spacer frame. In one embodiment, the filler material is inserted into the interior region 60 of the spacer 16 at the notches 210. In such an embodiment, the filler station is positioned to act on the spacer after the corner registration mechanism.

The system 200 includes a cutter 218. The cutter 218 cuts the spacer 16 to a desired length. In one embodiment, the cutter 218 cuts through the spacer 16 so that the first and second strips 30, 32 are generally equal in length. In other embodiments, the cutter 218 cuts through the spacer 16 so that the length of the first strip 30 is greater than the lengths of the second strip 32 and the first and second sidewalls 56, 58 (See FIG. 3).

Referring again to FIG. 6, the system 200 further includes a sealant extruder 212. The sealant extruder 212 is adapted to apply a sealant to the spacer 16 at the first and second sides 62, 64 of the spacer 16. In some embodiments the spacer 16 can pass through the sealant extruder 212 before passing through the cutter 218. The sealant is formed of a material that has adhesive properties. The sealant is adapted to fasten the spacer 16 to the first and second panes 12, 14 of the window assembly 10. In one embodiment, the sealant is adapted to seal the joint formed between the spacer 16 and the first and second panes 12, 14 so that gas and liquid are inhibited from entering the space defined between the first and second panes 12, 14. Sealants suitable for use with the window assembly include polyisobutylene (PIB), butyl, curable PIB, hot melt silicon, acrylic adhesive, acrylic sealant, and other Dual Seal Equivalent (DSE) type materials.

Referring to FIG. 3, the sealant is applied to the first side 62 of the spacer 16 so that the sealant overfills the first side 62, which is defined by the first side portion 36 of the first strip 30, the first sidewall 56 and the first side portion 44 of the second strip 32. The sealant is similarly applied to the second side 64 of the spacer 16 so that the sealant overfills the second side 64.

The sealant used typically has a curing time of less than about five minutes. In another embodiment the sealant used typically has a curing time of two hours. Conventional processes require the sealant to be reheated before applying to the window panes. The present process, however, does not require the sealant to be reheated because the sealant is applied just before the spacer is applied to the pane.

Referring back to FIG. 6, the system 200 further includes a storage area 214. The storage area 214 is adapted to accumulate one or more cut lengths of spacers 16 for a temporary time period. In some embodiments, the storage area 214 is a conveyor surface area that stores a plurality of the spacer 16 segments (after having been cut) in a linear fashion on a surface. In at least one of those embodiments, the storage area 214 has two or more stacked conveyor surfaces that each store a plurality of the spacers 16 segments in a linear fashion. Such conveyor surfaces can also convey the spacer 16 segments towards additional system 200 components such as a spacer applicator assembly 220. In one embodiment, the conveyor system has an elevator configured to move spacer segments up and down in relation to a conveyor top surface.

In some embodiments, it can be desirable to temporarily store the spacer before it is cut into discrete segments. In such an embodiment the storage area 214 can include a plurality of rollers and can be positioned between any adjacent pairs of stations in the system 200. In such an example embodiment, the spacer 16 is woven through the storage rollers. The greater distance between the rollers, the greater the length of spacer 16 disposed in the storage area 214.

Spacer Applicator Assembly

Figure 9:
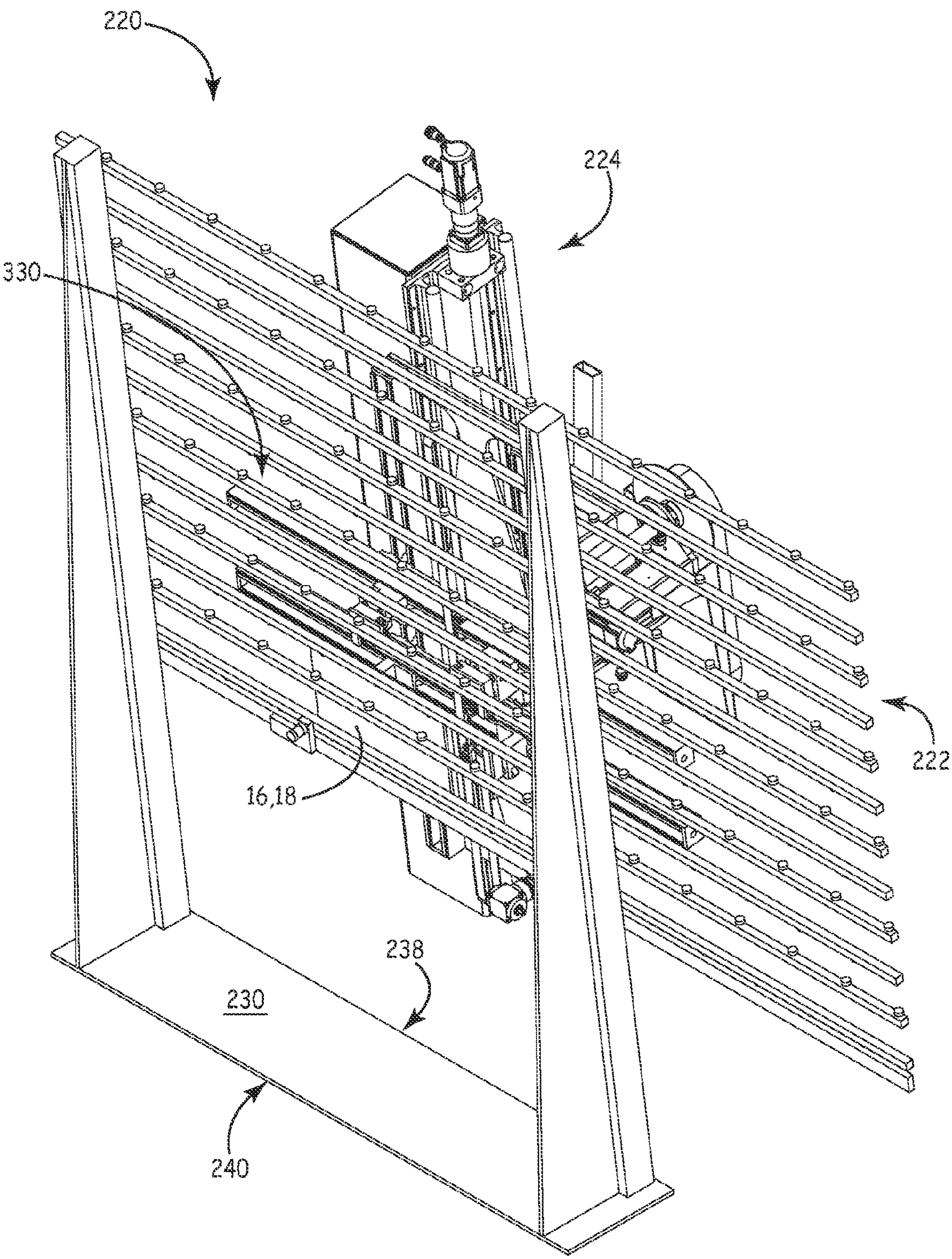
FIG. 9 is a perspective view of a spacer applicator assembly.

Referring now to FIGS. 6 and 9, the desired length of spacer 16 is applied to one of the first and second panes 12, 14 by a spacer applicator assembly 220. In the depicted embodiment, the spacer applicator assembly 220 includes a stand assembly 222 and a spacer applicator 224, which comprises the "tooling" 330 of the spacer applicator assembly 220 (See FIG. 9, for example).

Stand Assembly

Figure 10:
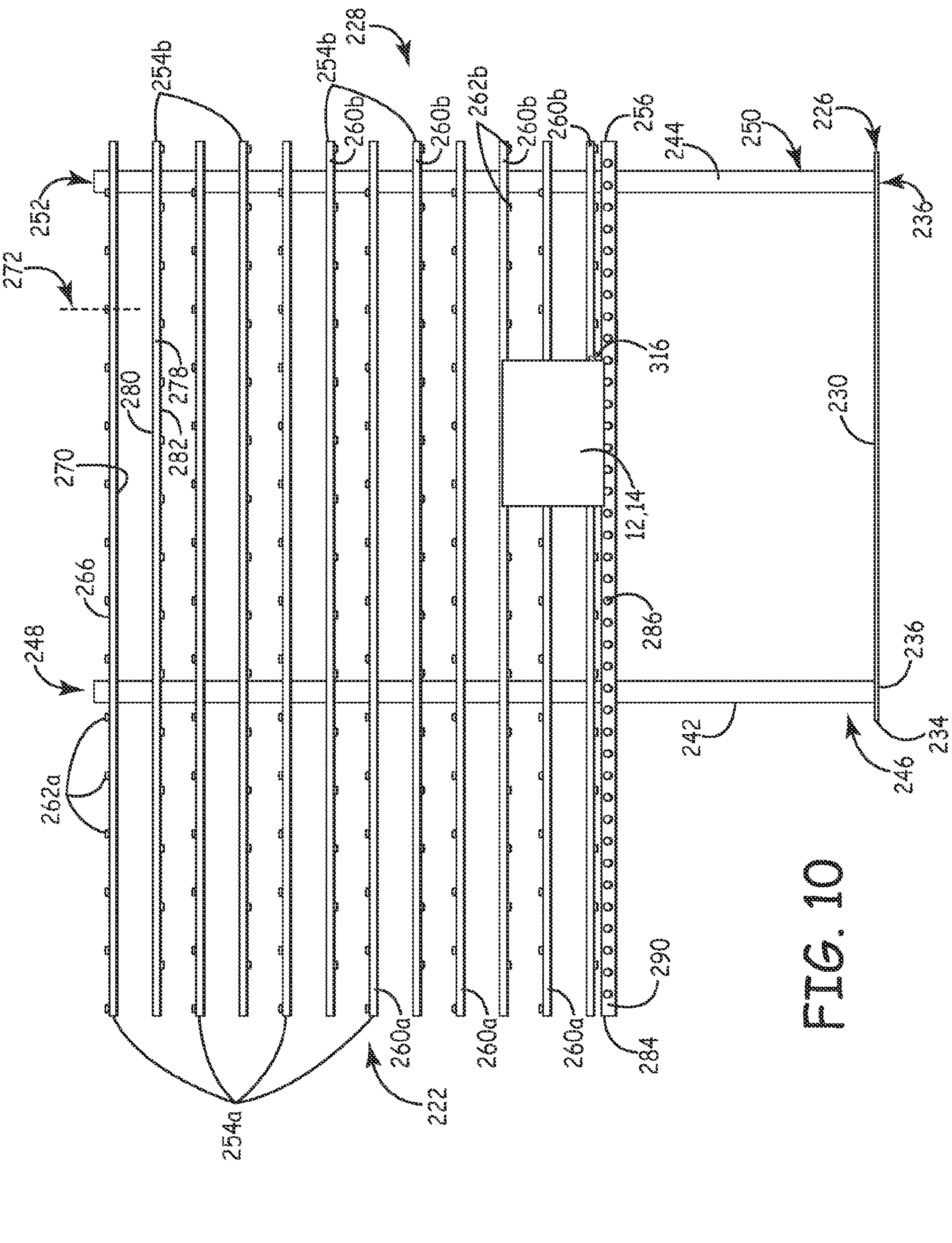
FIG. 10 is a perspective view of a stand assembly suitable for use with the spacer applicator assembly of FIG. 9.
Figure 11:
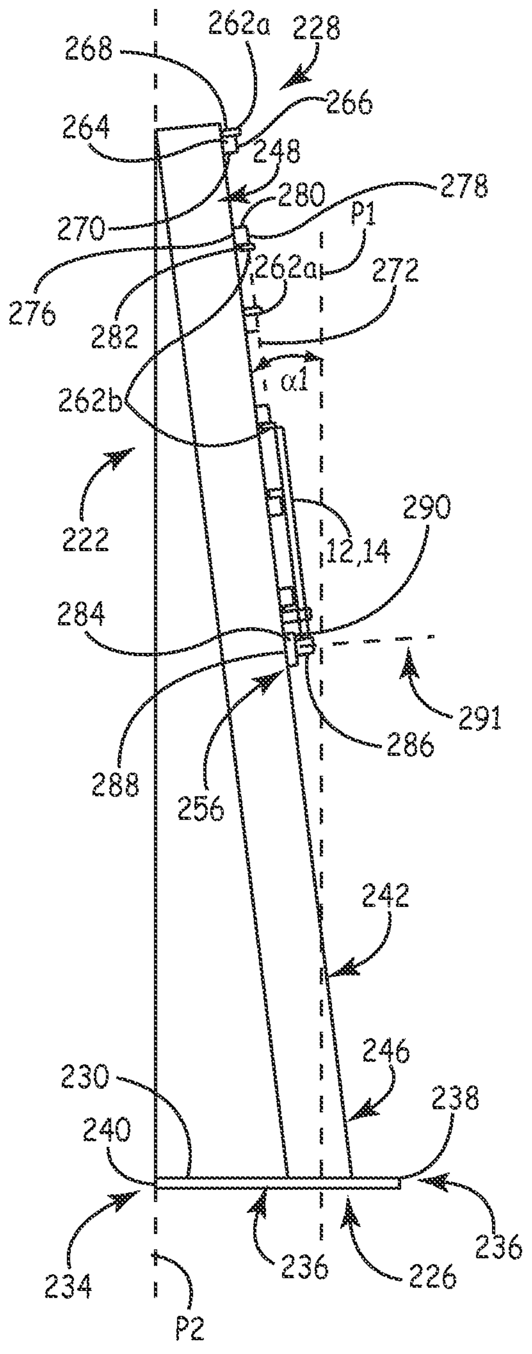
FIG. 11 is a side view of the stand assembly of FIG. 10.

Referring now to FIGS. 10 and 11, the stand assembly 222 is shown. The stand assembly 222 is adapted to receive one of the first and second panes 12, 14 of the window assembly 10. The first or second pane 12, 14 is positioned on the stand assembly 222 so that the spacer can be applied to the first or second pane 12, 14. The stand assembly 222 includes a base 226 and a panel support 228.

The base 226 includes a first surface 230 and an oppositely disposed second surface 232. The base 226 includes a first end 234, an oppositely disposed second end 236, a first side 238 and an oppositely disposed second side 240 (See also FIG. 9). The first and second sides 238, 240 extend between the first and second ends 234, 236. In the depicted embodiment, the base 226 is generally rectangular in shape.

A first support 242 and a second support 244 extend outwardly from the first surface 230 of the base 226. The first support 242 includes a first axial end 246 and an oppositely disposed second axial end 248. The second support 244 includes a first axial end 250 and an oppositely disposed second axial end 252. The first axial ends 246, 250 of the first and second supports 242, 244 are engaged (e.g., fastened, bolted, welded, screwed, etc.) to the first surface 230 of the base 226. The first axial end 246 of the first support 242 is disposed adjacent to the first end 234 of the base 226 while the first axial end 250 of the second support 244 is disposed adjacent to the second end 236 of the base 226.

In the depicted embodiment, the first and second supports 242, 244 extend outwardly from the first surface 230 at a first angle $\alpha 1$ with respect to a first plane P1 (shown as a dashed line in FIG. 11) that extends through the first axial ends 246, 250 of the first and second supports 242, 244 and is generally perpendicular to the base 226. In the depicted embodiment, the first and second supports 242, 244 are angled toward a second plane P2 (shown as a dashed line in FIG. 11) that is generally perpendicular to the base 226 and adjacent to the second side 240 of the base 226.

Generally, the first angle $\alpha 1$ ranges from about 0 degrees, at which the stand assembly 222 is substantially vertical, to about 90 degrees, at which the stand assembly 222 is substantially horizontal. In at least one embodiment the angle $\alpha 1$ is about 0 degrees. In another embodiment, the first angle $\alpha 1$ is in the range of about 1 degree to about 40 degrees. In another embodiment, the first angle $\alpha 1$ is in the range of about 10 degrees to about 30 degrees. In another embodiment, the first angle $\alpha 1$ is in the range of about 15 degree to about 25 degrees. In yet another embodiment, the first angle $\alpha 1$ ranged from about 40 degrees to about 50 degrees. In some embodiments, the first angle $\alpha 1$ is about 90 degrees. The panel support 228 is engaged to the first and second supports 242, 244 at a location that is adjacent to the second axial ends 248, 252 of the first and second supports 242, 244. The panel support 228 includes a first plurality of rail assemblies 254*a*, a second plurality of rail assemblies 254*b*, and a bottom roller assembly 256.

Referring particularly to FIG. 10, the first and second pluralities of rail assemblies 254*a*, 254*b* are alternately mounted on the first and second supports 242, 244. The first plurality of rail assemblies 254*a* includes a first plurality of rails 260*a* and a first plurality of rollers 262*a*. In the depicted embodiment, each of the rails 260*a* has a generally rectangle cross-section. Each rail 260*a* includes a first side 264 (visible in FIG. 11), an oppositely disposed second side 266, a third side 268 and an oppositely disposed fourth side 270. In the depicted embodiment, the first and second sides 264, 266 are generally parallel. The third and fourth sides 268, 270 extend between the first and second sides 264, 266. In the depicted embodiment, the third and fourth sides 268, 270 are generally perpendicular to the first and second sides 264, 266.

The first side 264 of each of the rails 260*a* is adapted for mounting to the first and second supports 242, 244. The third side 268 is adapted to engage the first plurality of rollers 262*a*. The first plurality of rollers 262*a* is engaged to the third side 268 of the rail 260*a* so that the rollers 262*a* rotate about an axis 272. The axis 272 is generally parallel to the second side 266 of the rails 260*a* and generally perpendicular to the third side 268.

The axis 272 of the rollers 262*a* is offset from a central longitudinal axis of the rail 260*a* (visible in FIG. 11). In the depicted embodiment, the axis 272 of the rollers 262*a* is disposed adjacent to the second side 266 of the rail 260*a* so that the axis 272 of the rollers 262*a* is disposed closer to the second side 266 than the first side 264. In the subject embodiment, the rollers 262*a* are engaged to the third side 268 of the rail 260*a* so that a portion of each roller 262*a* extends beyond the second side 266 of the rail 260*a*.

The second plurality of rails 260*b* is substantially similar to the first plurality of rails 260*a*. Each rail 260*b* includes a first side 276 (visible in FIG. 11), an oppositely disposed second side 278, a third side 280 and an oppositely disposed fourth side 282. In the depicted embodiment, the first and second sides 276, 278 are generally parallel. The third and fourth sides 280, 282 extend between the first and second sides 276, 278. In the depicted embodiment, the third and fourth sides 280, 282 are generally perpendicular to the first and second sides 276, 278.

The first side 276 of each of the rails 260*b* is adapted for mounting to the first and second supports 242, 244. The fourth side 282 is adapted to engage the second plurality of rollers 262*b*. In the depicted embodiment, the second plurality of rollers 262*b* is engaged to the fourth side 282 of the each of the rails 260*b* so that a portion of each roller 262*b* extends beyond the second side 278 of the rail 260*b*.

The bottom roller assembly 256 includes a rail 284 and a plurality of rollers 286 mounted to the rail 284. Typically, at least a portion of the plurality of rollers 286 are drive rollers for positioning a pane. The rail 284 includes a first side (visible in FIG. 11) 288 and an oppositely disposed second side 290. The first side 288 is adapted for mounting to the first and second supports 242, 244. In the depicted embodiment, the rail 284 is disposed between the first axial ends 246, 250 of the first and second supports 242, 244 and the lowermost rail assembly 254*a*, 254*b*.

The second side 290 is adapted for engagement with the rollers 286. In the depicted embodiment, the rollers 286 extend outwardly from the second side 290 so that an axis of rotation 291 of the rollers 286 is generally perpendicular to the second side 290. In the depicted embodiment, the axis of rotation 291 of the rollers 286 is generally perpendicular to the axis 272 of the rollers 262*a*.

The panel support 228 further includes a stop 316. In the depicted embodiment, the stop 316 is adapted to provide a positive stop for the first or second pane 12, 14. In one embodiment, the stop 316 is a sensor that senses the presence of a pane in its perimeter and stops operation of relevant drivers in the system such as drive rollers. The stop 316 can also be a mechanical stop such as a mount and a pin member, in another example. In such an embodiment the mount is adapted for mounting to the rail 284 of the bottom roller assembly 256. In the depicted embodiment, the mount is engaged to the first side of the rail 284.

With the mount mounted to the bottom roller assembly 256, the pin member is disposed between the rail 284 of the bottom roller assembly 256 and the lowermost rail assembly 254*a*, 254*b*. The pin member is selectively movable between a first position and a second position. In the first position, the pin member extends beyond the second side 290 of rail 284 so that the first or second pane 12, 14 is prevented from sliding along the pane support 228. In the second position, the pin member is retracted so that the first or second pane 12, 14 can slide along the pane support 228.

Spacer Applicator

Figure 12:
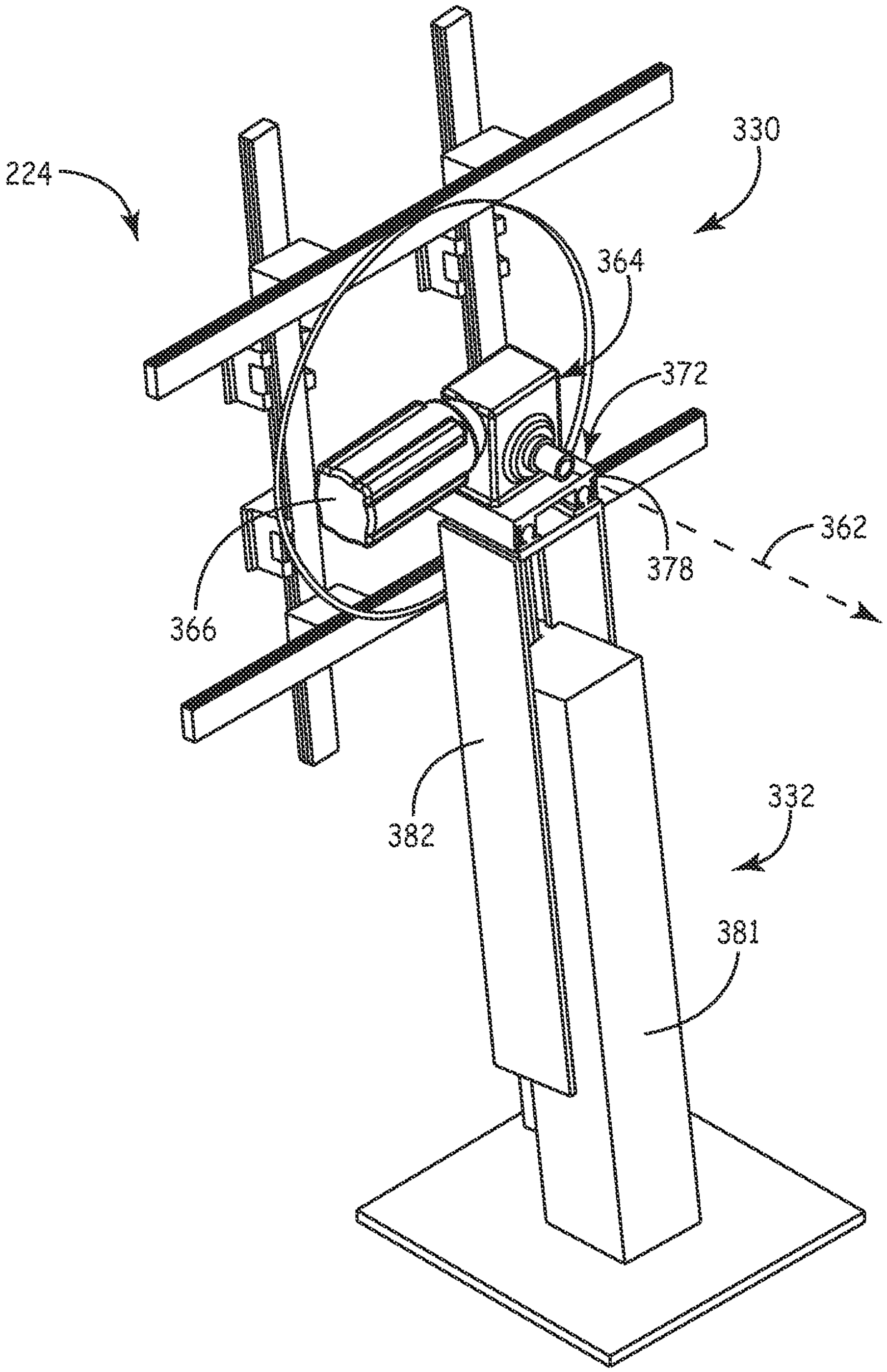
FIG. 12 is a perspective view of an applicator assembly suitable for use with the spacer applicator assembly of FIG. 9.
Figure 13:
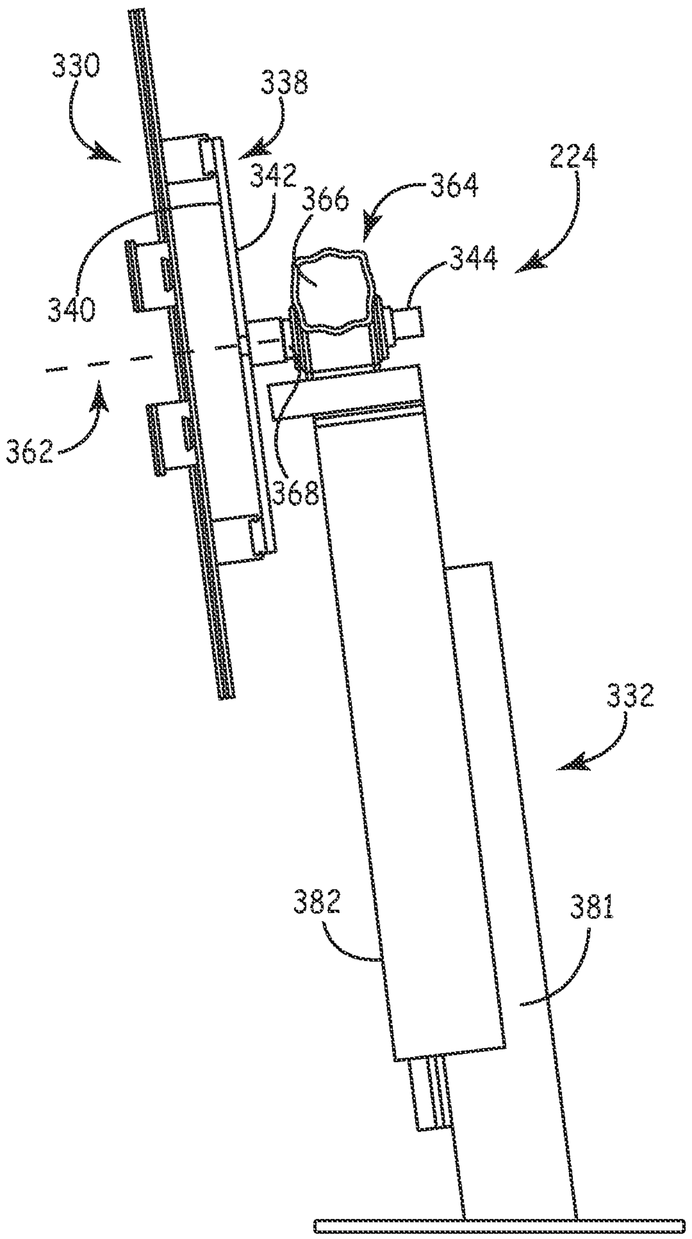
FIG. 13 is a side view of the applicator assembly of FIG. 12.
Figure 14:
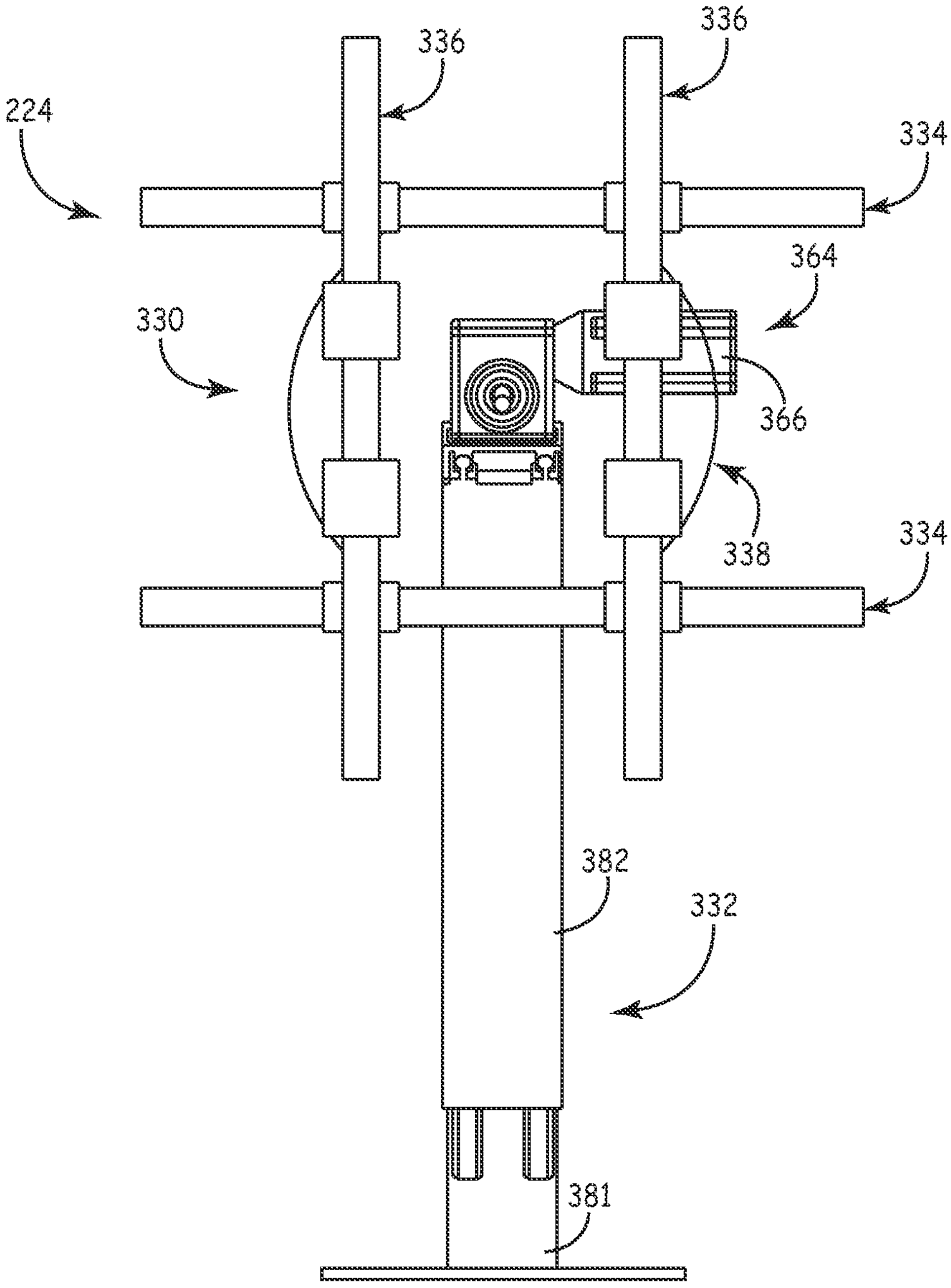
FIG. 14 is a front view of the applicator assembly of FIG. 12.

Referring now to FIGS. 12-14, the spacer applicator 224 is shown. The spacer applicator 224 is adapted to receive spacer 100, automatically shape the spacer into a frame, and to assemble the spacer 100 frame onto the first or second pane 12, 14 disposed on the stand assembly 222 (See FIG. 10). The spacer applicator 224 includes spacer applicator tooling 330 and a lift assembly 332.

Figure 15:
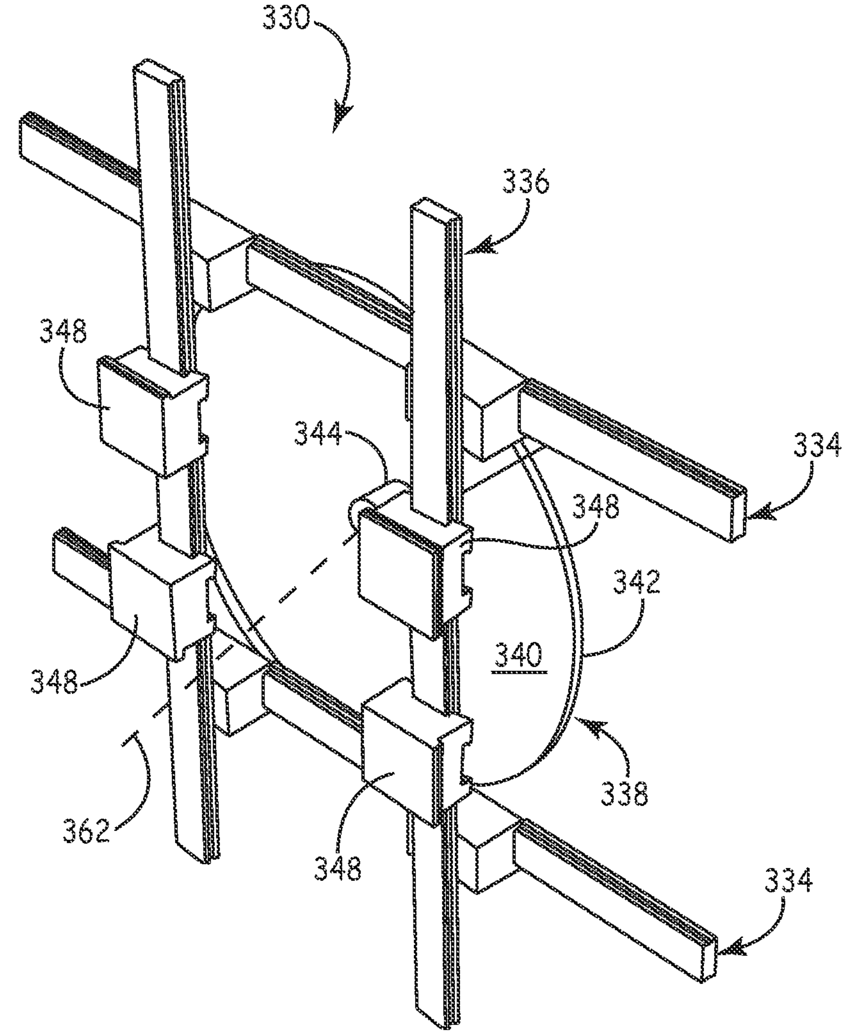
FIG. 15 is a perspective view of a spacer applicator tooling suitable for use with the applicator assembly of FIG. 12.
Figure 16:
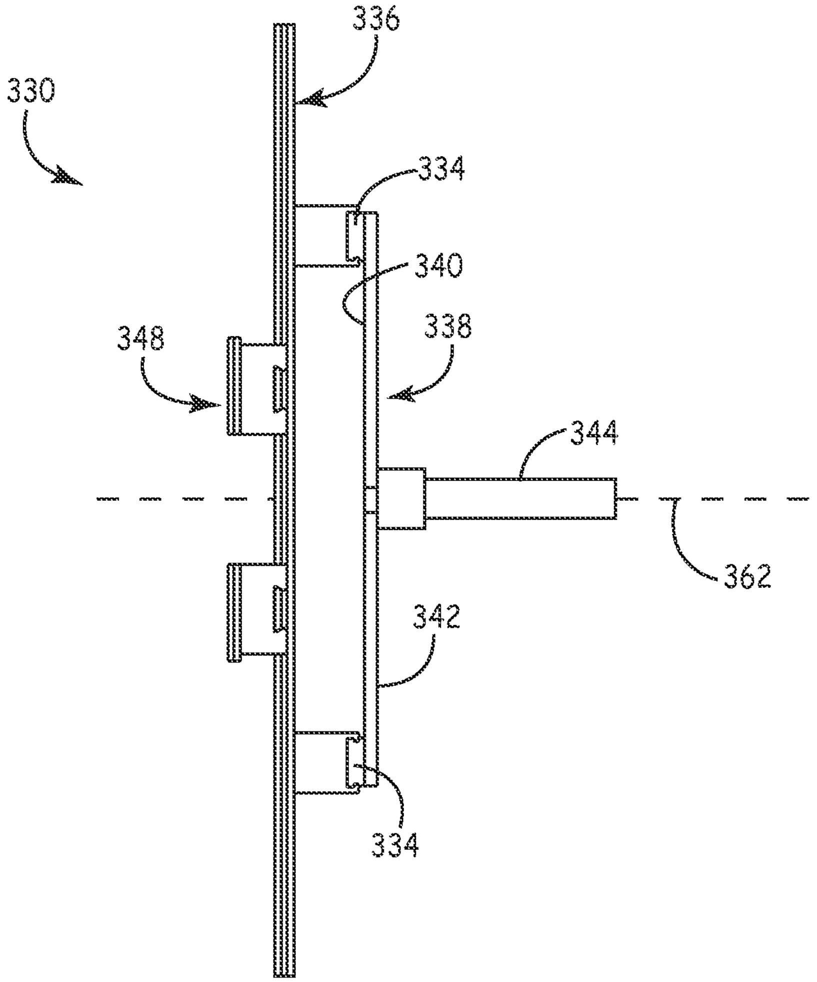
FIG. 16 is a side view of the spacer applicator tooling of FIG. 15.
Figure 17:
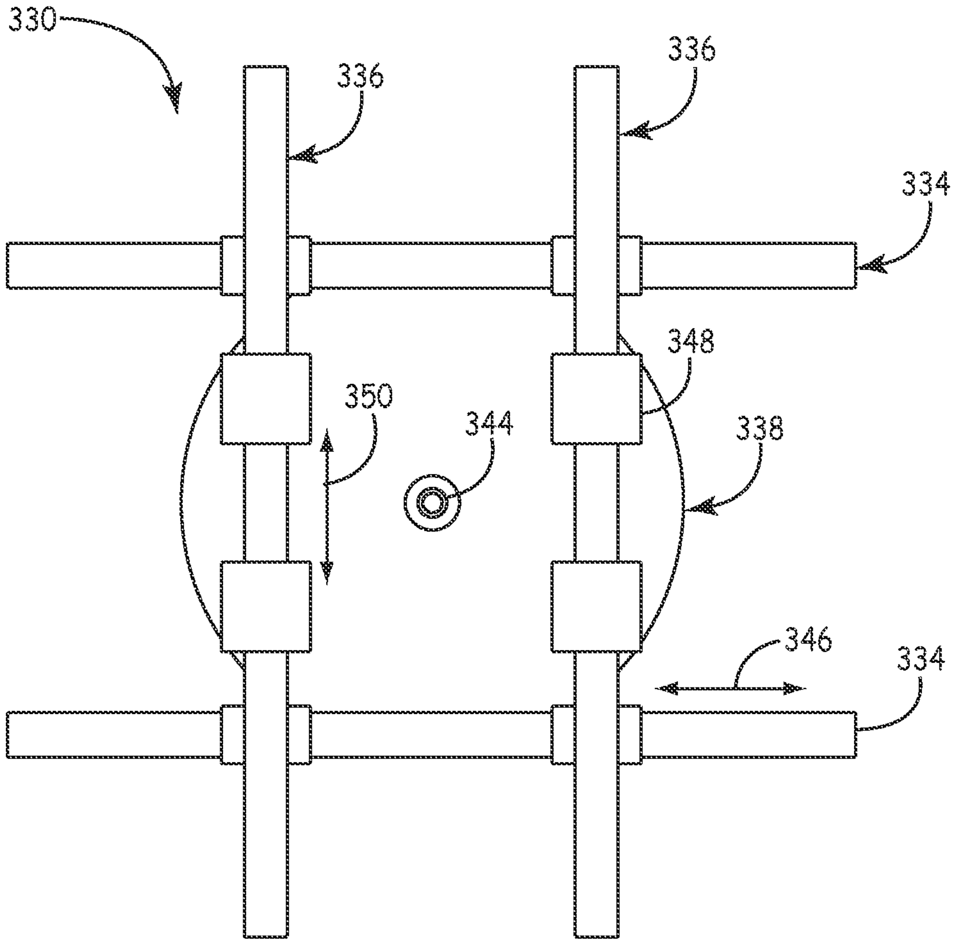
FIG. 17 is a front view of the spacer applicator tooling of FIG. 15.

Referring now to FIGS. 15-17, the spacer applicator tooling 330 includes a first plurality of guide rails 334 and a second plurality of guide rails 336. The first plurality of guide rails 334 is rigidly mounted to a plate 338. In the depicted embodiment, the first plurality of guide rails 334 is mounted to the plate 338 in a parallel orientation. The plate 338 includes a first surface 340 and an oppositely disposed second surface 342. In the depicted embodiment, the first plurality of guide rails 334 is mounted to the first surface 340 of the plate 338. The plate 338 is coupled to a shaft 344. The shaft 344 is centrally disposed on the plate 338 and extends outwardly from the second surface 342 of the plate 338. In one embodiment, the shaft 344 is integral with the plate 338.

The second plurality of guide rails 336 is slidably mounted to the first plurality of guide rails 334 so that the second plurality of guide rails 336 can move in a first direction 346 (shown as an arrow in FIG. 17) along the first plurality of guide rails 334. In the depicted embodiment, each of the second plurality of guide rails 336 is slidably mounted to each of the first plurality of guide rails 334.

The second plurality of guide rails 336 includes a plurality of spacer retention devices 348, which can be referred to as “corner blocks” in a variety of embodiments, despite the particular location of each device. The spacer retention devices 348 are adapted to receive the spacer 16, 16', 100. In one embodiment, the spacer retention devices 348 are removable so that a second set of spacer retention devices can be installed to accommodate a different spacer.

In the depicted embodiment, there are four spacer retention devices 348. The spacer retention devices 348 are slidably mounted on the second plurality of guide rails 336 so that the spacer retention devices 348 can move in a second direction 350 (shown as an arrow in FIG. 17) along the second plurality of guide rails 336. In the depicted embodiment, the second direction 350 is generally perpendicular to the first direction 346. As the spacer retention devices 348 are slidably mounted to the second plurality of guide rails 336 and as the second plurality of guide rails 336 is slidably mounted to the first plurality of guide rails 334, the spacer retention devices 348 are adapted for movement in the first and second directions 346, 350. In one embodiment, the spacer retention devices 348 are infinitely variable in the first and second directions 346, 350.

In one embodiment, the spacer retention devices 348 are moved manually in the first and second directions 346, 350. In another embodiment, sensors and actuators are used to move at least a portion of the spacer retention devices 348 in the first and second directions. In yet another embodiment, another type of control system is used to move at least a portion of the spacer retention devices 348 in the first and second directions.

Spacer Retention Device

Figure 18:
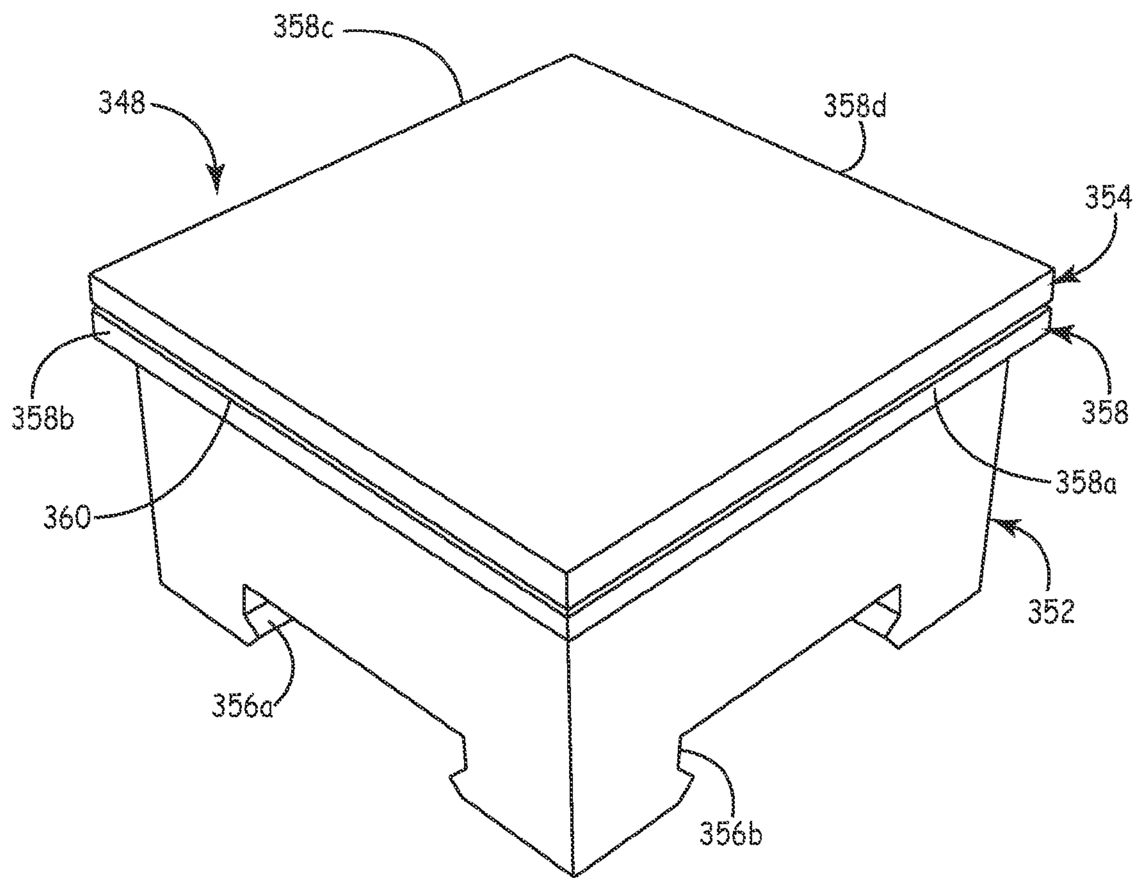
FIG. 18 is a perspective view of an embodiment of a spacer retention device suitable for use with the spacer applicator tooling of FIG. 15.
Figure 19:
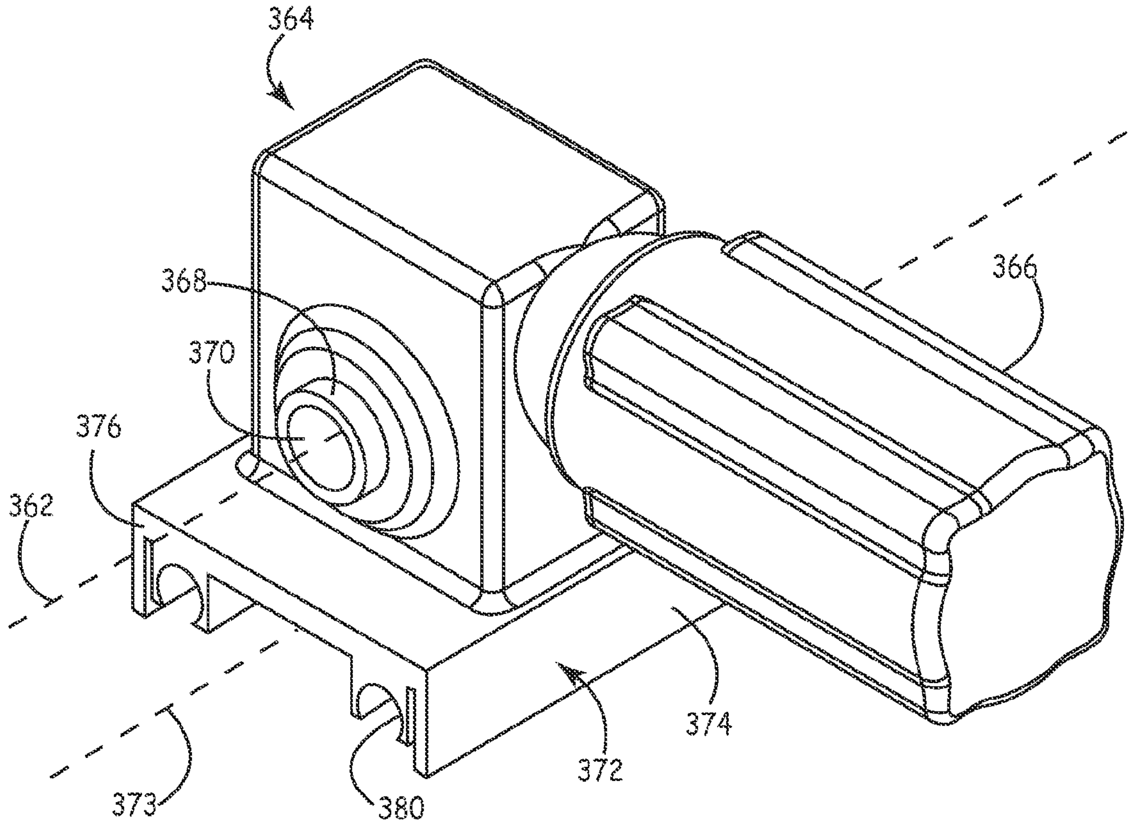
FIG. 19 is an actuator assembly suitable for use with the applicator assembly of FIG. 12.
Figure 20:
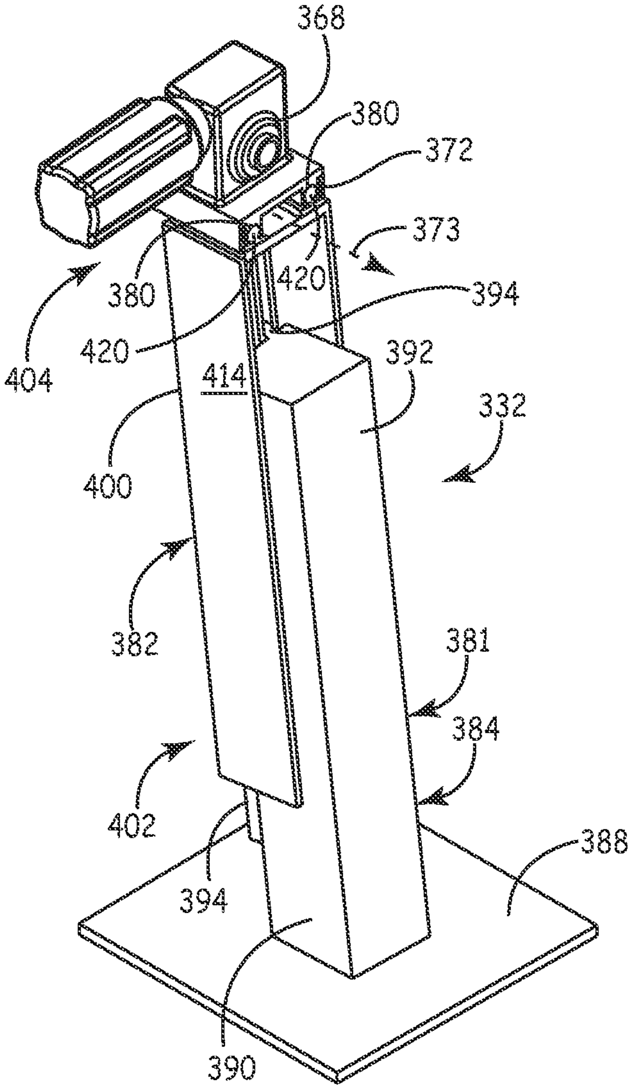
FIG. 20 is a perspective view of a lift assembly suitable for use with the applicator assembly of FIG. 12.
Figure 21:
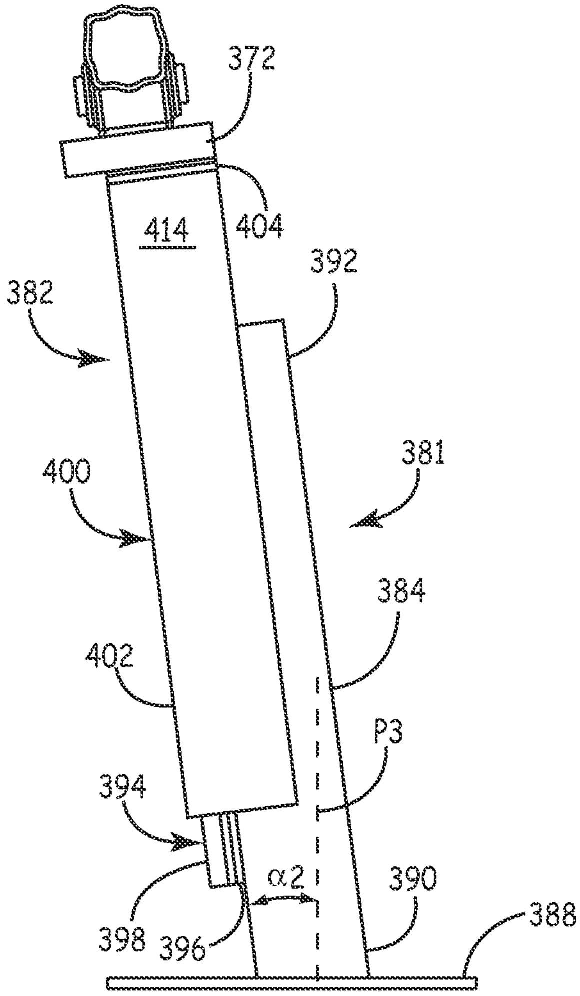
FIG. 21 is a side view of the lift assembly of FIG. 21.
Figure 22:
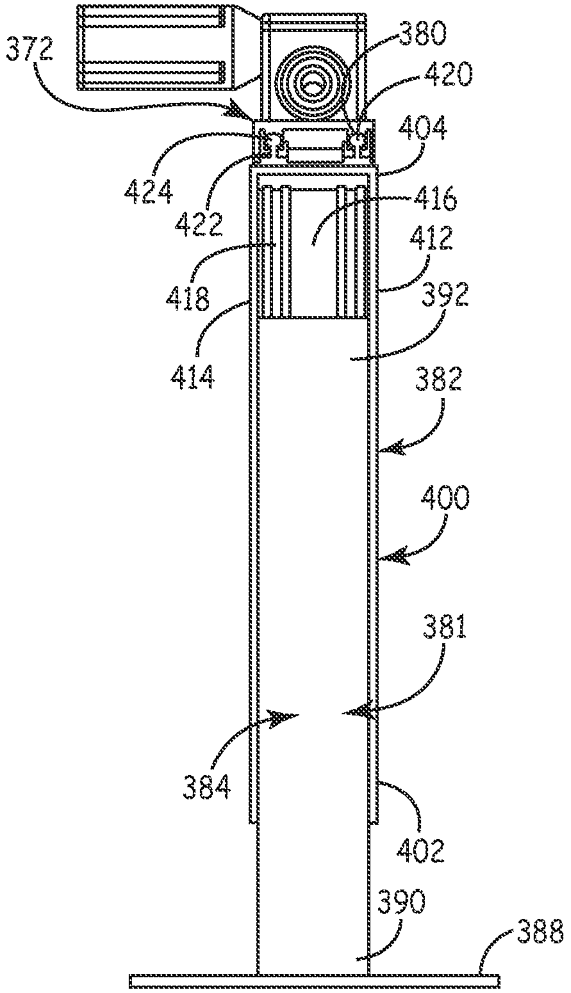
FIG. 22 is a back view of the lift assembly of FIG. 21.
Figure 23:
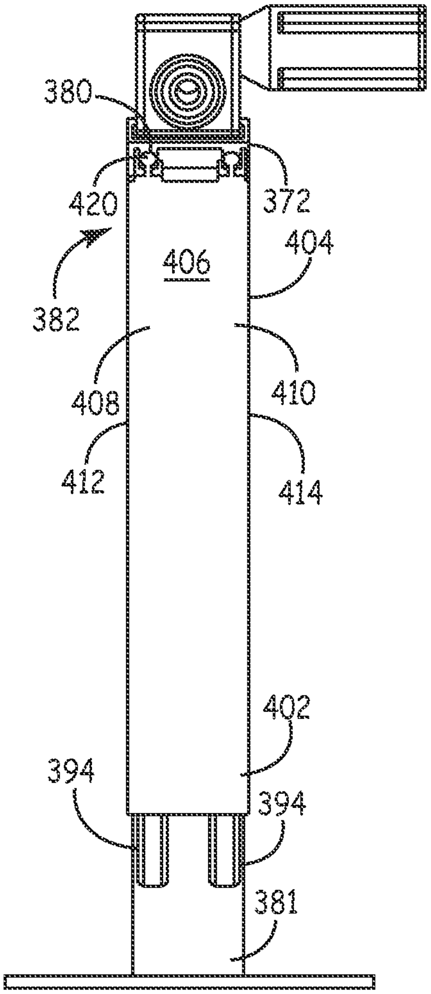
FIG. 23 is a front view of the lift assembly of FIG. 21.

Referring now to FIG. 18, the spacer retention device 348 is shown, consistent with an alternative embodiment. The spacer retention device 348 includes a base portion 352 and a guide portion 354. The base portion 352 defines a channel 356*a*. The channel 356 is adapted to slidably engage one of the second plurality of guide rails 336. In the depicted embodiment, the base portion 352 defines a second channel 356*b*. The second channel 356*b* is oriented at an angle relative to the channel 356*a*. In the depicted embodiment, the second channel 356*b* is oriented at a 90° angle relative to the channel 356*a*.

The guide portion 354 is generally rectangular in shape. The guide portion 354 includes an outer edge surface 358 disposed at a perimeter of the guide portion 354. At least a portion of the outer edge surface 358 of the guide portion 354 is adapted to receive the spacer 16, 16', 100.

The outer edge surface 358 includes a first portion 358*a*, an oppositely disposed second portion 358*b*, a third portion 358*c* and a fourth portion 358*d*. The third portion 358*c* is adjacent to the first and second portions 358*a*, 358*b*. The fourth portion 358*d* is disposed opposite the third portion 358*c* and adjacent to the first and second portions 358*a*, 358*b*. In the depicted embodiment, at least two adjacent portions of the outer edge surface 358 define a groove 360. The groove 360 is adapted to receive the alignment member 126 of the spacer 100.

Spacer Applicator Movement

Referring to FIGS. 12, 15-17 and 19, the spacer applicator tooling 330 is adapted to rotate about a rotation axis 362. The rotation axis 362 is centrally disposed on the spacer applicator 330. The rotation axis 362 is generally perpendicular to the plate 338. In the depicted embodiment, the rotation axis 362 is a central axis of the shaft 344 of the spacer applicator 330.

An actuator assembly 364 is generally coupled to the applicator tooling 330. The actuator assembly 364 is adapted to rotate the spacer applicator tooling 330 about the rotation axis 362. The actuator assembly 364 includes an actuator 366 and a collar 368. In one embodiment, the actuator 366 is a rotary actuator. The actuator 366 can be electronically controlled so that speed and duration of rotation of the spacer applicator tooling 330 are controlled by a control system including, for example, a central processing unit. The collar 368 defines a bore 370 that is adapted to receive an end of the shaft 344 (See FIG. 16). The actuator 366 is coupled to the shaft 344 of the spacer applicator tooling 330 at the collar 368. In one embodiment, the actuator 366 is configured to rotate the applicator tooling 330 one cycle to form a spacer frame having a closed perimeter. In some embodiments, the actuator 366 is configured to rotate the applicator tooling only 270 degrees to complete a cycle. In some other embodiments, the actuator 366 is configured to rotate the applicator tooling about 360 degrees to complete a cycle. In one embodiment, the actuator 366 can be configured to reverse-rotate the applicator tooling 330 to the same degree as the original rotation cycle. Such reverse rotation can unwind couplers, cords, and the like, that have been wound during the original 270-degree rotation. In some embodiments the reverse-rotation cycle can also be used to form a second spacer frame having a closed perimeter. In such embodiments a second spacer would be fed to the applicator tooling 330 from the opposite direction of the first spacer.

In a variety of embodiments the actuator 366 is configured to rotate the applicator tooling 330. In such embodiments, a contact point between the actuator 366 and the applicator tooling 330, such as the collar 368 or wire couplers, can be configured to rotate along with the applicator tooling 330, with one or more bearings or the like to prevent winding of couplers, cords, hoses, and the like, during rotation of the applicator tooling 330.

In a variety of embodiments, one or more couplers, cords, hoses, and the like, extend to the applicator tooling from their respective source points. Using rotatable couplers from the source to the tooling can allow for continuous rotation of the applicator tooling in one direction. For example, in one embodiment where the applicator tooling is translated through the use of air or other fluid pressure, one or more pressure hoses are operatively coupled from the pressure source to the applicator tooling through a rotatable mount that is positioned substantially co-linear with the axis of rotation of the applicator tooling. As another example, a slip ring couples a power source to the applicator tooling. One example of a modular unit of slip rings that can be used to transmit multiple power, signal or data connections is a Kuebler Modular Slip Ring having Model number IST-SR085, available from Fritz Kuebler GmbH of Villingen-Schwinningen, Germany.

As yet another example, an optical coupler can be positioned substantially co-linear with the axis of rotation of the applicator tooling to couple a cable from a source point. In this embodiment, additional hook ups may be provided for power and pneumatics. A variety of other approaches can be used that allows for continuous rotation of the applicator tooling in a first direction.

The spacer applicator tooling 330 is engaged to the lift assembly 332 by a mount 372. The mount 372 is adapted to move the spacer applicator tooling 330 along a translation axis 373 that is generally perpendicular to the plate 338 of the spacer applicator 224. In the depicted embodiment, the translation axis 373 is generally parallel to the rotation axis 362. In one embodiment, the translation of the spacer applicator tooling 330 is electronically controlled. The mount 372 includes a base portion 374 having a first end 376 and an oppositely disposed second end 378. The base portion 374 defines a plurality of guide paths 380 that extend through the first and second ends 376, 378 of the base portion 374. In the depicted embodiment, the guide paths 380 are parallel to the translation axis 373.

Lift Assembly

Referring now to FIGS. 20-23, the lift assembly 332 will be described. The lift assembly 332 includes a base support 381 and a lift 382. The lift assembly 332 is configured to move the entire tooling 330 vertically in either direction. As a result, any point or area on the tooling can be moved vertically in one embodiment. For example, in one embodiment a center area of the tooling, for example, the axis of rotation, can be moved vertically. In a variety of embodiments dynamic position adjustment of the tooling 330 during assembly of a spacer frame allows the spacer to be applied to the perimeter of the tooling throughout the cycle. Adjustment of the position of the tooling 330 will generally be vertical adjustments of the axis of rotation in many embodiments, if the tooling is oriented to mate the spacer frame to a vertically positioned pane. However, it is also possible for the tooling to be oriented to mate the spacer frame to a horizontally positioned pane. Adjustment of the vertical position of the tooling 330 can occur during the rotation cycle of the tooling. The base support 381 includes a support portion 384 and a base plate 388. The support portion 384 includes a first end 390 and an oppositely disposed second end 392.

The support portion 384 extends outwardly from the base plate 388 at a second angle $\alpha 2$ relative to a vertical plane P3 (shown as a dashed line in FIG. 21) that is generally perpendicular to the base plate 388 and extends through the first end 390 of the support portion 384. Generally, the second angle $\alpha 2$ can range from about 0 degrees to about 90 degrees. In an embodiment where the second angle $\alpha 2$ is about 0 degrees, the pane is substantially vertical and can be supported with one or more retention devices. In one embodiment, the second angle $\alpha 2$ is generally equal to the first angle $\alpha 1$. In another embodiment, the second angle $\alpha 2$ is in the range of about 1 degree to about 15 degrees. In another embodiment, the second angle $\alpha 2$ is in the range of about 1 degree to about 10 degrees. In another embodiment, the second angle $\alpha 2$ is in the range of about 5 degree to about 10 degrees. In another embodiment, the second angle $\alpha 2$ is in the range of about 40 degrees to about 50 degrees. In yet another embodiment, the second angle $\alpha 2$ is about 90 degrees and is, therefore, substantially horizontal.

The support portion 384 includes a plurality of slide rails 394. The slide rails 394 extend at least partially between the first end 390 and the second end 392 of the support portion 384. The support rails 394 include a base end 396 and a free end 398. The base end 396 is engaged to the support portion 384. The free end 398 extends outwardly from the support portion 384 in a generally perpendicular direction. In one embodiment, the free end 398 has a width that is greater than the base end 396.

The lift 382 is slidably engaged to the base support 381. The lift 382 includes a body 400 having a first axial end portion 402 and an oppositely disposed second axial end portion 404. In the depicted embodiment, the body 400 includes a first wall 406 having a first side portion 408 and an oppositely disposed second side portion 410. A second wall 412 extends outwardly from the first wall 406 at the first side portion 408 while a third wall 414 extends outwardly from the first wall 406 at the second side portion 410. The first, second and third walls 406, 412, 414 cooperatively define a cavity 416. The base support 381 is received in the cavity 416.

The first wall 406 defines a plurality of linear tracks 418. The linear tracks 418 are adapted to receive the slide rails 394 of the support portion 384 of the base support 381. The linear tracks 418 are configured so that the slide rails 394 can slide in the linear tracks 418 between a first position in which the lift 382 is fully retracted and a second position in which the lift 382 is fully extended. In one embodiment, the extension of the lift 382 is electronically controlled.

The second axial end portion 404 of the lift 382 is adapted to engage the mount 372. The second axial end portion 404 includes a plurality of protrusions 420 having a base end portion 422 and a free end portion 424. The base end portion 422 is engaged to the second axial end portion 404 of the body 400 while the free end portion 424 extends outwardly from the body 400. The plurality of protrusions 420 is adapted for sliding engagement with the plurality of guide paths 380 of the mount 372. The engagement of the protrusions 420 and the guide paths 380 of the mount 372 allow for translation of the mount along the translation axis 373 (See FIGS. 19 & 20).

In the depicted embodiment, the width of the free end portion 424 of each of the protrusions 420 is greater than the width of the base end portions 422. This prevents the mount 372 from being disengaged from the second axial end portion 404 of the body 400 in a direction that is generally perpendicular to the translation axis 373.

Use of the Spacer Applicator

Referring now to FIG. 9-23, the use of the spacer applicator assembly 220 will be described. One of the first and second panes 12, 14 is positioned on the pane support 228 of the stand assembly 222. With the dimensions of the first or second pane 12, 14 known, the spacer retention devices 348 of the spacer applicator 224 are moved in the first and second directions 346, 350 so that the spacer retention devices 348 are disposed adjacent to the perimeter of the first or second pane 12, 14. In some embodiments, the spacer retention devices only move in a first direction. The height of the spacer applicator 224 is also adjusted so that the height of the tooling 330 corresponds to the height of the first or second pane 12, 14 on the panel support 228 of the stand assembly 222. The differences in the height of the spacer applicator tooling 330 and the height of the first or second pane 12, 14 account for the second angle $\alpha 2$ of the applicator 224, the distance the applicator 224 is from the stand assembly 222, as well as the fact that the spacer is placed on the pane such that it is inset from the edges of the pane. The height of the spacer applicator tooling 330 is adjusted by sliding the lift 382 relative to the base support 381. In one embodiment, the height is electronically controlled.

The spacer 100 is fed to one of the spacer retention devices 348 of the spacer applicator 224. In one embodiment where the spacer includes an alignment member, the alignment member 126 of the spacer 100 is positioned in the groove 360 of at least one portion of the outer edge surface 358 of the guide portion 354 of the spacer retention device 348.

In another embodiment, an end portion of the spacer 100 is engaged by one of the spacer retention devices 348. For example, in one embodiment, the spacer 100 is clamped to the spacer retention device 348. With the spacer 100 clamped to the spacer retention device 348, the spacer applicator tooling 330 rotates about the rotation axis 362 so that the spacer 100 is disposed on the outwardly facing surfaces of the outer edge surfaces 358 of the spacer retention devices 348. It will be understood that the phrase "outwardly facing surfaces" refers to those surfaces that do not face in a direction of another spacer retention device 348. In other words, the tooling 330 rotates so that the spacer 100 surrounds the plurality of spacer retention devices 348.

As the spacer applicator tooling 330 rotates, the notches 210 of the spacer 100 close to form distinct corners. In some embodiments, the corners are about 90 degrees, although in other embodiments, corners will have a variety of different angle measurements depending on the shape of the window and/or the desired shape of the framed spacer. For example, where the desired spacer shape is a triangular frame, a corner could be 60 degrees. Generally a corner is understood to be a location where two sides or portions of the perimeter of an insulating glazing unit or a spacer frame meet and form an angle.

The rotation of the spacer applicator tooling 330 is stopped after one cycle, at which point the spacer 16 forms a complete frame. In other words, after one cycle, the spacer 100 is disposed about the outwardly facing surfaces of the spacer retention devices 348. In one embodiment, one cycle is about 270 degrees of rotation. In another embodiment, one cycle is less than about 360 degrees of rotation. In yet another embodiment, one cycle is 360 degrees of rotation. After one cycle, ends of the spacer 100 are joined together so that the spacer 100 forms a frame with a generally continuous loop or perimeter.

In at least one embodiment, after the spacer 100 is disposed around the plurality of spacer retention devices 348, the spacer 100 is tensioned. In one embodiment, at least a portion of the spacer retention devices 348 move apart relative to each other to exert a force on the spacer 100. Such a force places the spacer 100 in a state of tension, which can increase the stiffness of the spacer frame. Tensioning the spacer 100 can also increase the spacer frame dimensions to a relatively exact measurement. In addition, tensioning the spacer 100 can aid in the accurate placement of the spacer frame on a pane.

In a variety of embodiments at least a portion of the spacer retention devices 348 move between approximately 0.005 and 0.3 inches apart. In another embodiment at least a portion of the spacer retention devices 348 move between approximately 0.05 and 0.2 inches apart. In yet another embodiment at least a portion of the spacer retention devices 348 move between approximately 0.05 and 0.1 inches apart. Because tensioning the spacer 16 results in an increase in the dimensions of the spacer frame, it can be desirable to cut the linear spacer segment slightly shorter than the intended perimeter length of the spacer frame.

The spacer applicator tooling 330 moves along the translation axis 373 toward the first or second pane 12, 14, which is positioned on the stand assembly 222. The translation, or movement, of the spacer applicator tooling 330 is stopped when one of the first and second sides 62, 64 of the spacer 100 abuts one of the first and second panes 12, 14. In one embodiment, the spacer applicator tooling 330 includes a translation adjustment to account for different thickness of window panes. The spacer 100 is engaged to the pane 12, 14 by the sealant disposed on the first and second sides 62, 64.

In one embodiment, springs bias the spacer retention devices 348 outwardly from the second plurality of guide rails 336. The springs allow for angular misalignment between the stand assembly 222 and the spacer applicator tooling 330 or between the spacer 100 and the first or second pane 12, 14. The springs also can absorb force when the spacer 100 contacts the pane, so that a portion of the forces are absorbed.

With the spacer 100 engaged to the first or second pane 12, 14, the spacer applicator tooling 330 releases the spacer 100 and translates back to its initial position, or generally moves away from the first pane and spacer. In one embodiment, at least a portion of the spacer retention devices 348 move inwardly relative to each other to assist in disengaging the tooling from the spacer 100 before the tooling 330 moves away from the pane. At this point, in some embodiments, the spacer applicator tooling 330 can reverse-rotate the amount of the original rotation (and, as described above, the reverse rotation can be used to form a second spacer frame). The opposite pane of the window assembly 10 is then added.

Alternate Spacer Applicator Assembly

Figure 24:
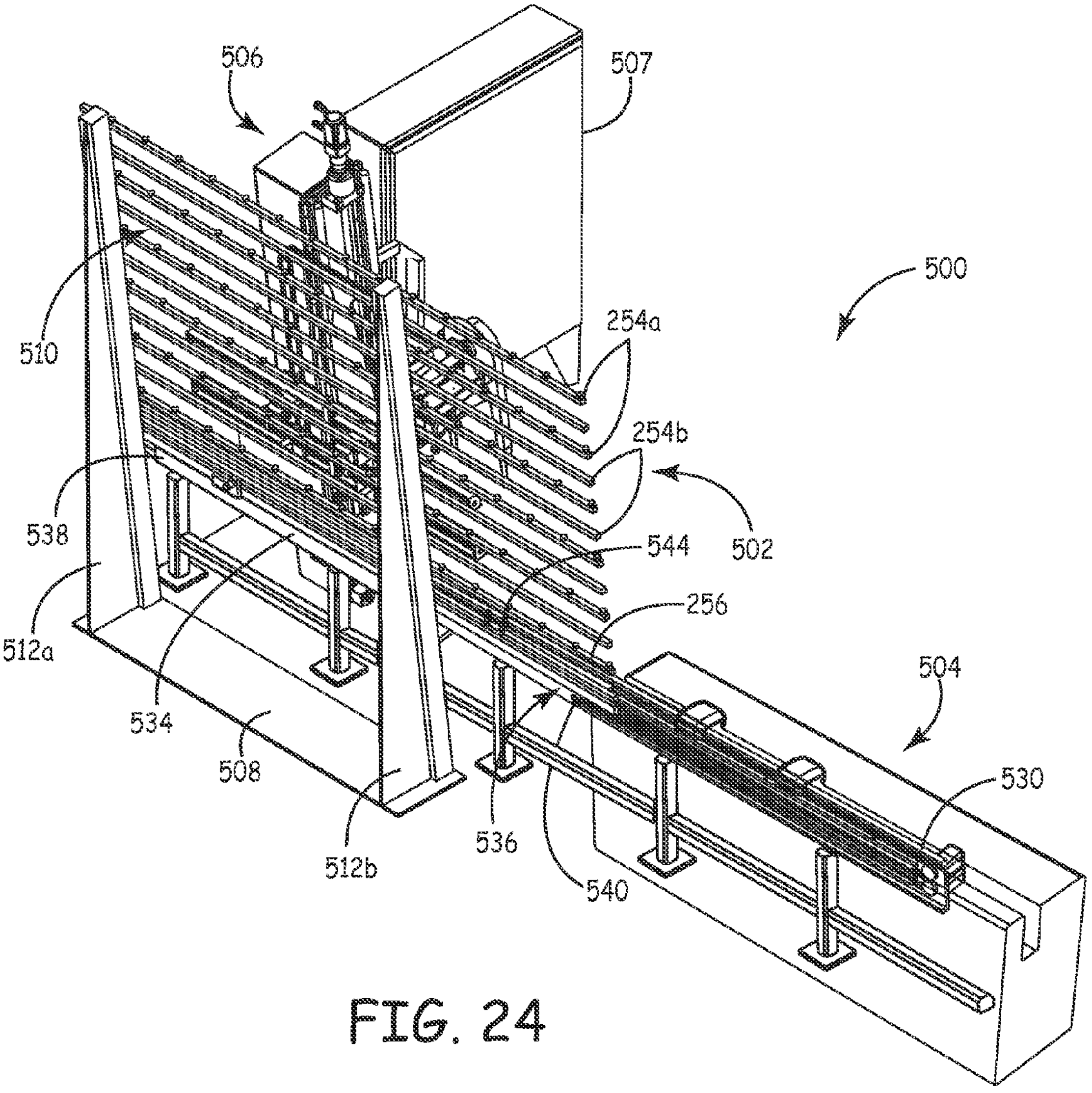
FIG. 24 is a perspective view of an alternate embodiment of a spacer applicator assembly.
Figure 25:
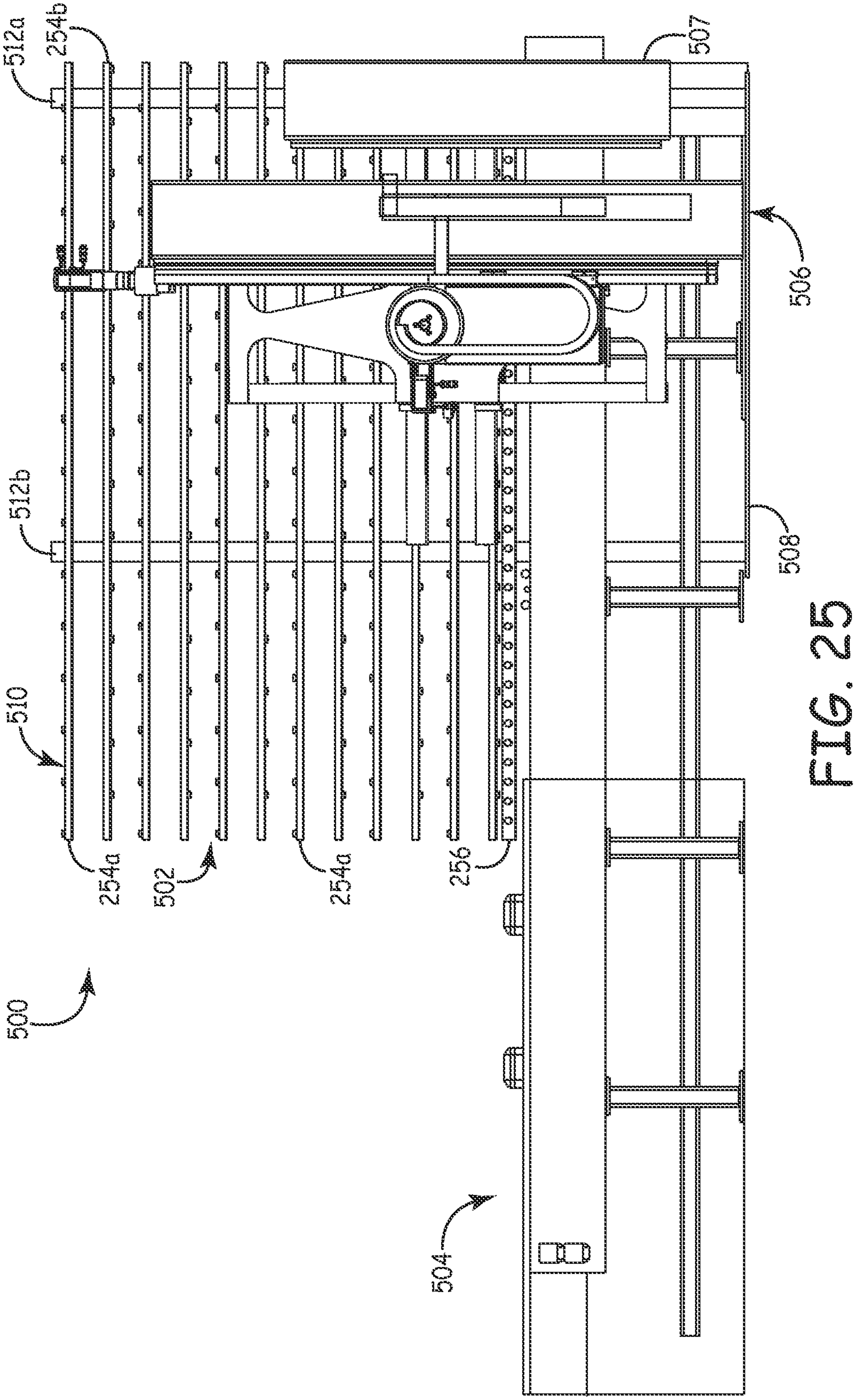
FIG. 25 is a front view of the spacer applicator assembly of FIG. 25.
Figure 26:
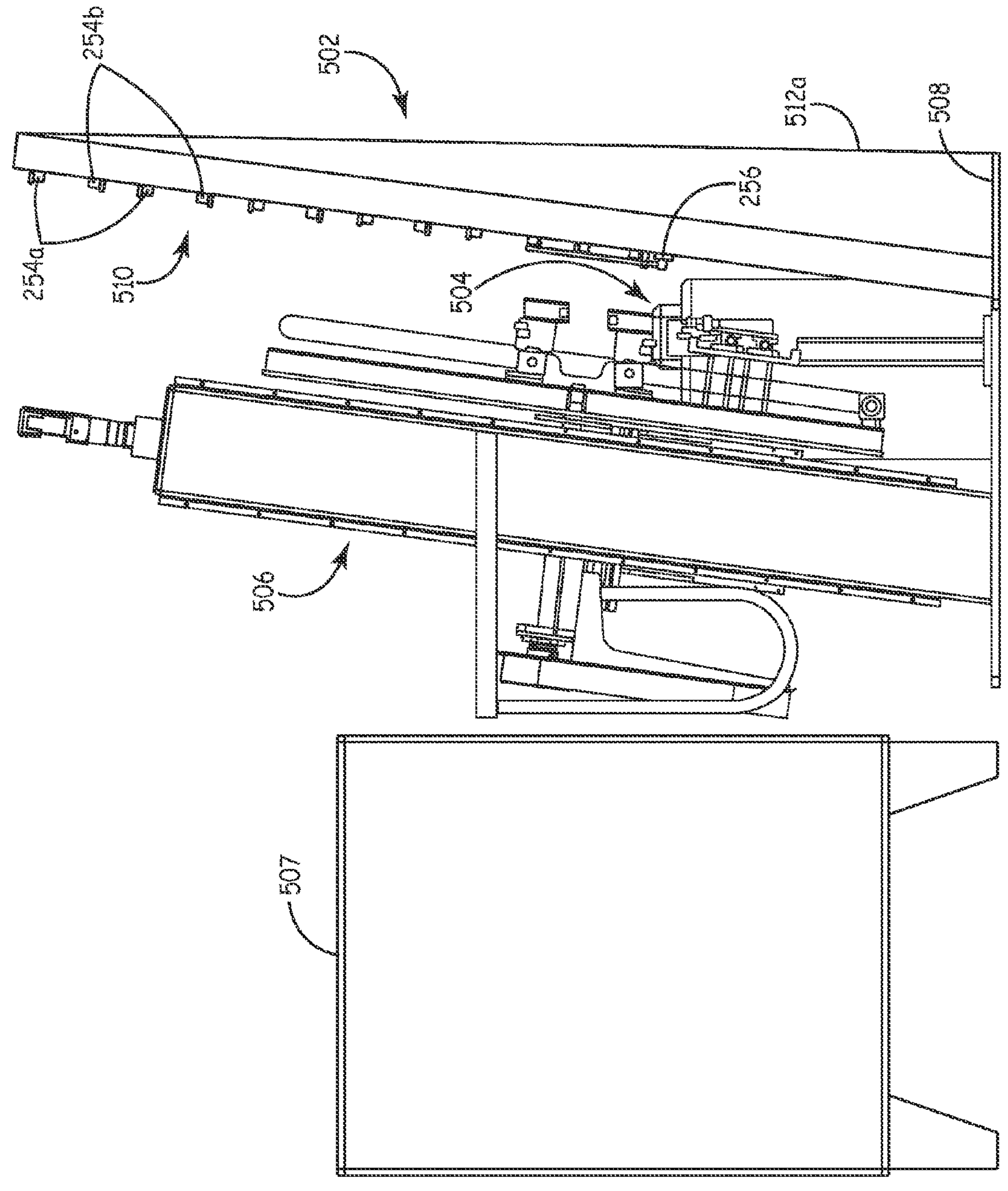
FIG. 26 is a side view of the spacer applicator assembly of FIG. 25.

Referring now to FIGS. 24-26, an alternate embodiment of a spacer applicator assembly 500 is shown. The spacer applicator assembly 500 includes a stand assembly 502, a spacer feed assembly 504 and a spacer applicator 506. In the depicted embodiment, the spacer applicator assembly 500 is controlled by an electronic controller 507.

The stand assembly 502 is similar in structure to the stand assembly 222 previously described. The stand assembly 502 includes a base 508 and a panel support 510. First and second supports 512*a*, 512*b* extend outwardly from the base 508. The panel support 510 is engaged to the first and second supports 512*a*, 512*b*. The panel support 510 includes the first plurality of rail assemblies 254*a*, the second plurality of rail assemblies 254*b* and the bottom roller assembly 256. As the first and second rail assemblies 254*a*, 254*b* and the bottom roller assembly 256 were previously described, as such, the first and second rail assemblies 254*a*, 254*b* and the bottom roller assembly 256 will not be further described. The spacer feed assembly 504 is adapted to feed the spacer 16 to the applicator assembly 506. In the depicted embodiment, the spacer feed assembly 504 is not mounted to stand assembly 502. Rather, the spacer feed assembly 504 is positioned at a location that is adjacent to the stand assembly 502.

Shuttle Assembly (FIGS. 27-31)

Referring now to FIGS. 27-31, the spacer feed assembly 504 includes a frame 514 that supports a shuttle assembly 516. The shuttle assembly 516 includes a drive assembly 518 (See FIG. 28). In the depicted embodiment, the drive assembly 518 includes a first belt 520 and a second belt 520*b*. The first belt 520*a* is disposed in a first loop configuration while the second belt 520*b* is disposed in a second loop configuration. The first and second loop configurations extend from a first end 522 of the shuttle assembly 516 to an oppositely disposed second end 524 of the shuttle assembly 516. A first motor 526*a* is engaged to the first belt 520*a* (e.g., through a pulley, sprocket, etc.) and drives the first belt 520*a* (see FIG. 28). In the depicted embodiment, a second motor 526*b* is engaged to the second belt 520*b* and drives the second belt 520*b*.

The shuttle assembly 516 further includes a first guide bar 528*a* and a second guide bar 528*b*. The first and second guide bars 528*a*, 528*b* are rigidly engaged to the shuttle assembly 516 so that the first and second guide bars 528*a*, 528*b* are generally parallel. Each of the first and second guide bars 528*a*, 528*b* includes a first end 530 and an oppositely disposed second end 532.

A shuttle 534 of the shuttle assembly is movably engaged to at least one of the first guide bar 528*a* and the second guide bar 528*b*. In the depicted embodiment, the shuttle 534 includes a first axial end 536 and an oppositely disposed second axial end 538. The shuttle 534 is adapted to move along the first and second guide bars 528*a*, 528*b* (See FIGS. 28-29) between a first position and a second position. With the shuttle 534 at the first position, the first axial end 536 is immediately adjacent to the first ends 530 of the first and second guide bars 528*a*, 528*b*. With the shuttle 534 at the second position, the second axial end 538 of the shuttle 534 is immediately adjacent to the second ends 532 of the first and second guide bars 528*a*, 528*b*. In the depicted embodiment, the shuttle 534 is engaged to the first and second guide bars 528*a*, 528*b* by a plurality of pillow blocks 540 (See FIGS. 30 & 31, in particular). The pillow blocks 540 are adapted to slide along the first and second guide bars 528*a*, 528*b* between the first and second positions. In one embodiment, the pillow blocks 540 are engaged with the first and second belts 520*a*, 520*b* so that the pillow blocks 540 move along the first and second guide bars 528*a*, 528*b* when the first and second belts 520*a*, 520*b* are actuated by the first and second motors 526*a*, 526*b*.

The shuttle 534 further includes a first clamp 542 (See FIG. 31, in particular) engaged to the shuttle 534 adjacent the second axial end 538 of the shuttle 534. In the depicted embodiment, a body of the first clamp 542 is rigidly engaged to the shuttle 534. The first clamp 542 is adapted to receive an end of the spacer 16 and to clamp that end to the shuttle 534 so that the spacer 16 can be transported from the first position of the shuttle 534 to the second position.

Figure 27:
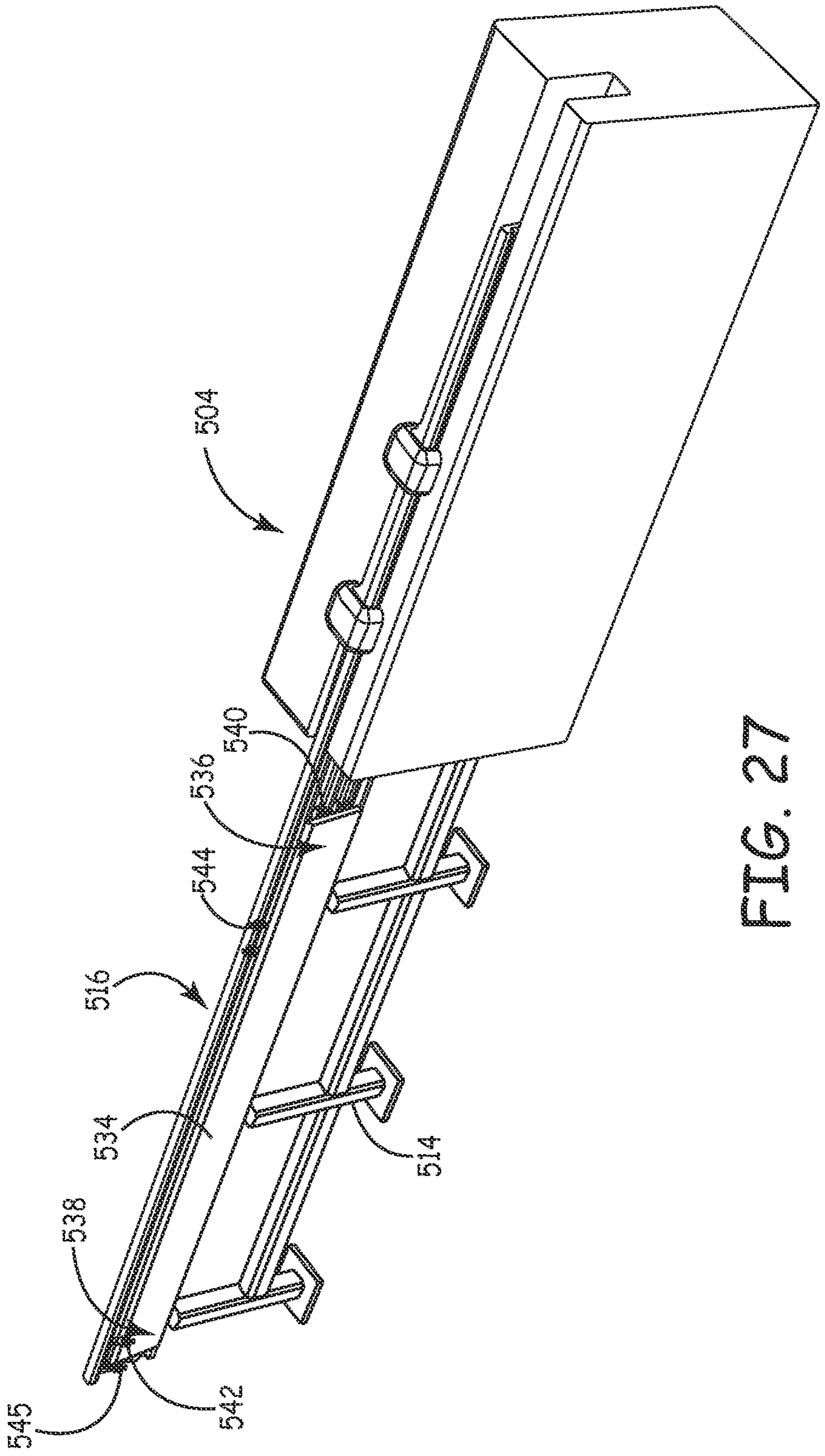
FIG. 27 is a perspective view of an alternate embodiment of a spacer feed assembly suitable for use with the spacer applicator assembly of FIG. 25.
Figure 28:
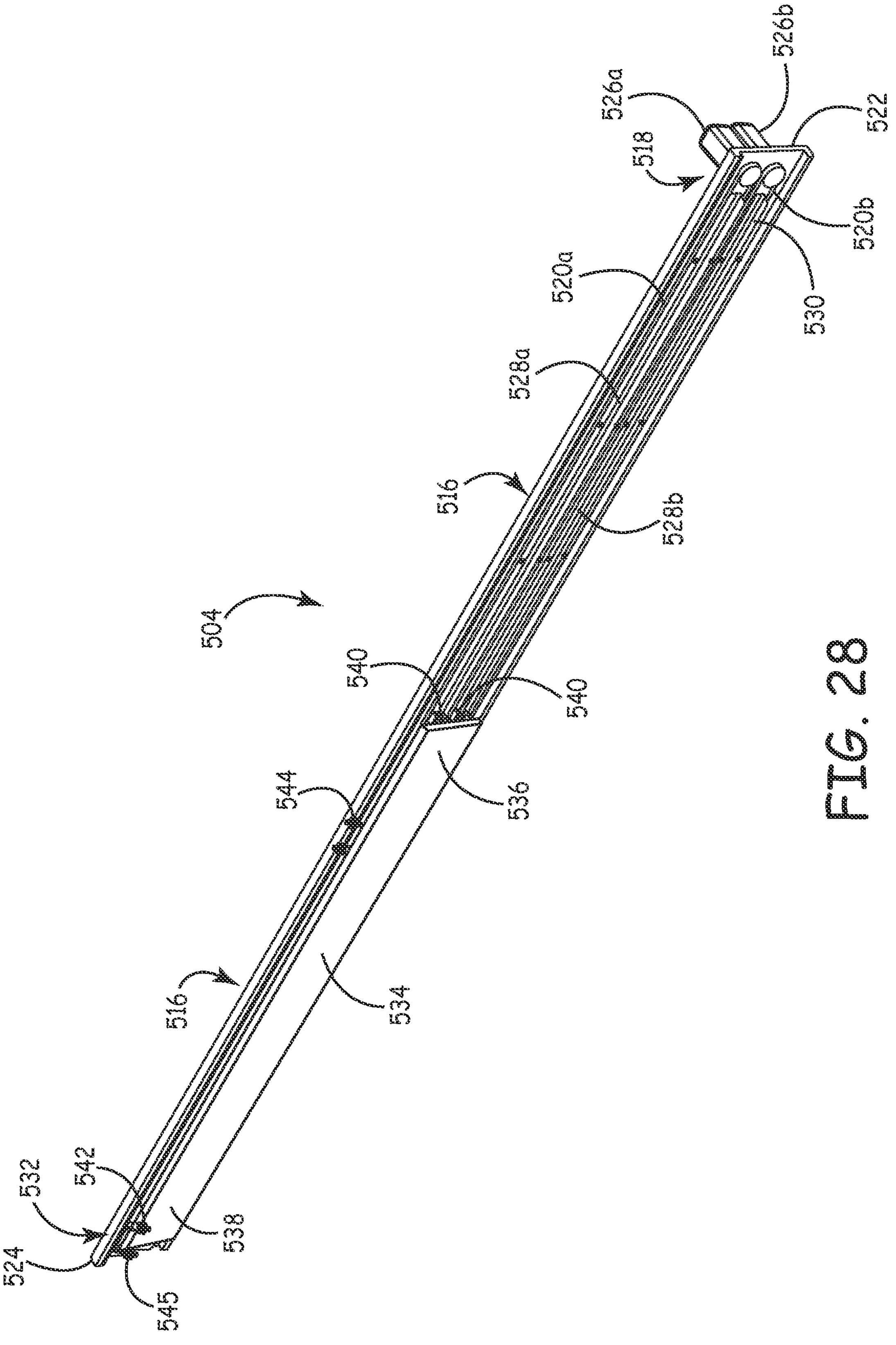
FIG. 28 is a perspective view of a shuttle assembly suitable for use with the spacer feed assembly of FIG. 27.
Figure 29:
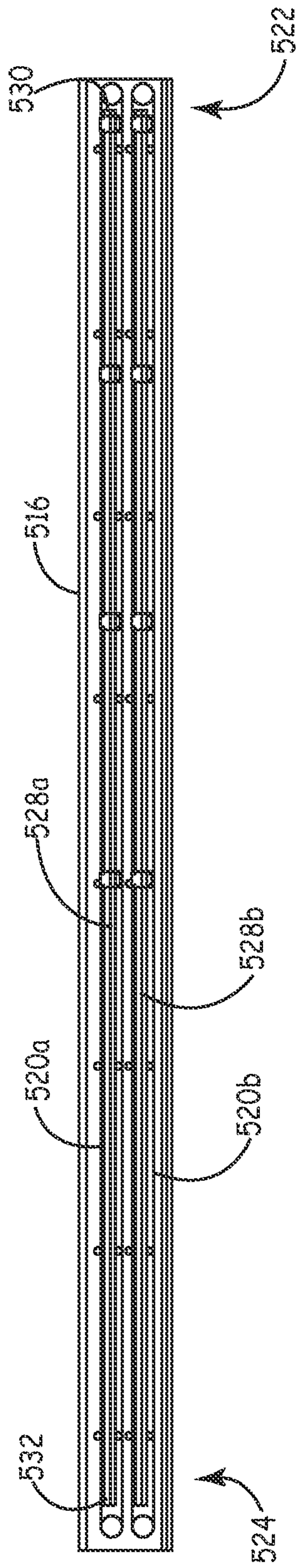
FIG. 29 is a perspective view of the shuttle assembly of FIG. 29 with the shuttle removed.
Figure 30:
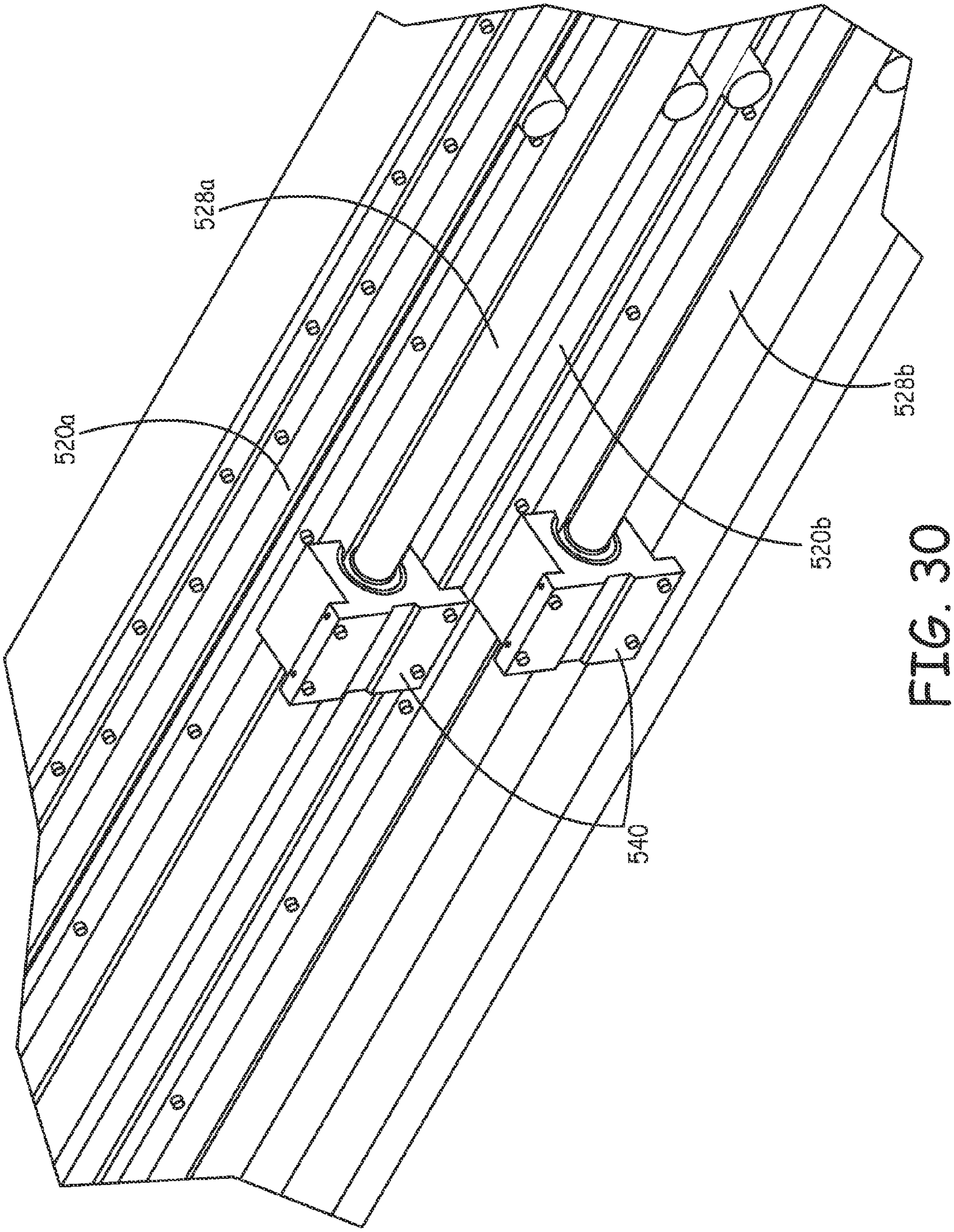
FIG. 30 is a fragmentary enlarged perspective view of the shuttle assembly of FIG. 27.

The shuttle 534 further includes a roller assembly 544 (See FIGS. 27 & 28). The roller assembly 544 is adapted to move axially along the shuttle 534, independently of the shuttle 534. The roller assembly 544 can be in mechanical communication with the first belt 520*a* or the second belt 520*b* of the drive assembly 518. The roller assembly 544 receives a portion of the spacer 16 and applies tension to the spacer 16 as the spacer 16 is being engaged to the applicator assembly 506. The roller assembly 544 is dynamically repositioned along the shuttle 534 based on the position of the tooling 330 of the applicator assembly relative to the spacer 16 to retain tension on the spacer 16 as the un-engaged spacer 16 length shortens. Some embodiments of the technology disclosed herein will not incorporate a roller assembly 544.

Figure 31:
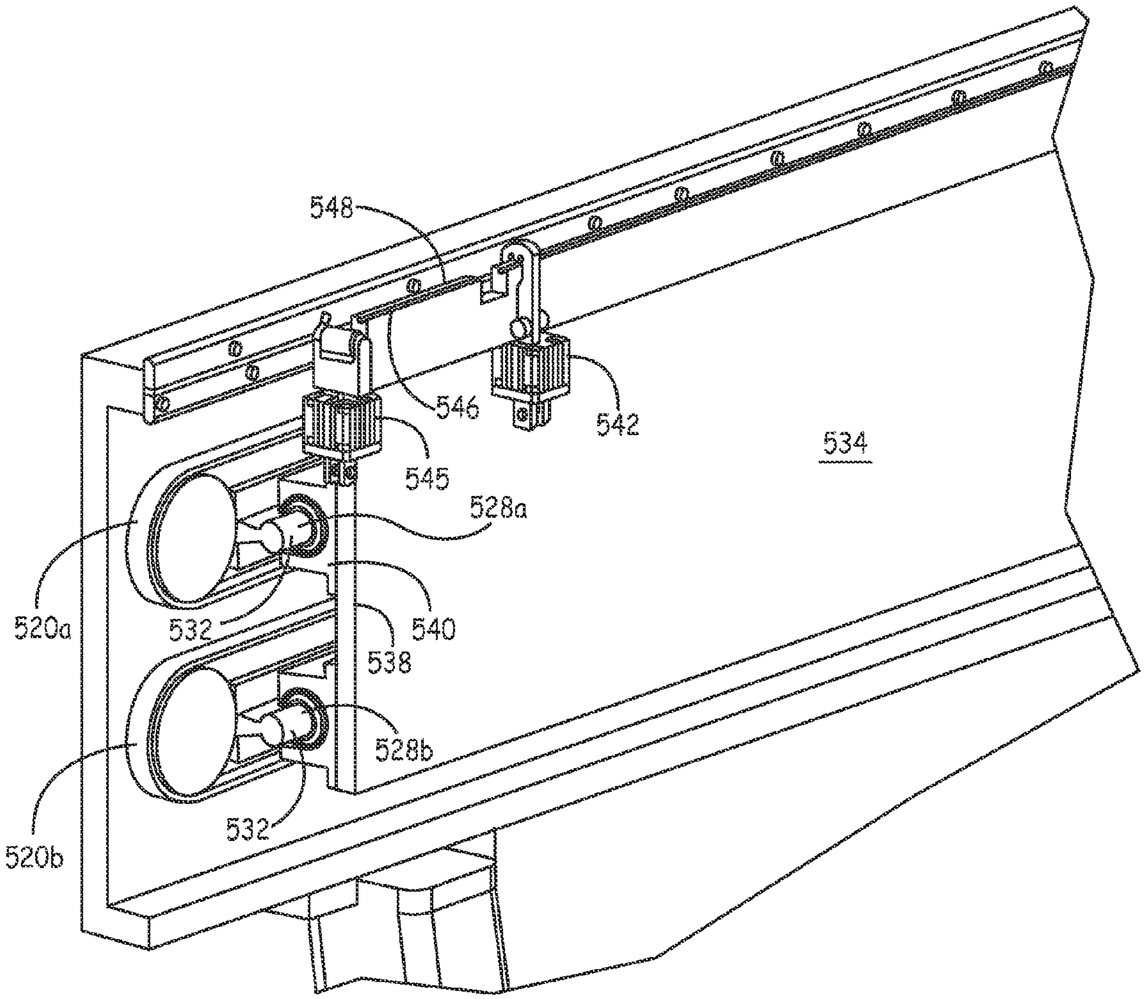
FIG. 31 is a fragmentary enlarged perspective view of the shuttle assembly of FIG. 27.

The shuttle 534 further includes an end roller 545 (See FIG. 31). The end roller 545 is engaged to the second axial end 538 of the shuttle 534. The end roller 545 is adapted to extend and retract. When the end roller 545 is retracted, the uppermost surface of the end roller 545 is disposed below a receiving surface 546 of the shuttle 534 that receives the spacer 16. When the end roller 545 is extended, the uppermost surface of the end roller 545 extends above the receiving surface 546 of the shuttle 534.

In the depicted embodiment, the shuttle 534 defines a groove 548 disposed at the receiving surface 546 of the shuttle 534. In one embodiment, the groove 548 is adapted to receive a bead or dollop of adhesive (e.g., hot melt, etc.) that is disposed on the second surface 42 of the first strip 30 of the spacer 16.

Alternate Spacer Applicator

Figure 32:
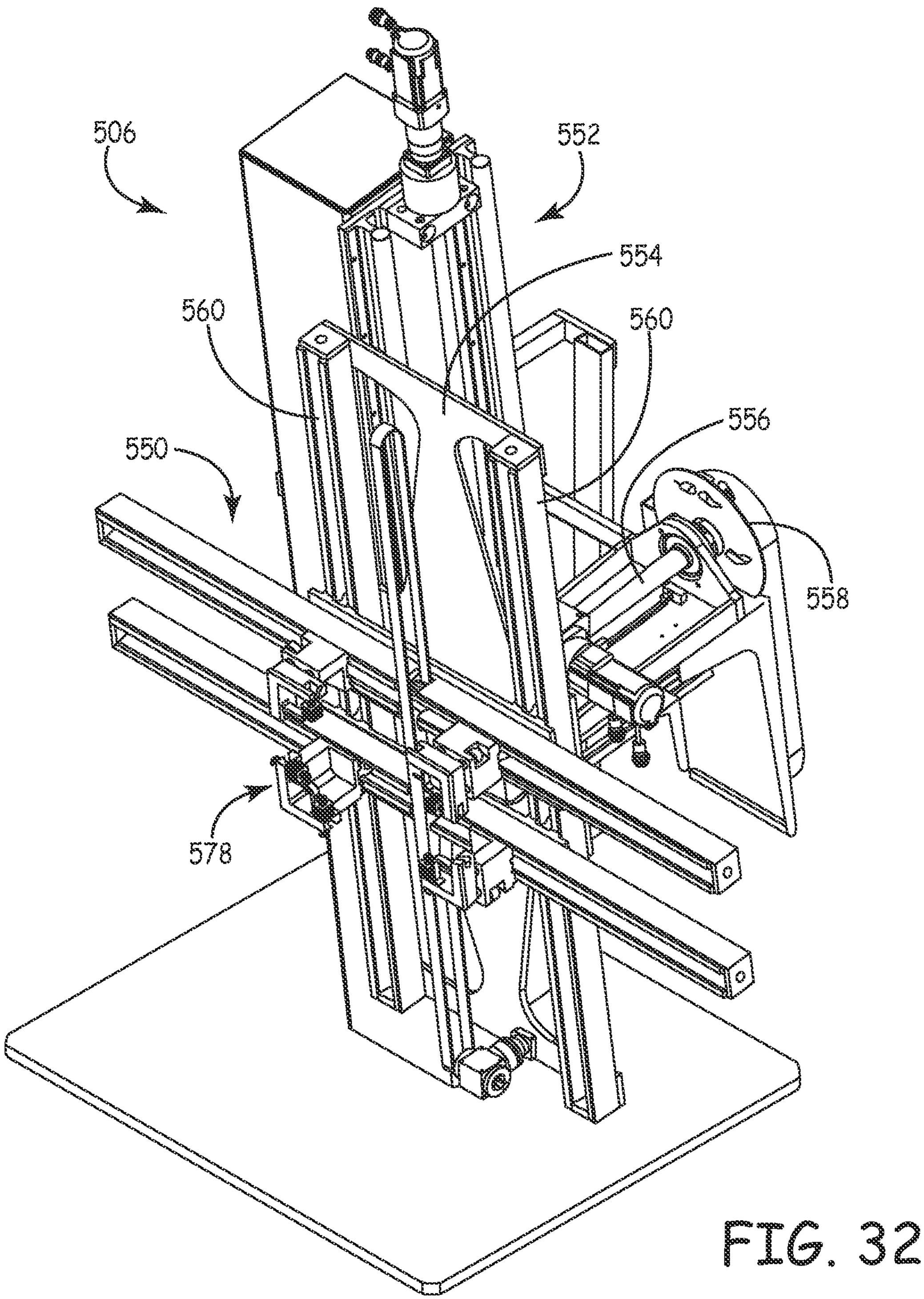
FIG. 32 is a perspective view of an alternate embodiment of an applicator assembly suitable for use with the spacer applicator assembly of FIG. 24.

Referring now to FIG. 32, the spacer applicator 506 is shown. The spacer applicator 506 includes a tooling 550 and a lift assembly 552.

Figure 33:
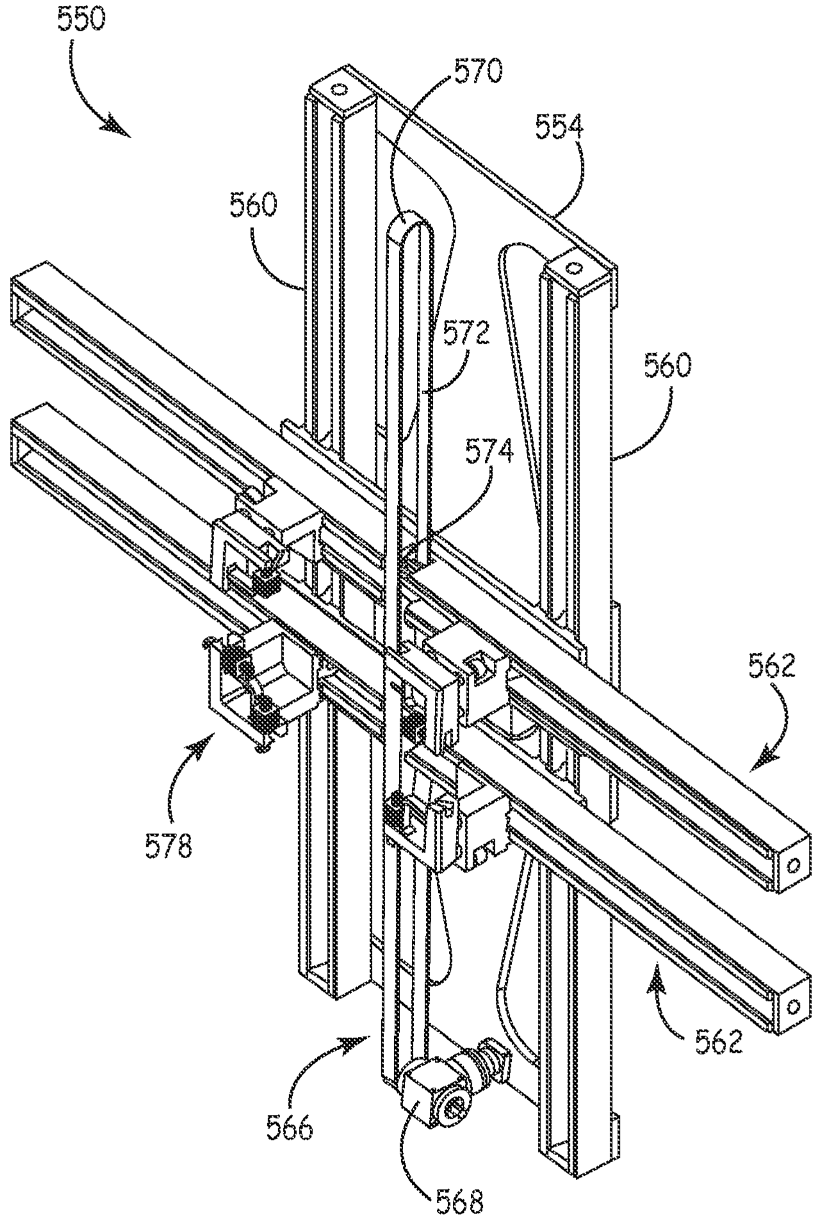
FIG. 33 is a perspective view of an alternate embodiment of spacer applicator tooling suitable for use with the applicator assembly of FIG. 32.
Figure 34:
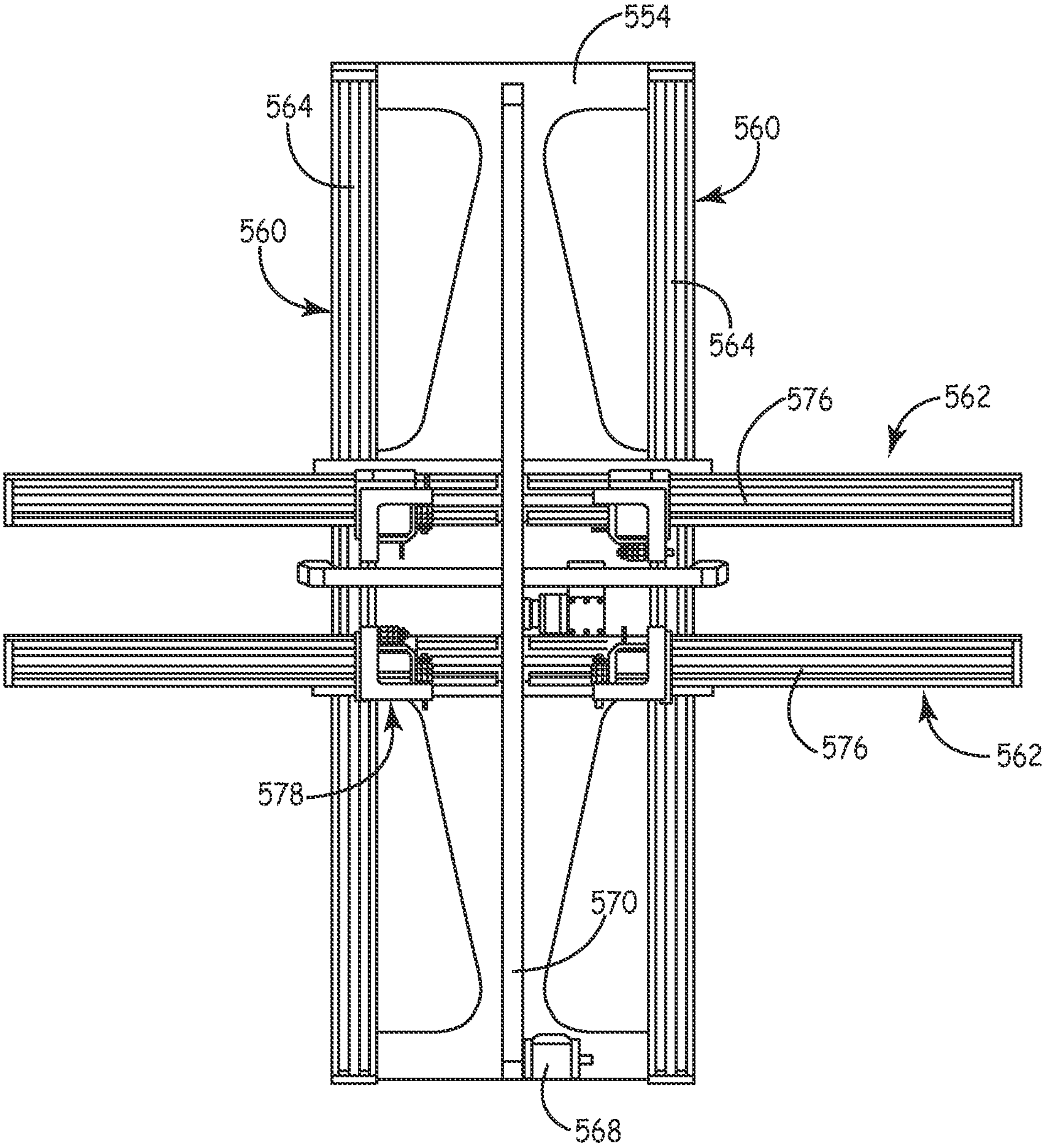
FIG. 34 is a front view of the applicator assembly tooling of FIG. 33.

Referring now to FIGS. 33 and 34, the spacer applicator tooling 550 is shown. The spacer applicator tooling 550 is similar in the spacer applicator tooling 330 of FIG. 15 in structure and function. Therefore, it should be understood that any of the structure of the spacer applicator tooling 330 of FIG. 15 could be applied to the spacer applicator tooling 550 of FIG. 33, and any of the structure of the spacer applicator tooling 550 of FIG. 33 could be applied to the spacer applicator tooling 330 of FIG. 15.

The spacer applicator 506 includes a plate 554. The plate 554 is coupled to a shaft 556 of a motor 558 (shown in FIG. 32) and is adapted to rotate about an axis of the shaft 556.

The spacer applicator tooling 550 further includes a first plurality of guide rails 560 and a second plurality of guide rails 562. In the depicted embodiment, each of the first plurality of guide rails 560 includes a lead screw 564. In the depicted embodiment, the lead screws 564 are threaded rods that are rotatably mounted to the plate 554 of the spacer applicator 506. In the depicted embodiment, the first plurality of guide rails 560 is mounted to the plate 554 in a parallel orientation.

The second plurality of guide rails 562 is threadedly mounted to the lead screws 564 of the first plurality of guide rails 560 so that the second plurality of guide rails 562 can move in a first linear direction and an opposite second linear direction along the lead screws 564. In the depicted embodiment, the second plurality of guide rails 562 is movable by a first actuator assembly 566. The first actuator assembly 566 includes a motor 568 that rotates a belt 570, which is disposed in a loop configuration. The belt 570 includes a plurality of teeth on an inner surface of the belt 570 that is adapted to engage a plurality of teeth disposed on gears 574 of the second plurality of guide rails 562. As the gears 574 rotate, the lead screws 564 of the first plurality of guide rails 560 rotate causing the second plurality of guide rails 562 to move in one of the first and second linear directions. As the belt 570 is actuated in a first direction (e.g., clockwise), a distance between the guide rails 560 increases. As the belt 570 is actuated in a second direction (e.g., counterclockwise), the distance between the guide rails 560 decreases.

Each of the second plurality of guide rails 562 includes a lead screw 576. In the depicted embodiment, the lead screws 576 are threaded rods that are rotatable. A plurality of spacer retention devices 578 is threadedly mounted on the lead screws 576 of the second plurality of guide rails 562 so that the spacer retention devices 578 can move along the second plurality of guide rails 562 when the lead screws 576 are rotated. In the depicted embodiment, the lead screws 576 of the second plurality of guide rails 562 are generally perpendicular to the lead screws 564 of the first plurality of guide rails 560.

Alternate Spacer Retention Devices

Figure 35:
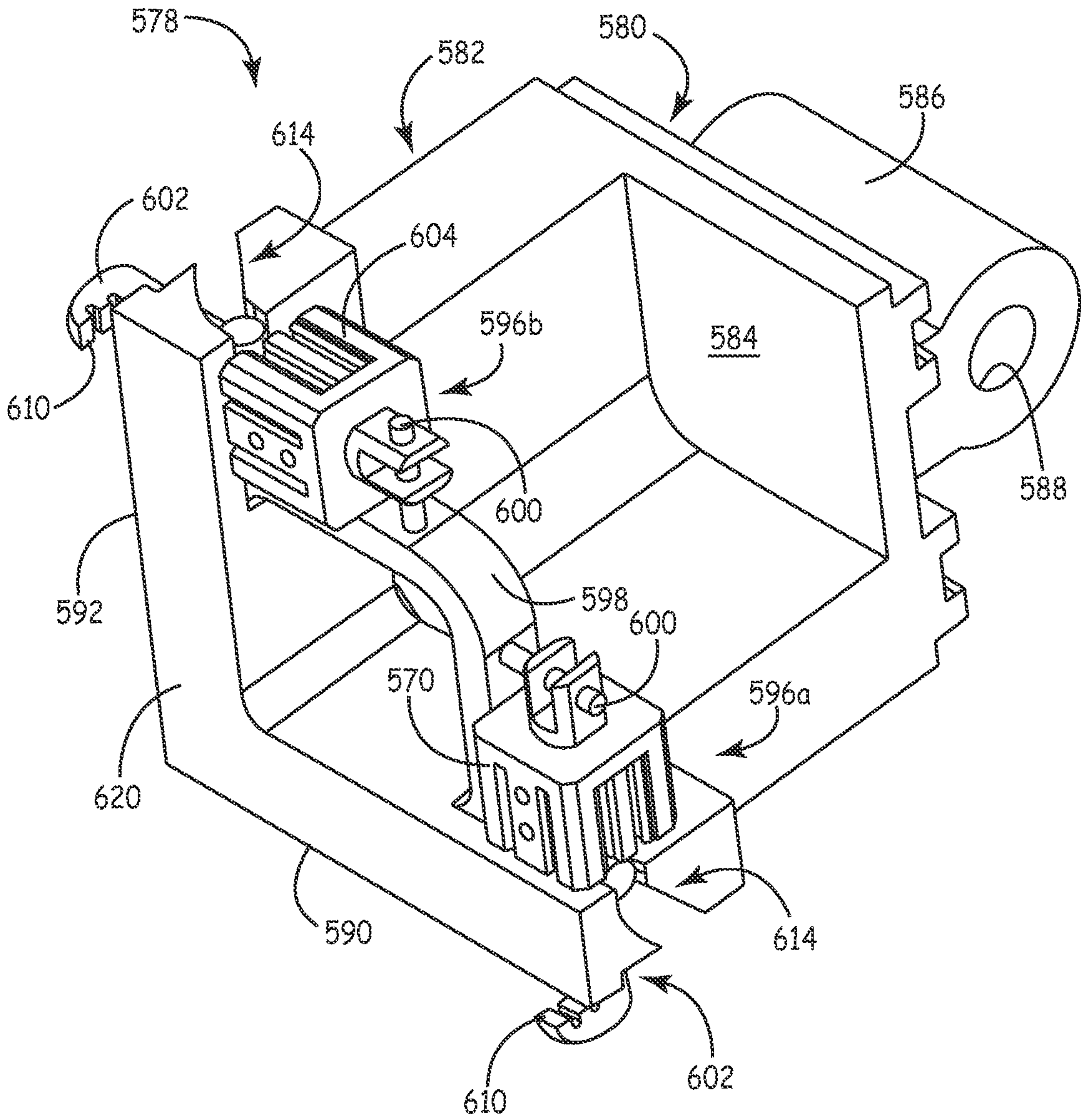
FIG. 35 is a perspective view of an example embodiment of a spacer retention device.

Referring now to FIG. 35, one of the spacer retention devices 578 is shown. The spacer retention device 578 includes a base portion 580 and a guide portion 582. The base portion 580 includes a base 584. A protrusion 586 extends outwardly from the base 584. The protrusion defines an opening 588 that extends longitudinally through the protrusion 586. In the depicted embodiment, the opening 588 is threaded and is adapted to receive one of the lead screws 576 of the second plurality of guide rails 562.

The guide portion 582 includes a first sidewall 590 and an adjacent second sidewall 592. In the depicted embodiment, the first sidewall 590 is disposed at a right angle from the second sidewall 592 so that the first and second sidewalls 590, 592 form an "L" shape. The first and second sidewalls 590, 592 extend outwardly from the base 584 in a direction that is opposite the direction in which the protrusion 586 extends outwardly from the base 584. In the depicted embodiment, the first and second sidewalls 590, 592 are generally perpendicular to the base 584. The first and second sidewalls 590, 592 include an outer edge surface that is adapted to receive the spacer 16, 16', 100 from the spacer feed assembly 504 (See FIG. 27). The guide portion 582 of the spacer retention device 578 includes a plurality of clamp assemblies 596. In the depicted embodiment, a first clamp assembly **596*a* is operatively associated with the outer edge surface of the first sidewall 590 while a second clamp assembly 596*b* is operatively associated with the outer edge surface of the second sidewall 592**.

Each of the first and second clamp assemblies **596*a*, 596*b* are pivotally mounted to the spacer retention device 578 at a rib 598 that extends between the first and second sidewalls 590, 592. In the depicted embodiment, each of the first and second clamp assemblies 596*a*, 596*b* are pivotally mounted to the rib 598 by a pin 600. Each of the first and second clamp assemblies 596*a*, 596*b* includes a clamp arm 602 and an actuator 604. In the depicted embodiment, the actuators 604 of the first and second clamps 596*a*, 596*b* are solenoid actuators. In another embodiment, the actuators 604 of the first and second clamps 596*a*, 596*b*** are pneumatic actuators.

In the depicted embodiment, the clamp arm 602 is generally "L" shaped and includes a clamping surface 610 that is adapted to abut the second surface 42 of the first strip 30 of the spacer 16.

The clamp arm 602 is configured to move between two positions. In a first position, the outer edge surface is unobstructed by the clamp arm 602. In a second position shown in FIG. 35, the clamp arm 602 is positioned adjacent to the outer edge surface to hold a spacer against the outer edge surface.

Lift Assembly

Figure 36:
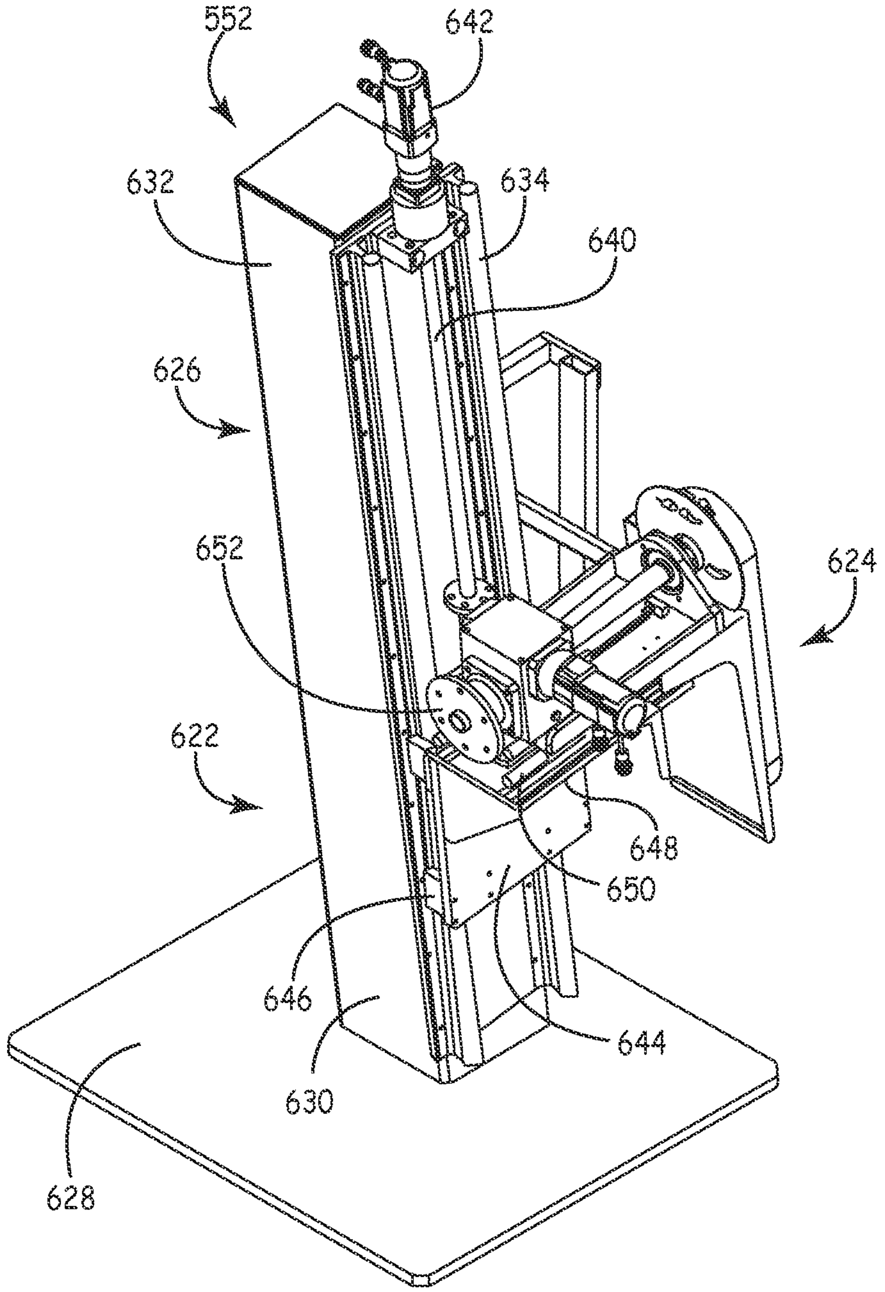
FIG. 36 is a perspective view of an alternate embodiment of a lift assembly suitable for use with the applicator assembly of FIG. 32.
Figure 37:
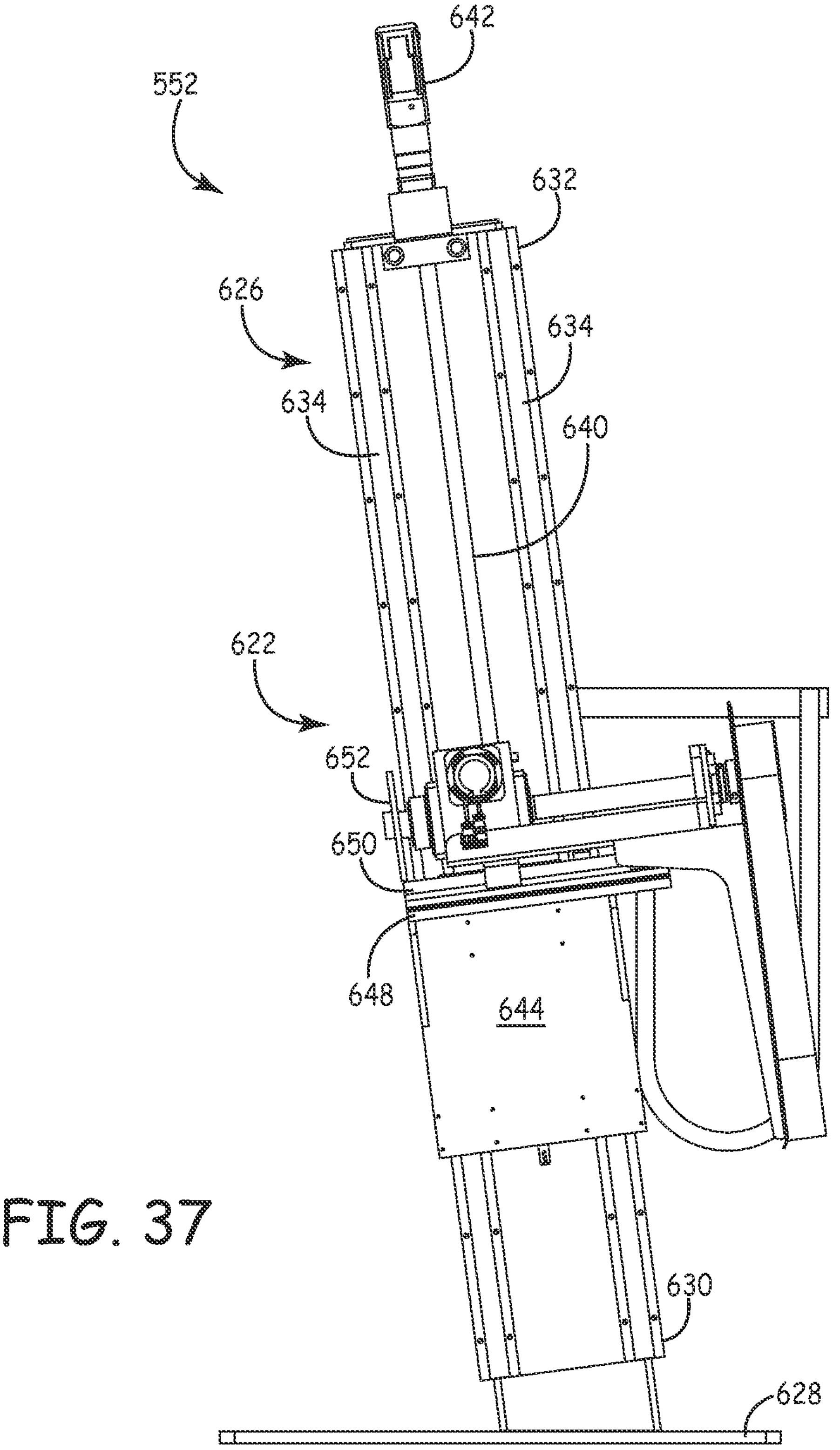
FIG. 37 is a side view of the lift assembly of FIG. 36.
Figure 38:
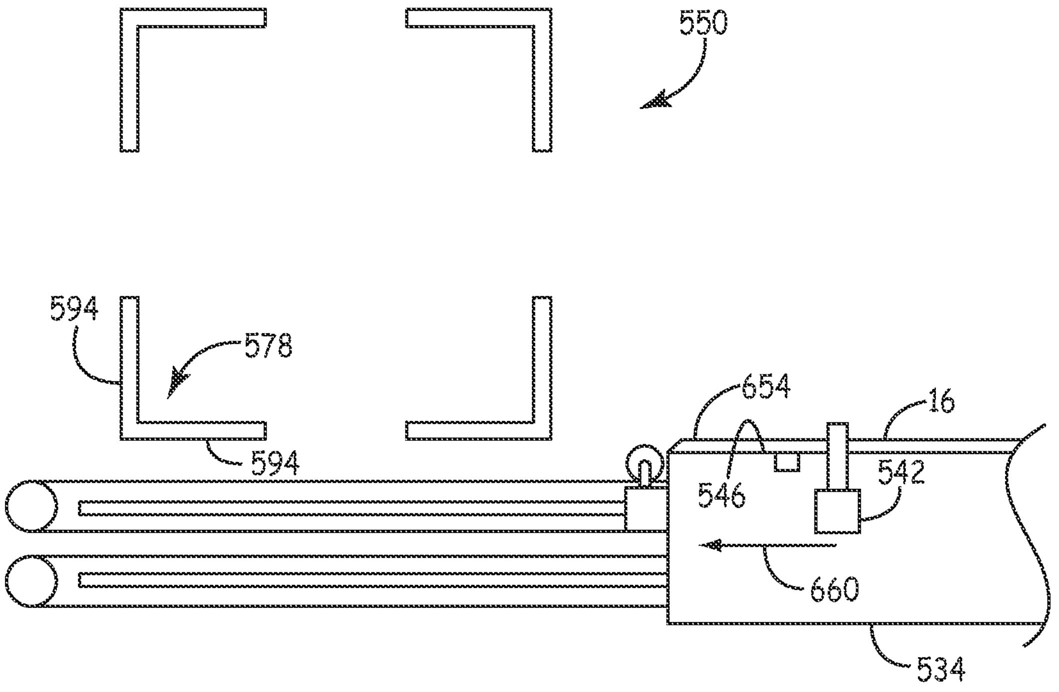
FIGS. 38-42 are schematic representations of a process for applying a spacer to spacer applicator tooling.

Referring now to FIGS. 36-37, the lift assembly 552 is shown. The lift assembly 552 includes a base support 622 and a lift 624.

The base support 622 includes a support portion 626 and a base plate 628. The support portion 626 includes a first end 630 and an oppositely disposed second end 632.

The support portion 626 extends outwardly from the base plate 628. In one embodiment, the support portion 626 extends outwardly from the base plate 628 at an oblique angle.

The support portion 626 includes a first plurality of slide rails 634. The slide rails 634 extend at least partially between the first end 630 and the second end 632 of the support portion 626. The slide rails 634 are generally parallel and are similar in structure to the slide rails 394 previously described.

The support portion 626 further includes a lead screw 640. The lead screw 640 is generally parallel to the slide rails 634. In the depicted embodiment, the lead screw 640 is disposed between the slide rails 634. A motor 642 rotates the lead screw 640. In the depicted embodiment, the motor 642 is disposed at the second end 632 of the support portion 626 and is generally coaxial with the lead screw 640.

The lift 624 is engaged to the base support 622. The lift 624 is adapted to move between the first end 630 and the second end 632 of the support portion 626 of the base support 622 in response to actuation of the motor 642. When the lead screw 640 is rotated in a first direction (e.g., clockwise), the lift 624 moves toward the second end 632, whereas when the lead screw 640 is rotated in a second direction (e.g., counterclockwise), the lift 624 moves toward the first end 630.

The lift 624 includes a mounting plate 644. The mounting plate 644 is engaged to the support portion 626 by a plurality of mounting blocks 646 (See FIG. 36). The mounting blocks 644 define openings that are adapted to receive the slide rails 634 of the support portion 626 so that the mounting blocks 646 can slide relative to the slide rails 634. A shelf 648 is engaged to the mounting plate 644. In the depicted embodiment, the shelf 648 extends outwardly from the mounting plate 644 in a generally perpendicular direction. The shelf 648 includes a second plurality of slide rails 650. The second plurality of slide rails 650 are generally perpendicular to the first plurality of slide rails 634 disposed on the support portion 626 of the base support 622.

A rotary head 652 is mounted on the second plurality of slide rails 650. The rotary head 652 is adapted to rotate the spacer applicator tooling 550 (See FIG. 33). The rotary head 652 is engaged to the plate 554 of the spacer applicator 506 (See FIGS. 33 & 34) through mechanical fasteners (e.g., bolts, weld, etc.). In addition to rotation, the rotary head 652 is adapted to move axially and/or laterally along the second plurality of rail supports 650.

Use of Spacer Applicator

Referring now to FIGS. 38-42, the use of the spacer applicator 506 will be described. With the shuttle 534 in the first position, the spacer 16 is feed onto the receiving surface 546 of the shuttle 534 so that the second surface 42 of the first strip 30 of the spacer 16 abuts the receiving surface 546 of the shuttle 534. In one embodiment, a sensor, which is disposed on an end of the shuttle 534, monitors the position of the spacer 16 on the receiving surface 546. The spacer 16 is positioned so that the notches 210 form corners of the spacer 16 when the spacer applicator tooling 550 is rotated. When the spacer 16 is appropriately positioned on the receiving surface 546, the first clamp 542 is actuated so as to secure a first end 654 of the spacer 16 to the shuttle 534. The shuttle 534 then moves in a first direction 660 (shown as an arrow in FIG. 38) to the second position.

Figure 39:
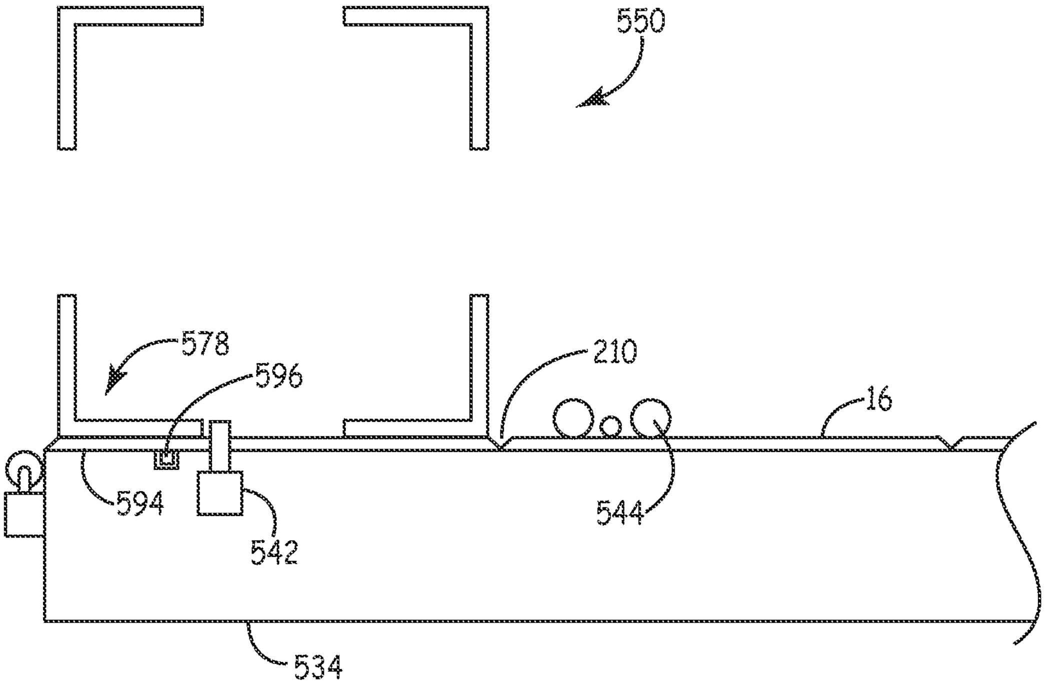

Referring now to FIG. 39, with the shuttle 534 in the second position, the shuttle 534 is adjacent to the spacer applicator tooling 550. The first clamp 542 of the shuttle 534 is actuated so that the spacer 16 is no longer clamped to the shuttle 534. The spacer applicator tooling 550 is positioned so that the outer edge surfaces 594 of two of the spacer retention devices 578 are aligned with the spacer 16 on the shuttle 534. With the outer edge surfaces 594 of the spacer retention devices 578 aligned, the corresponding clamp assemblies 596 of the spacer retention devices 578 are actuated to secure the spacer 16 to the outer edge surfaces 594 of the spacer retention devices 578. In the depicted embodiment, the roller assembly 544 of the shuttle 534 maintains tension on the spacer 16.

Figure 40:
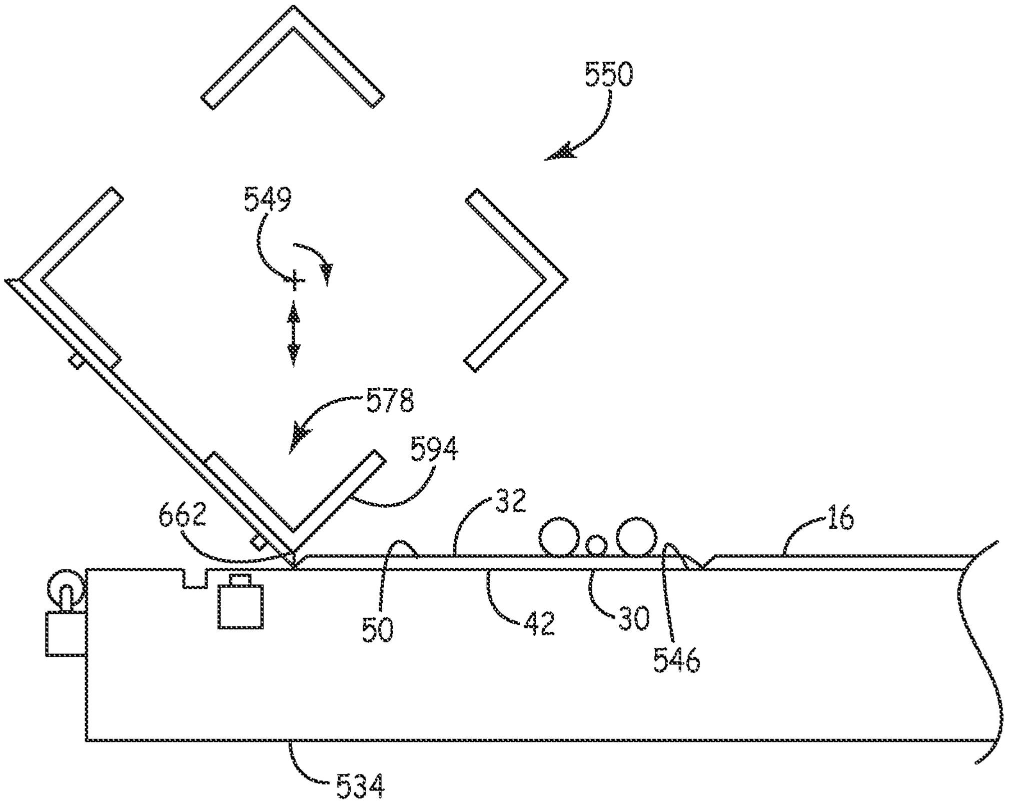

Referring now to FIG. 40, the spacer applicator tooling 550 is rotated around an axis 549 so that the spacer 16 can be secured to the outer edge surfaces 594 of the adjacent spacer retention devices 578. In the depicted embodiment, the spacer applicator tooling 550 is rotated 90 degrees. As the spacer applicator tooling 550 is rotated, the spacer applicator tooling 550 is linearly moved so that a leading edge 662 of the adjacent outer edge surface 594 is disposed in a plane that is parallel to the second surface 50 of the second strip 32 of the spacer 16 as the spacer applicator tooling 550 rotates. This movement of the tooling 550 during rotation of the tooling 550 is a dynamic adjustment of the spacer applicator tooling 550. This dynamic adjustment of the spacer applicator tooling 550 is adapted to maintain or promote contact between the second surface 42 of the first strip 30 of the spacer 16 and the receiving surface 546 of the shuttle 534 prior to engagement of the spacer 16 by the applicator tooling 550. In one embodiment, the corresponding clamp assemblies 596 of the spacer retention devices 578 are actuated to secure the spacer 16 to the spacer retention devices 578.

Figure 41:
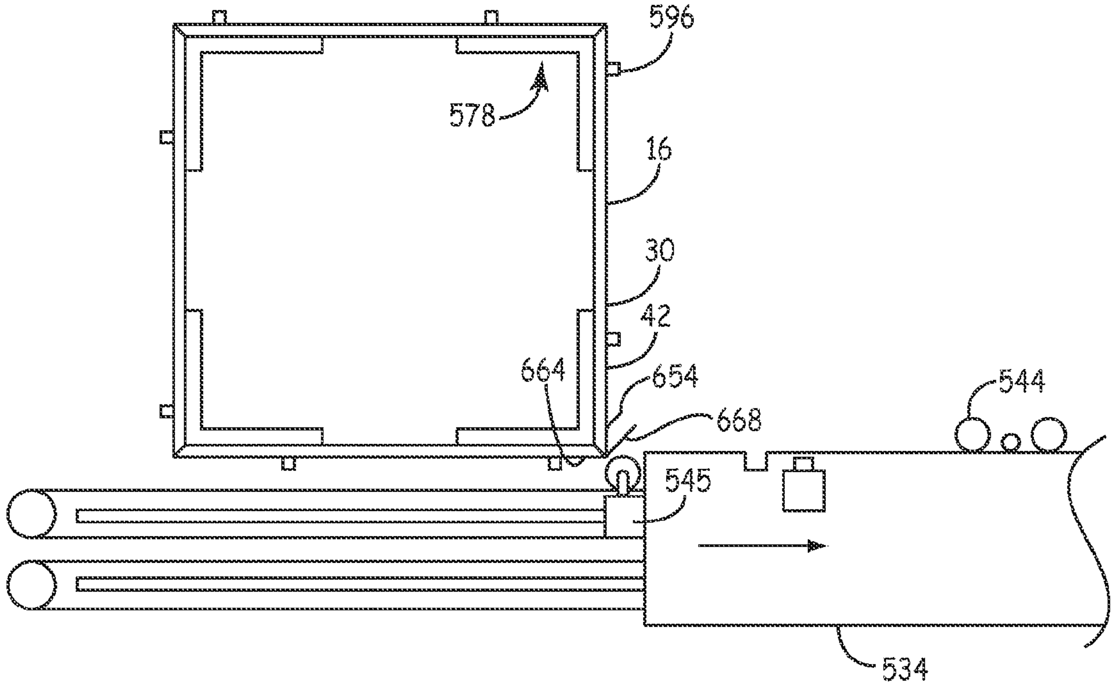
Figure 42:
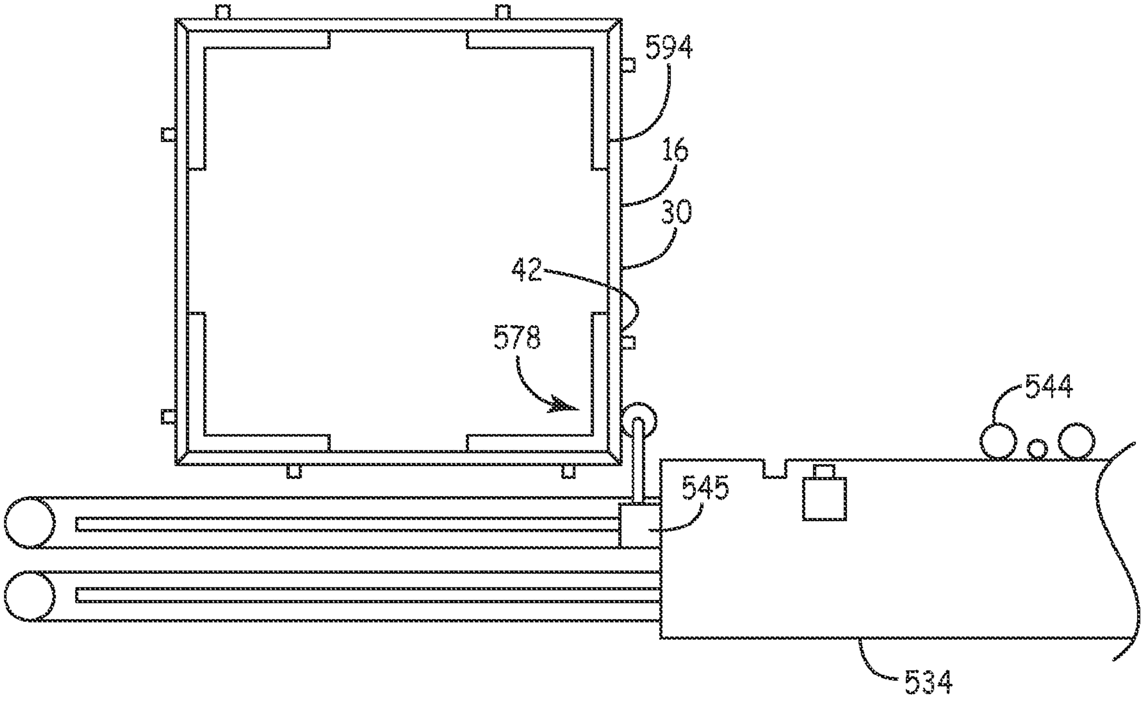

Referring now to FIGS. 41 and 42, the shuttle 534 is retracted toward the first position after the spacer 16 has been secured to the outer edge surfaces 594 of all of the spacer retention devices 578. In one embodiment, a second end 664, which is opposite the first end 654, of the spacer 16 includes a tab 668. The tab 668 is formed from the first strip 30 of the spacer 16. With the spacer 16 disposed about the spacer retention devices 578, the end roller 545 is actuated so that the end roller 545 presses the tab 668 onto the first strip 30 at the first end 654 of the spacer 16. In one embodiment, the second surface 42 of the first strip 30 at the first end 654 of the spacer 16 includes an adhesive that bonds the tab 668 of the first end 654. The end roller 545 is then retracted. The shuttle 534 is then moved to the first position to receive the spacer 16 for the next window assembly 10.

With the spacer 16 disposed about the plurality of spacer retention devices 578, the spacer applicator tooling 550 is moved toward the first or second pane 12, 14 disposed on the stand assembly 502 so that the spacer 16 abuts the first or second pane 12, 14. The clamp assemblies 596 are released and the spacer retention devices 578 are contracted so that the spacer 16 no longer abuts the outer edge surfaces 594 of the spacer retention devices 578. The spacer applicator tooling 550 is moved away from the first or second pane 12, 14. The first or second pane 12, 14 with the spacer 16 advances to a next station where the second or first pane 14, 12 is added. The second or first pane 14, 12 is pressed into abutment with the spacer 16 to form the window assembly 10. In some embodiments, after the window assembly 10 is formed, the window assembly 10 is sent to a station in which a gas is injected into the space between the first and second panes 12, 14.

Figure 43:
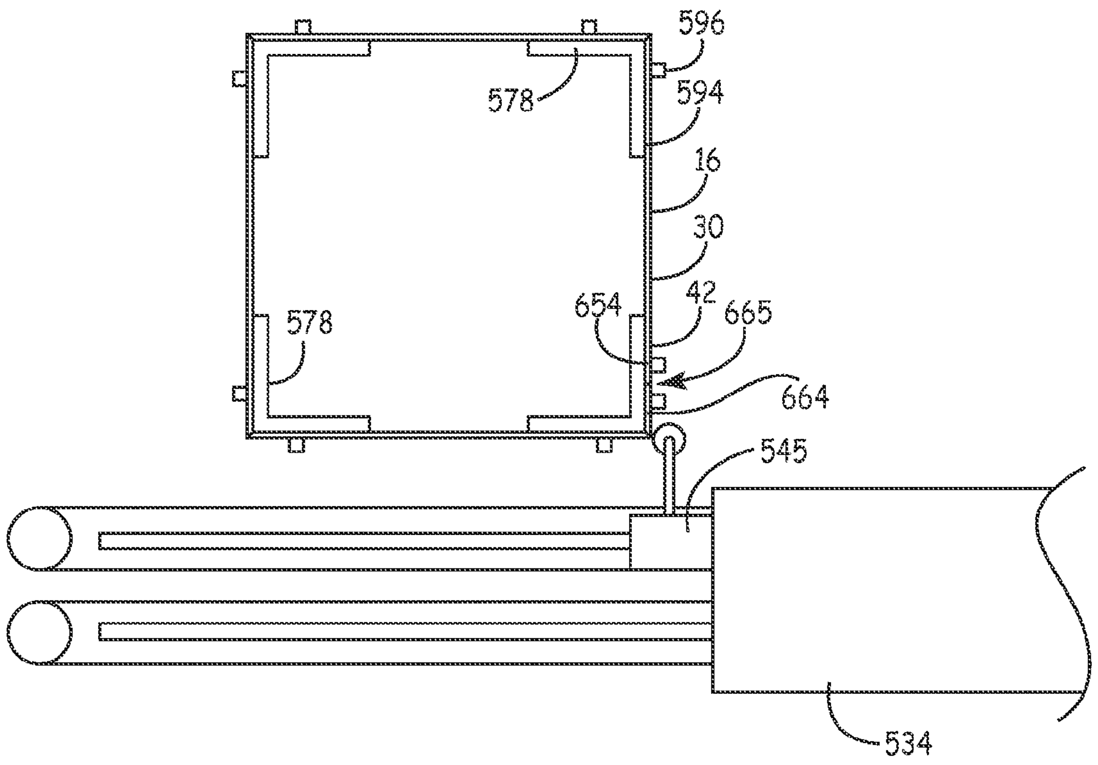
FIG. 43 is a schematic representation of an alternative result to FIG. 42.

FIG. 43 is a schematic representation of an alternative result to that depicted in FIG. 42, based on an alternative method consistent with the technology disclosed herein. In such an embodiment, the joint 665 between the first end 654 of the spacer 16 and the second end 664 of the spacer is offset from the corner of the spacer retention device 578. The first end 654 of the spacer 16 is disposed on the spacer retention device 578 at a particular distance from the corner. Likewise, the second end 664 of the spacer 16, which may or may not include a tab, is also disposed about the spacer retention device 578 to be offset from the corner. In such an embodiment it can be desirable to position a patch over the joint 665 defined by the first end 654 and second end 664 of the spacer 16.

Process

Figure 44:
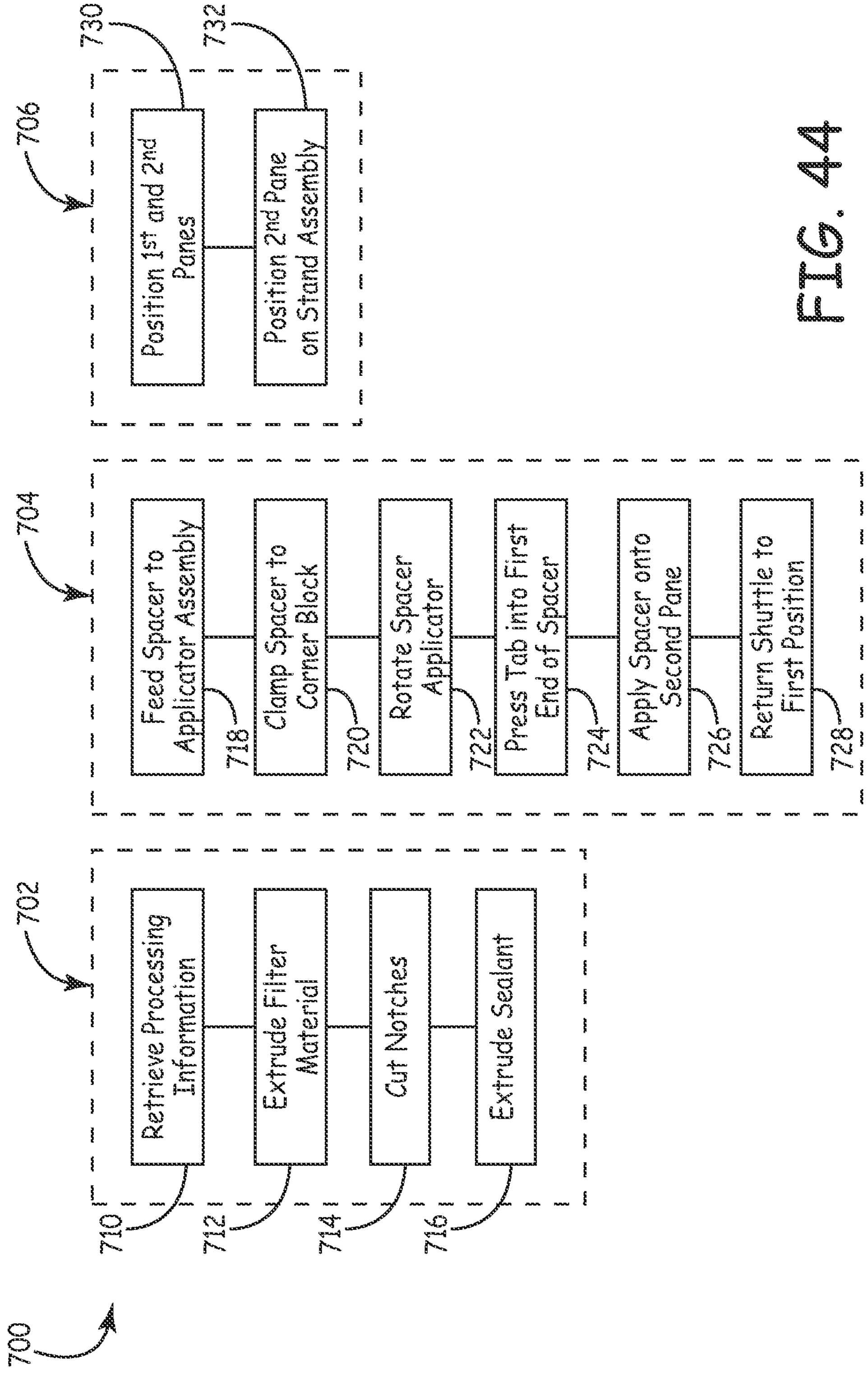
FIG. 44 is a schematic representation of the process of FIG. 6.

Referring now to FIG. 44, a process 700 used to make the window assembly 10 will be described. The process 700 uses the system 200, which has been previously described. In the depicted embodiment, the process 700 is broken up into three functional groups. The first group 702 includes the spacer preparation function, including the cutter/extruder function. The second group 704 includes the spacer frame assembly, including the applicator function. The third group 706 includes the pane-positioning function. Those having skill in the art will recognize that some of the process steps reflected herein can be removed, replaced, and/or switched around and remain consistent with the technology disclosed. In some embodiments, the second group 702 also includes the step of heating the spacer to remove any arcuate shapes before extruding a filler material. In some embodiments, the second group 702 also includes the step of slitting a side wall of the spacer before extruding the filler material. In some embodiments, the second group 702 also includes the step of welding the slit after the step of extruding the filler material.

In the first group 702, processing information regarding the spacer 16 is received by an electronic controller in step 710. In step 712, the filler material is extruded at the filler station 206. In step 714, the corner registration mechanism 208 cuts the notches 210. In one embodiment, the length of the spacer 16 is also cut. In step 716, the sealant extruder 212 extrudes the sealant.

In the second group 704, the spacer 16 is fed to the applicator assembly 506 by the spacer feed assembly 504 in step 718. The shuttle 534 is extended to the second position to feed the spacer 16 to the applicator assembly 506. One of the clamp assemblies 596 of one of spacer retention devices 578 of the applicator assembly 506 clamps the spacer 16 to the outer edge surface 594 of the spacer retention device in step 720.

In step 722, the applicator assembly 506 is rotated so that the spacer 16 is disposed about the spacer retention devices 578. In step 724, the end roller 545 presses the tab 688 of the spacer 16 onto the first strip 30 at the first end 654 of the spacer 16. The spacer 16 is then applied to the second pane 14 in step 726 while the shuttle 534 is returned to the first position in step 728. In some embodiments of the technology disclosed herein, no tab is incorporated into the structure of the spacer. In some embodiments, an end of the spacer 16 is not aligned with the corner of any of the spacer retention devices 578. Instead, a joint 665 (See FIG. 43) between the two ends of the spacer 16 is offset from any corner of the spacer frame. For these embodiments, an end portion of the spacer can be pressed toward the other end of the spacer by the end roller 545 to complete perimeter of the spacer frame.

In the third group 706, the first and second panes 12, 14 are moved into position for assembly in step 730. The second pane 14 is positioned on the stand assembly 502 in step 732. Pane positioning technology is generally known in the art. Many different types of pane positioning equipment can be used with the systems described herein, such as equipment available from GED Integrated Solutions, Twinsburg, Ohio, USA and from LiSEC Group of Companies, Hausmening, Austria.

In one embodiment, two panes move along an assembly line sequentially toward a spacer applicator, destined to be joined together in a double pane window assembly. The first pane moves past a spacer applicator assembly. In one embodiment, that first pane is stopped at a next station and is secured to a pane positioning device. In one embodiment, a suction device is used to secure the first pane. In another embodiment, a clamping device acting on the edges of the first pane is used to secure the first pane instead of a suction device. Meanwhile, the second pane in the sequence is stopped at the spacer applicator assembly, where a spacer frame complete with sealant is assembled and attached to the second pane, forming a pane and spacer frame subassembly. Then the pane and spacer frame subassembly is moved along the assembly line toward the first pane. The pane positioning device brings the first pane into contact with the pane and spacer frame subassembly to form a double pane window assembly.

Figure 45:
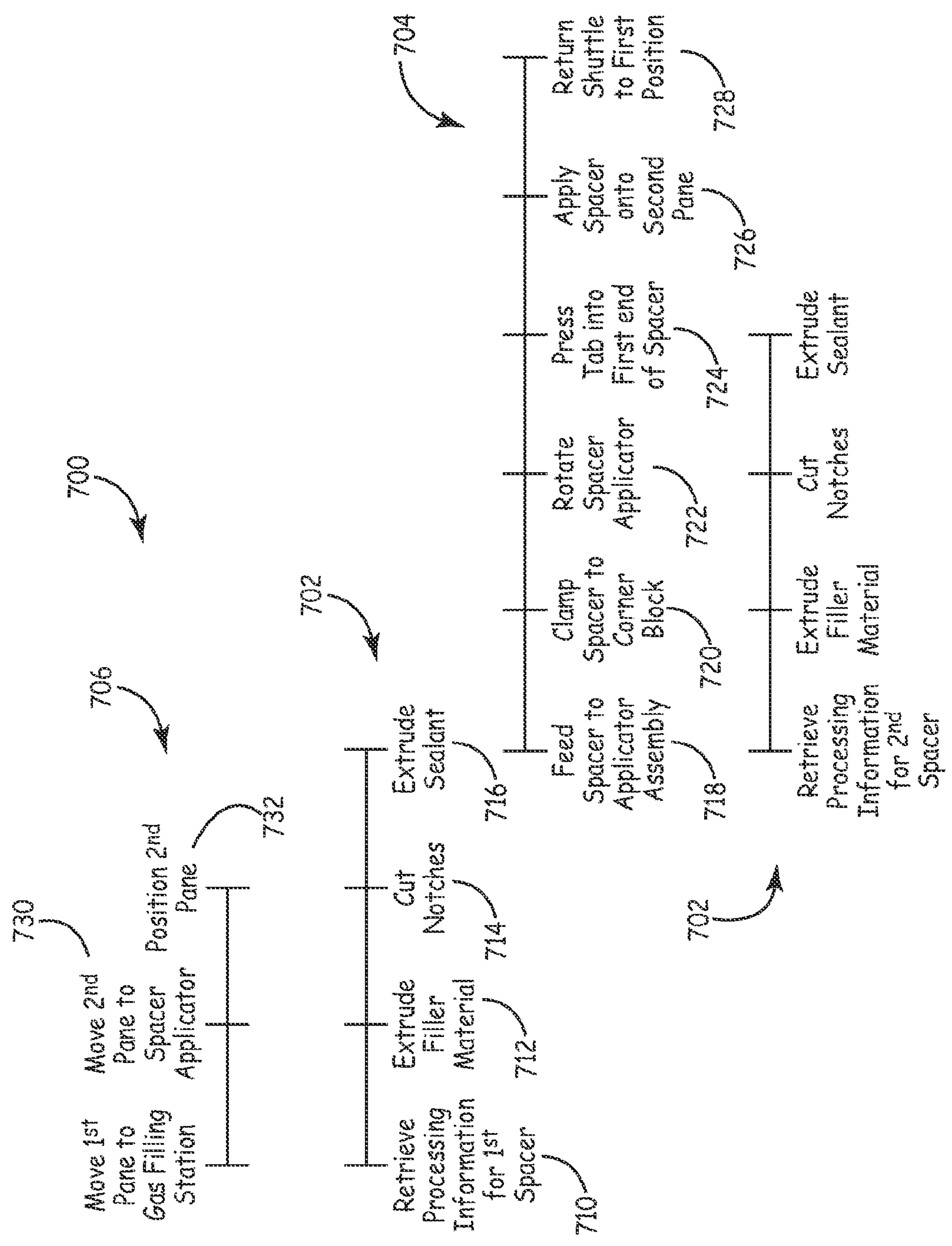
FIG. 45 is a schematic representation of the process of FIG. 44.

Referring now to FIGS. 44 and 45, the occurrence of many of these process steps described herein can overlap and occur simultaneously in an automated fashion. For example, as the second group 704 is shaping a first spacer 16 for a first window assembly, the first group 702 can be preparing a second spacer 16 for a second window assembly 10. After the first spacer 16 has been applied to the first or second pane 12, 14, the third function 706 can be positioning the first and second panes 12, 14 for application of the second prepared spacer 16. A pane positioning device, one or more pane preparation devices, and an automated spacer applicator assembly are configured to operate substantially simultaneously in some embodiments. This overlap of functions can decrease the overall cycle time of the spacer applicator assembly 500. Examples of spacer preparation devices include the heater, the corner registration mechanism, the filler applicator, the sealant extruder, and the cutter. In such an embodiment, many components can operate on the same length of spacer, or on different lengths of spacers. In one particular embodiment, the corner registration mechanism, filler applicator, sealant extruder and cutter are configured to operate substantially simultaneously on the same length of spacer.

Triple Pane

Figure 46:
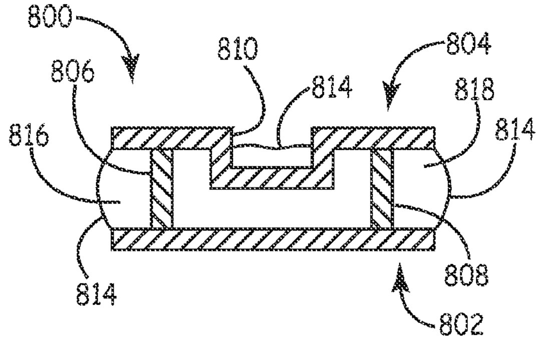
FIG. 46 is a cross-sectional view of an alternate embodiment of a spacer.

Referring now to FIG. 46, an alternate embodiment of a spacer 800 is shown. The spacer 800 includes a first strip 802 of material and a second strip 804 of material. The spacer 800 further includes a first sidewall 806 and a second sidewall 808. The first and second sidewalls 806, 808 extend between the first strip 802 and the second strip 804.

The second strip 804 defines a channel 810 that extends longitudinally along the second strip 804. The channel 810 is adapted to receive a third pane 812 (shown in FIG. 47), which is generally the middle pane in a triple pane window assembly. In the depicted embodiment, the channel 810 is disposed between the first and second sidewalls 806, 808. Some materials and configurations described earlier in this application for other spacer embodiments can be similar or the same to spacer configurations consistent with a triple pane spacer embodiment. In the depicted embodiment of FIG. 46, a sealant 814 is disposed in the channel 810. The sealant 814 is adapted to seal the joint formed between the spacer 800 and the third pane 812. Sealants suitable for use in the channel 810 include polyisobutylene (PIB), butyl rubber, curable PIB, silicone, adhesive for example acrylic adhesives, sealant for example acrylic sealants, and other Dual Seal Equivalent (DSE) type materials.

In the depicted embodiment of FIG. 46, the sealant 814 is also disposed at a first side 816 of the spacer 800 and an oppositely disposed second side 818 of the spacer 800. The sealant 814 at the first and second sides 816, 818 is adapted to bond the spacer 800 between the first and second panes 12, 14.

Figure 47:
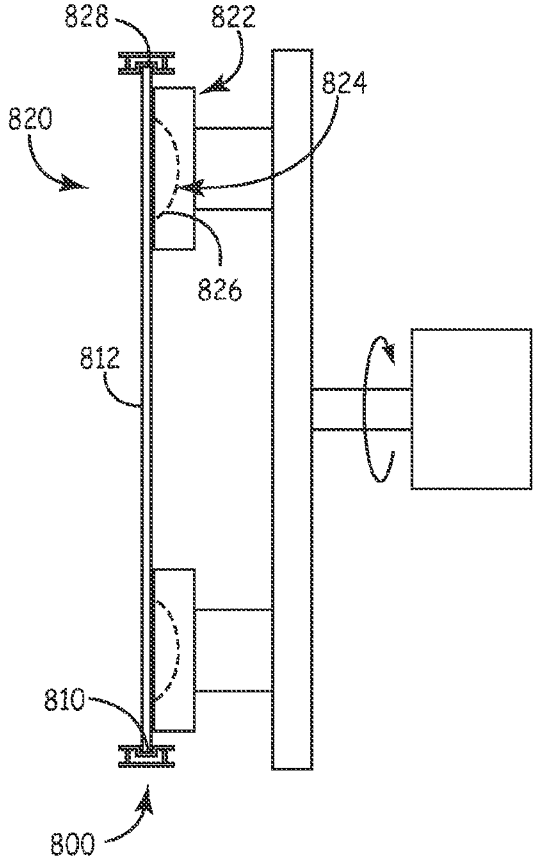
FIG. 47 is a schematic representation of an alternate embodiment of tooling of a spacer applicator.

Referring now to FIG. 47, an alternate embodiment of the spacer applicator 820 is shown. It will be understood that the spacer applicator tooling 820 can include any of the features or structures of the previously described spacer applicator tooling 330, 550.

In the depicted embodiment, the spacer applicator tooling 820 includes a plurality of pane retention devices 822 that are adapted to receive the third pane 812. In one embodiment, the pane retention devices 822 are interchangeable with the spacer retention devices 348, 578. The spacer applicator tooling 820 is adapted engage the spacer 800 to the third pane 812 and to assemble the third pane 812 to one of the first and second panes 12, 14.

In one embodiment, each of the pane retention devices 822 includes a suction device 824 for securing the third pane 812 to the spacer applicator tooling 820. In some embodiments, a plurality of suctions devices can be incorporated in the system. In one embodiment, the suction device 824 or the tooling 820 includes a mount 826. In one embodiment, the pane retention device 822 has a single suction device. Other pane retention devices 822 can also be used, such as one or more clamps at perimeter locations on the pane. Such clamps can be controlled to release from an edge of the pane in order to allow the spacer to be applied to that edge, and then to clamp to that edge after the spacer is applied. Another option is retention devices that clamp by exerting opposing forces on each side of a central portion of the pane. The mount 826 is adapted to receive the third pane 812. In a variety of embodiments the mount 826 is rotatable. In one embodiment, suction secures the third pane 812 to the mount 826. In another embodiment, the suction is generated by a vacuum generating device. Another example of pane retention devices is shown in the co-owned provisional application titled TRIPLE PANE WINDOW SPACER HAVING A SUNKEN INTERMEDIATE PANE, filed on the even date herewith Ser. No. 61/716,915, which is hereby incorporated by reference in its entirety herein. In one embodiment, the pane retention devices have a faceplate that can be changed in order to convert them to spacer retention devices for use with a double-pane assembly system.

With the third pane 812 secured to the mount 826 of the spacer applicator tooling 820, the spacer feed assembly 504 positions the spacer 800 so that an edge 828 of the third pane 812 is aligned adjacent to the channel 810 in the spacer 800. The sealant 814 in the channel 810 bonds the spacer 800 to the third pane 812. As the spacer applicator mount 826 rotates, the spacer 800 is wrapped about the edge 828 of the third pane 812. A rotary actuator assembly is coupled to the mount 826 in a variety of embodiments, and is configured to rotate the mount 826 about an axis. Features of the rotation and control process described herein with respect to various spacer applicator devices also apply to the applicator 820.

With the spacer 800 disposed about the edge 828 of the third pane 812, the spacer applicator tooling 820 and, therefore, the mount 826, is linearly actuated to engage the first side 816 of the spacer 800 to the first pane 12. In a variety of embodiments, the mount 826 is linearly actuated in a direction generally perpendicular to its rotation axis.

Generally, the rotation of the mount 826 undergoes to wrap the spacer 800 around the perimeter of the third pane 812 will be referred to as a "cycle." In one embodiment the mount 826 can be configured to rotate no more than about 270 degrees to complete a cycle.

In one embodiment, the mount is rotated less than 360 degrees to complete a cycle. In another embodiment, the mount 826 is configured to rotate about 360 degrees to complete a cycle.

In some embodiments the mount 826 can further be configured to reverse-rotate after completing one or more cycles. Some of those embodiments can use the reverse-rotation to wrap a second spacer around the perimeter of another third pane. In such embodiments the next third pane will be mounted to the applicator tooling 820 as preparation for the reverse-rotation cycle, and a second spacer will be fed to the spacer applicator 820 on the opposite side of the spacer applicator 820 compared to the first spacer.

In a variety of embodiments, the mount 826 is configured to rotate continuously in a single direction, or in two directions. In embodiments where the mount 826 is configured to rotate continuously in a single direction, rotating couplers can be used to couple the mount 826 to various source points such as power, pressure, signals, and the like, as discussed with reference to FIGS. 12, 15-17 and 19, above.

The sealant 814 at the first side 816 of the spacer 800 bonds the spacer 800 to the first pane 12. At another station, the second pane 14 is bonded to the second side 818 of the spacer 800 by the sealant 814 at the second side 818 of the spacer 800.

Alternative spacer configurations to the spacer 800 of FIG. 46 can be used with the method for forming a triple pane window described herein. For example, a triple pane spacer may not have a channel. In one embodiment, a registration ridge is present on the spacer in place of a channel.

Alternate Spacer Applicator

Figure 48:
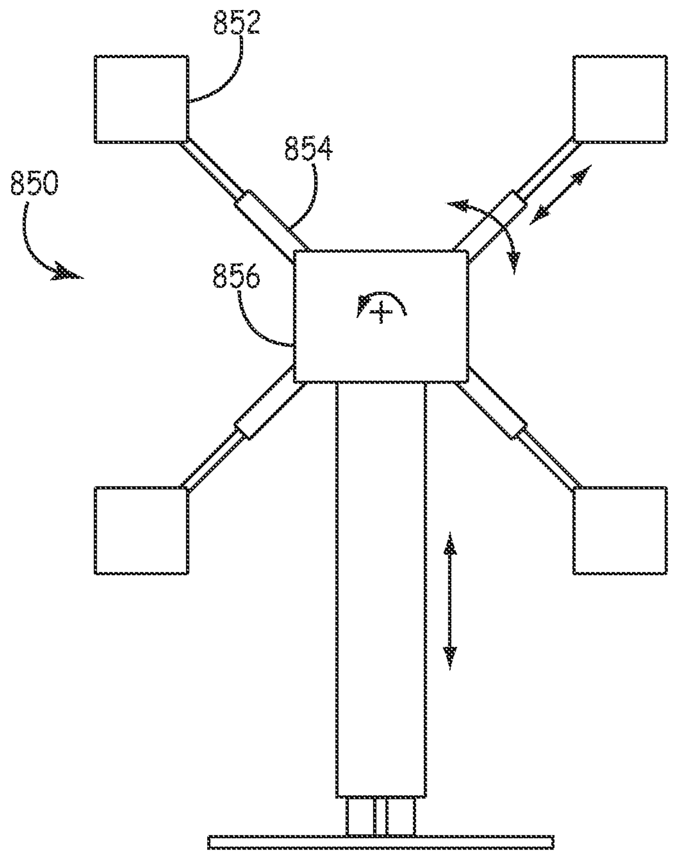
FIG. 48 is a schematic representation of an alternate embodiment of a spacer applicator.

Referring now to FIG. 48, a schematic representation of an alternate embodiment of spacer applicator tooling 850 is shown. It will be understood that the spacer applicator tooling 850 can include any of the features or structures of the previously described spacer applicator tooling 330, 550, 820. The spacer applicator tooling 850 includes a plurality of spacer retention devices 852. The spacer retention devices 852 are engaged to plurality of rails 854 that extends radially outward from a plate 856. In one embodiment, each of the rails 854 can extend or retract and can pivot about an axis in order to adjust the placement of the spacer retention devices 852 to accommodate different window pane sizes. In another embodiment, the spacer retention devices 852 move along the rails 854 to adjust the placement of the spacer retention devices 852.

Example Spacer Applicator Tooling

FIGS. 49-55 depict a variation in spacer applicator tooling. Such tooling is generally configured to shape a spacer 900, and retain the shape of the spacer 900 consistently with the shape of a corresponding window pane to which the spacer will be applied. Each of the figures depicts a spacer 900 disposed adjacent to the tooling of the spacer applicator, where the spacer applicator tooling includes a first plurality of guide rails 920 and a second plurality of guide rails 910, similar to the embodiment description associated with FIG. 15. Other configurations are also contemplated, as will be appreciated by those having skill in the art.

Figure 49:
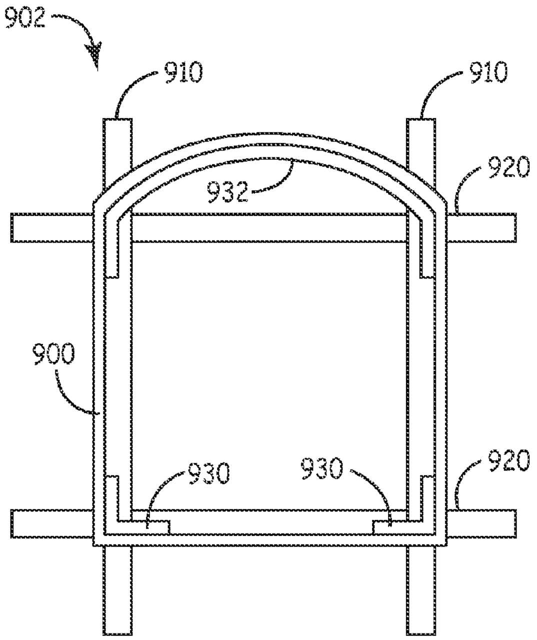
FIG. 49 is a schematic of a window spacer and applicator tooling configured to accommodate a window having a non-rectangular shape.

FIG. 49 is a schematic of a window spacer frame surrounding applicator tooling configured to accommodate a window having a non-rectangular shape. In this particular embodiment, the spacer applicator tooling 902 has a first spacer retention device 932 that defines a curved top edge for retaining a similar shape of a spacer 900 disposed thereon. Two corner spacer retention devices 930 define bottom corner structures for retaining the bottom corner shapes of a spacer 900 disposed thereon.

Figure 50:
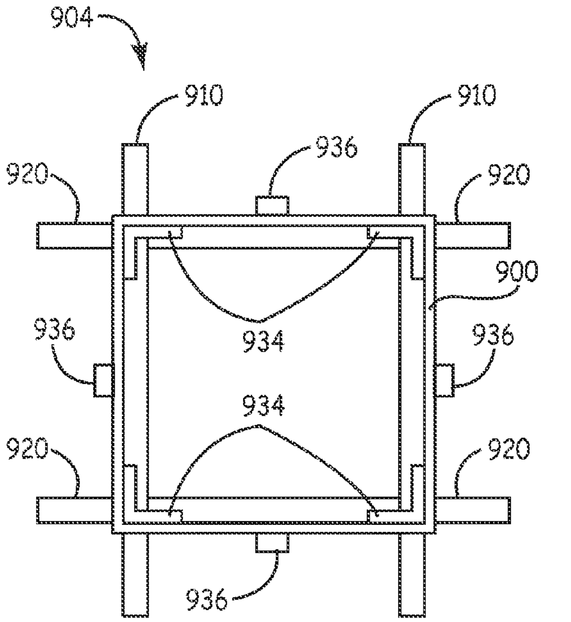
FIG. 50 is a schematic of a window spacer and applicator tooling configured to accommodate a window having a rectangular shape with four supports.

FIG. 50 is a schematic of a window spacer frame surrounding applicator tooling configured to accommodate a window having a rectangular shape. In this particular embodiment, the spacer applicator tooling 904 has four spacer retention devices 934 defining corner locations for retaining corner shapes of a spacer 900 disposed thereon. Additionally, the spacer applicator tooling 904 has four additional spacer retention devices 936 further defining a retaining structure for the sides of the spacer 900 extending between the corners.

Figure 51:
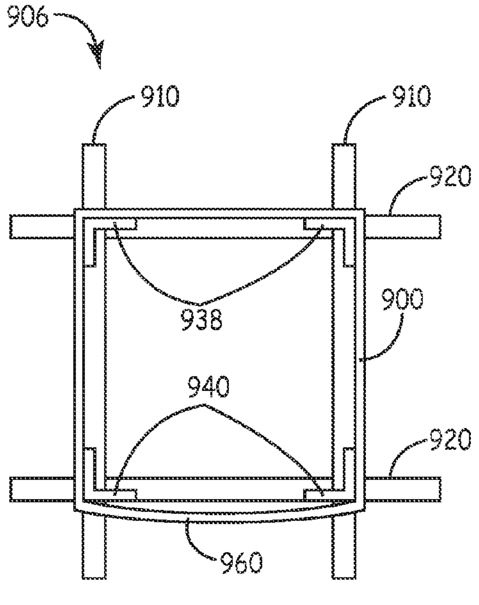
FIG. 51 is a schematic of a window spacer and applicator tooling configured to accommodate a window having a trapezoidal shape.

FIG. 51 is a schematic of a window spacer frame surrounding applicator tooling configured to accommodate a window having a non-rectangular shape. In this particular embodiment, the spacer applicator tooling 906 has four spacer retention devices 938, 940 defining corner structures for retaining the shape of a spacer 900 disposed thereon. However, the spacer 900 disposed between the two bottom spacer retention devices 940 can allow for spacer curvature 960 along the bottom of the spacer 900 shape. Such a configuration can be implemented by, for example, reducing the spacer tension along that segment of the spacer 900 while applying the spacer to the applicator tooling 906 between the bottom spacer retention devices 940. Other techniques can also be used.

Figure 52:
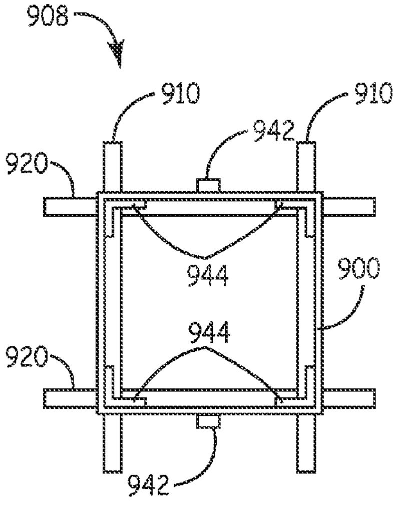
FIG. 52 is a schematic of a window spacer and applicator tooling configured to accommodate a window having a rectangular shape with two supports.

FIG. 52 is a schematic of a window spacer frame surrounding applicator tooling configured to accommodate a window having a rectangular shape. In this particular embodiment, the spacer applicator tooling 908 has a total of eight spacer retention devices 942, 944. Four spacer retention devices 944 define corner structures for retaining similar corner shapes of a spacer 900 disposed thereon. Two additional spacer retention devices 942 define the horizontal sides extending between pairs of corner spacer retention devices 940 to assist in retaining the shape of a spacer 900 disposed thereon.

Figure 53:
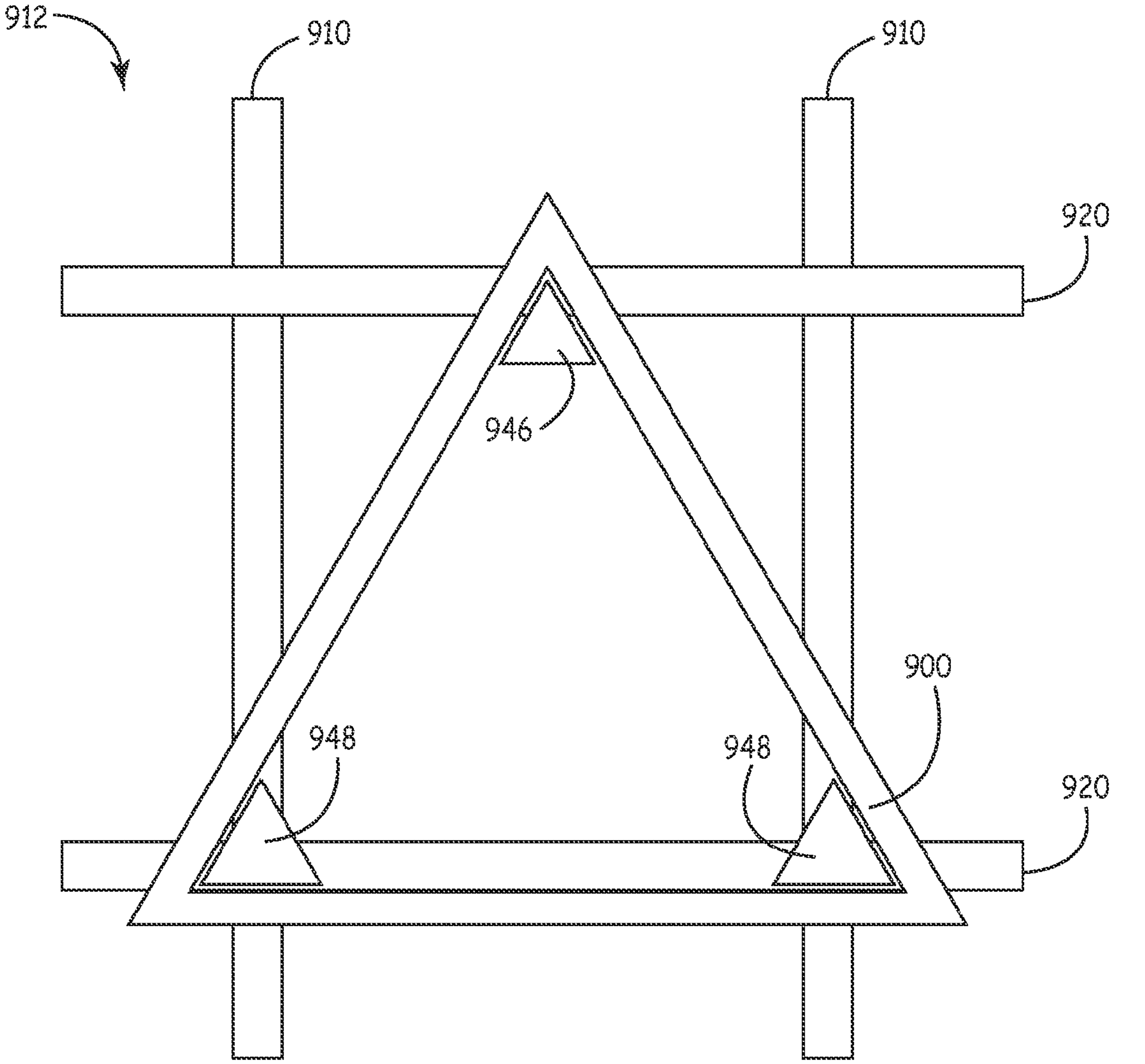
FIG. 53 is a schematic of a window spacer and applicator tooling configured to accommodate a window having a triangular shape.

FIG. 53 is a schematic of a window spacer frame surrounding applicator tooling configured to accommodate a window having a triangular shape. In this particular embodiment, the spacer applicator tooling 912 has three spacer retention devices 946, 948. Each spacer retention device 946, 948 defines a corner structure for retaining a similar shape of a spacer 900 disposed thereon. The geometry of each spacer retention device 946, 948, including defined angles and lengths can largely depend on the particular window shape, the desired shape of the spacer 900, and the level of support needed to retain the spacer 900 in the particular shape.

Figure 54:
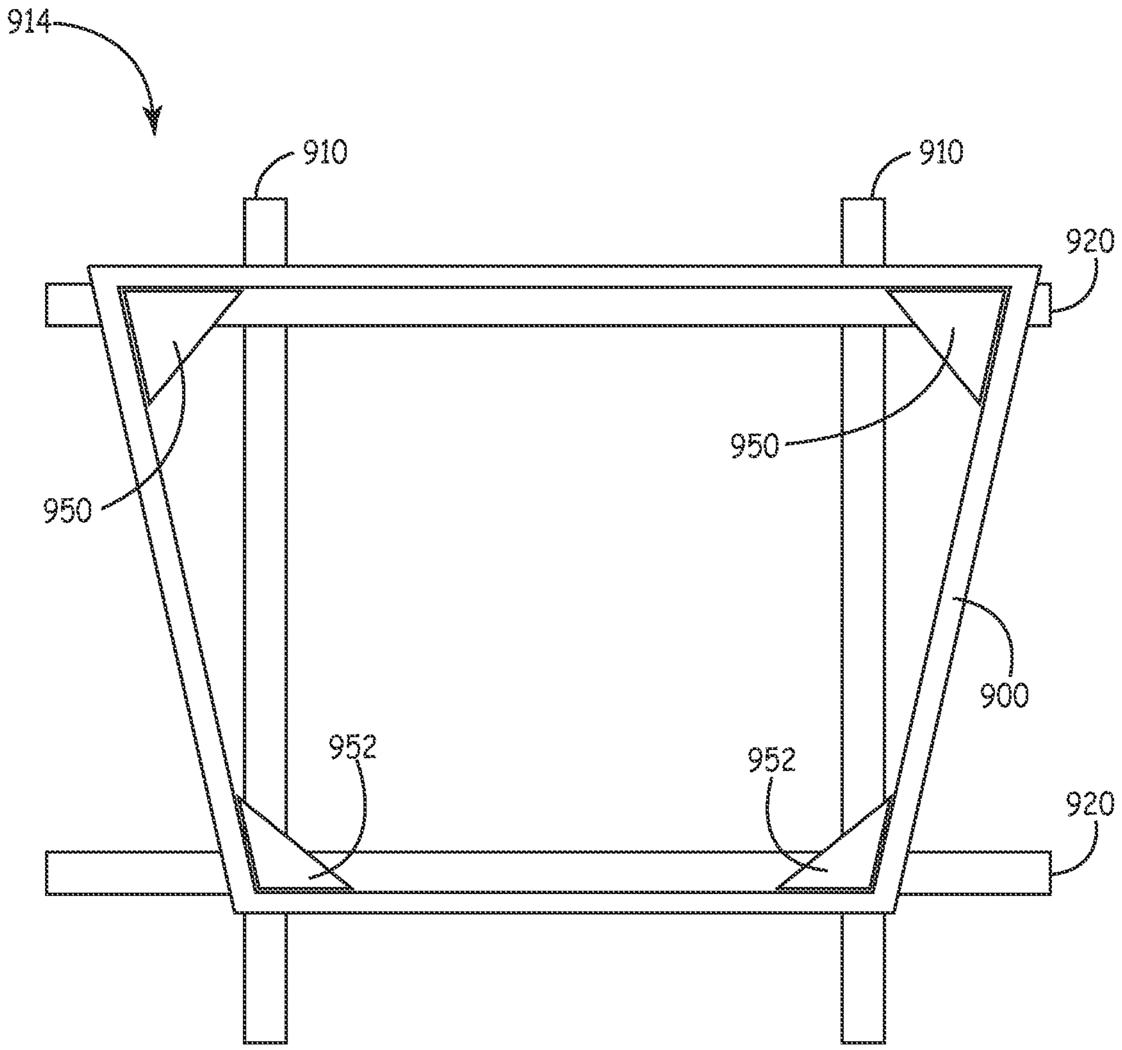
FIG. 54 is a schematic of a window spacer and applicator tooling configured to accommodate a window having another non-rectangular shape.

FIG. 54 is a schematic of a window spacer frame surrounding applicator tooling configured to accommodate a window having a trapezoidal shape. In this particular embodiment, the spacer applicator tooling 914 has four spacer retention devices 950, 952. Each spacer retention device 950, 952 defines a corner structure for retaining a similar shape of a spacer 900 disposed thereon.

Figure 55:
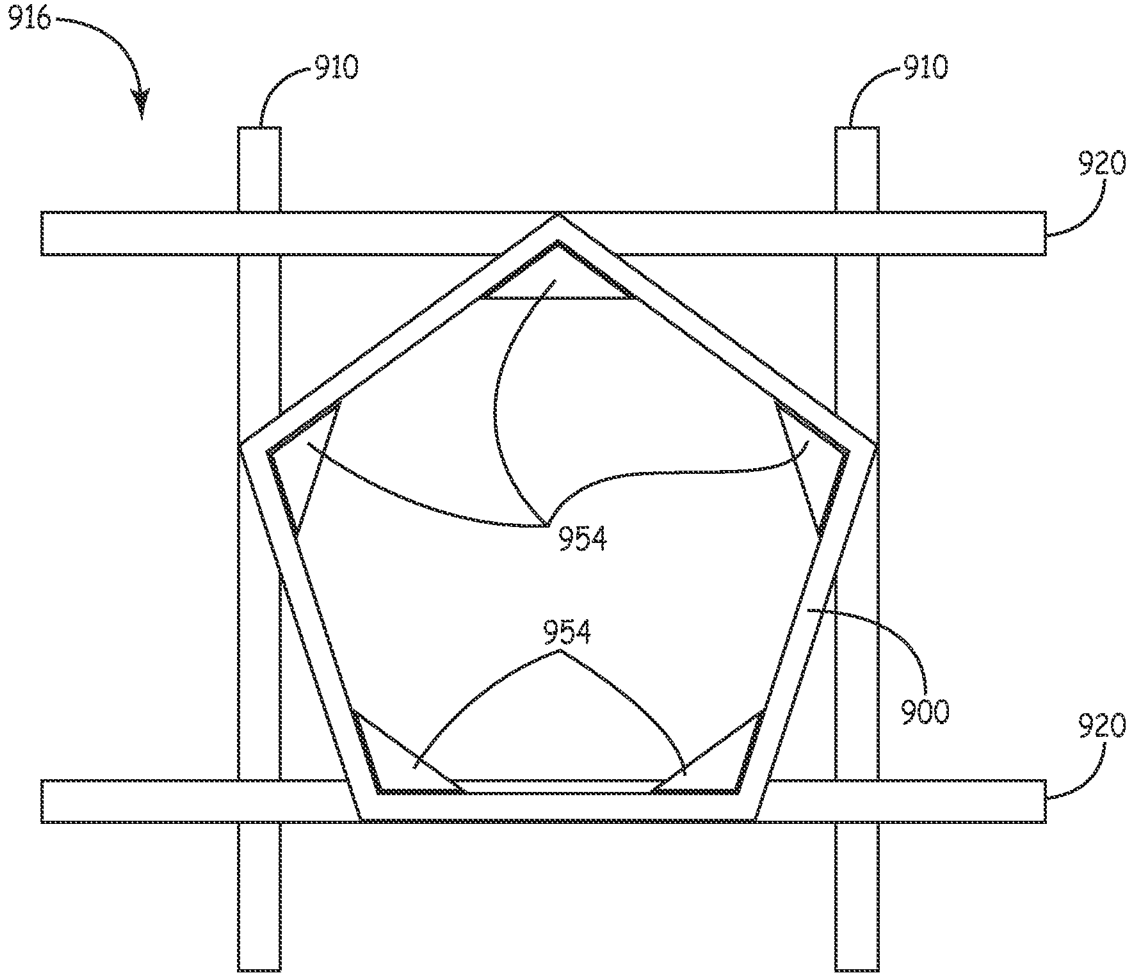
FIG. 55 is a schematic of a window spacer and applicator tooling configured to accommodate a window having a pentagonal shape.

FIG. 55 is a schematic of a window spacer frame surrounding applicator tooling configured to accommodate a window having a hexagonal shape. In this particular embodiment, the spacer applicator tooling 916 has six substantially similar spacer retention devices 954. Each spacer retention device 954 defines a corner structure for retaining a similar shape of a spacer 900 disposed thereon.

Example Triple Pane Window Assembly

Figure 56:
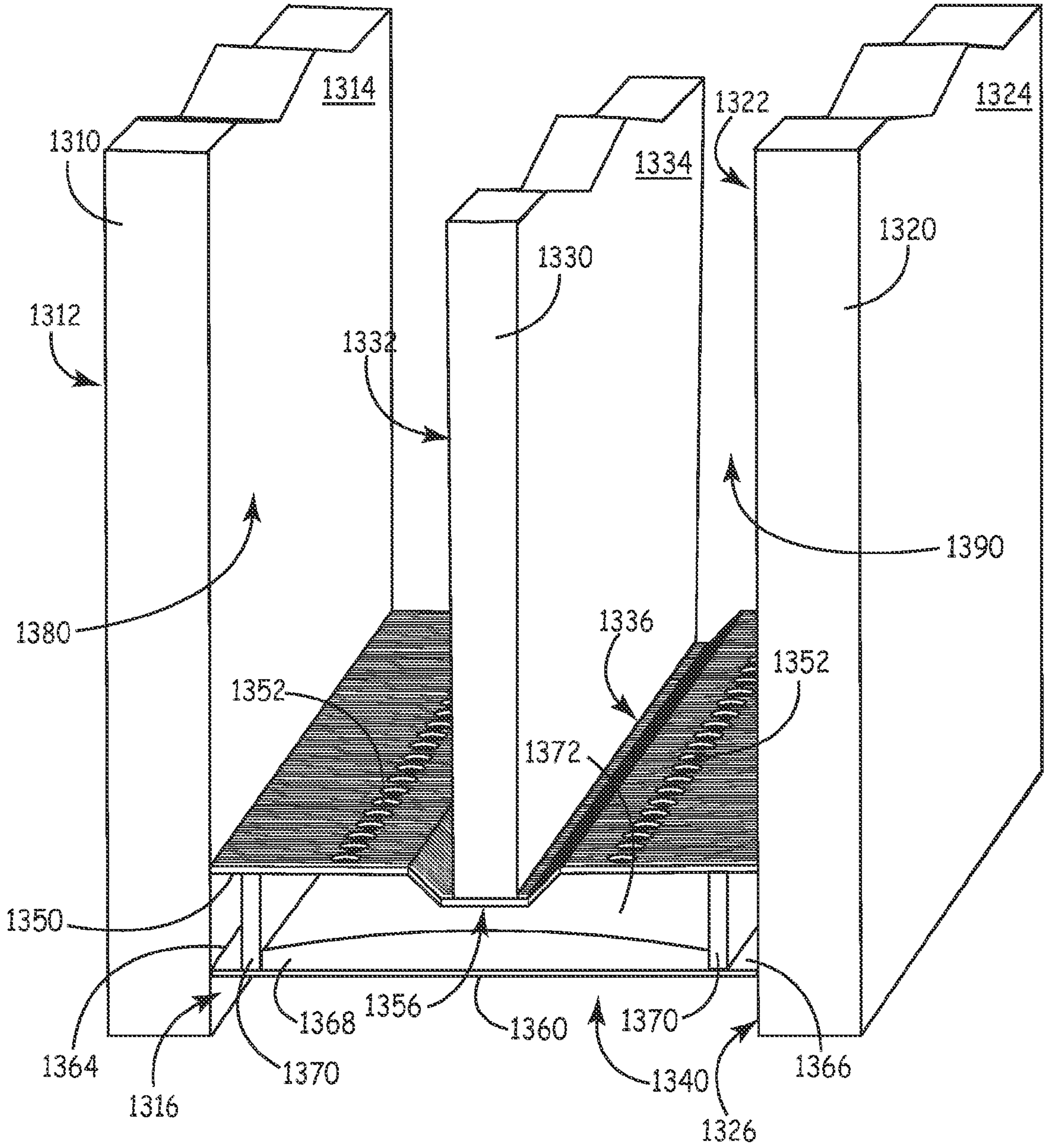
FIG. 56 depicts a partial perspective view of one implementation of a triple pane window assembly described herein.

FIG. 56 depicts a partial perspective view of one implementation of a triple pane window assembly described herein. A window assembly 1300 includes a first pane 1310, a second pane 1320, an intermediary pane or third pane 1330 and a spacer 1340 disposed between the first pane 1310 and the second pane 1320. The first pane 1310 defines a first pane surface 1312, a second pane surface 1314, and a perimeter 1316. The intermediary pane defines a third pane surface 1332, a fourth pane surface 1334, and a perimeter 1336. The second pane 1320 defines a fifth pane surface 1322, a sixth pane surface 1324, and a perimeter 1326. The intermediary pane 1330 is positioned substantially equidistant to the first pane 1310 and the second pane 1320, so the size of a first air space 1380 is equal to the size of the second air space 1390, although such configuration is not necessarily integral to the design of the window assembly 1300.

The spacer 1340 generally has a first elongate strip 1350, a second elongate strip 1360, and support legs 1370 that define an interior cavity 1372 configured to receive a filler material 1368. A first pocket 1364 is defined between a portion of the second surface 1314, the first elongate strip 1350, the second elongate strip 1360, and the support leg 1370. A second pocket 1366 is defined between a portion of the fifth surface 1322, the first elongate strip 1350, the second elongate strip 1360, and the support leg 1370.

Visible in FIG. 56, the first elongate strip 1350 defines a plurality of apertures 1352, which allow the first air space 1380 and the second air space 1390 to be in fluid communication.

The side of the first elongate strip 1350 corresponding to the second air space 1380 defines a similar number of apertures 1352 as the side of the elongate strip 1350 corresponding to the first air space 1380. FIG. 8 depicts a schematic top view of the component of FIGS. 6 and 7, such that the apertures 1352 are directly visible.

The second elongate strip 1360 is substantially planar. The first elongate strip 1350 has planar regions 1351 on each side of a registration structure 1356 having a base 1357 defined substantially central to the width of the spacer 1340. The base 1357 is offset below the planar regions by an offset distance $H_R$, which is approximately 0.060 inches in the current embodiment. The support legs 1370 are approximately 0.030 inches wide ($W_L$) in this embodiment, and the height $H_S$ of the spacer is approximately 0.200 inches tall. Channels 1362 defined by the support legs 1370 and the first and second elongate strips 1350, 1360 have a width $W_C$ of approximately 0.075 inches.

Additional embodiments of triple pane window assemblies and triple pane spacers are described in U.S. Provisional Application 61/424,545, filed on Dec. 17, 2010 and titled "TRIPLE PANE SPACER, WINDOW ASSEMBLY AND METHODS FOR MANUFACTURING SAME", which is hereby incorporated herein in its entirety.

Additional Embodiment of a Spacer Retention Device

Figure 57:
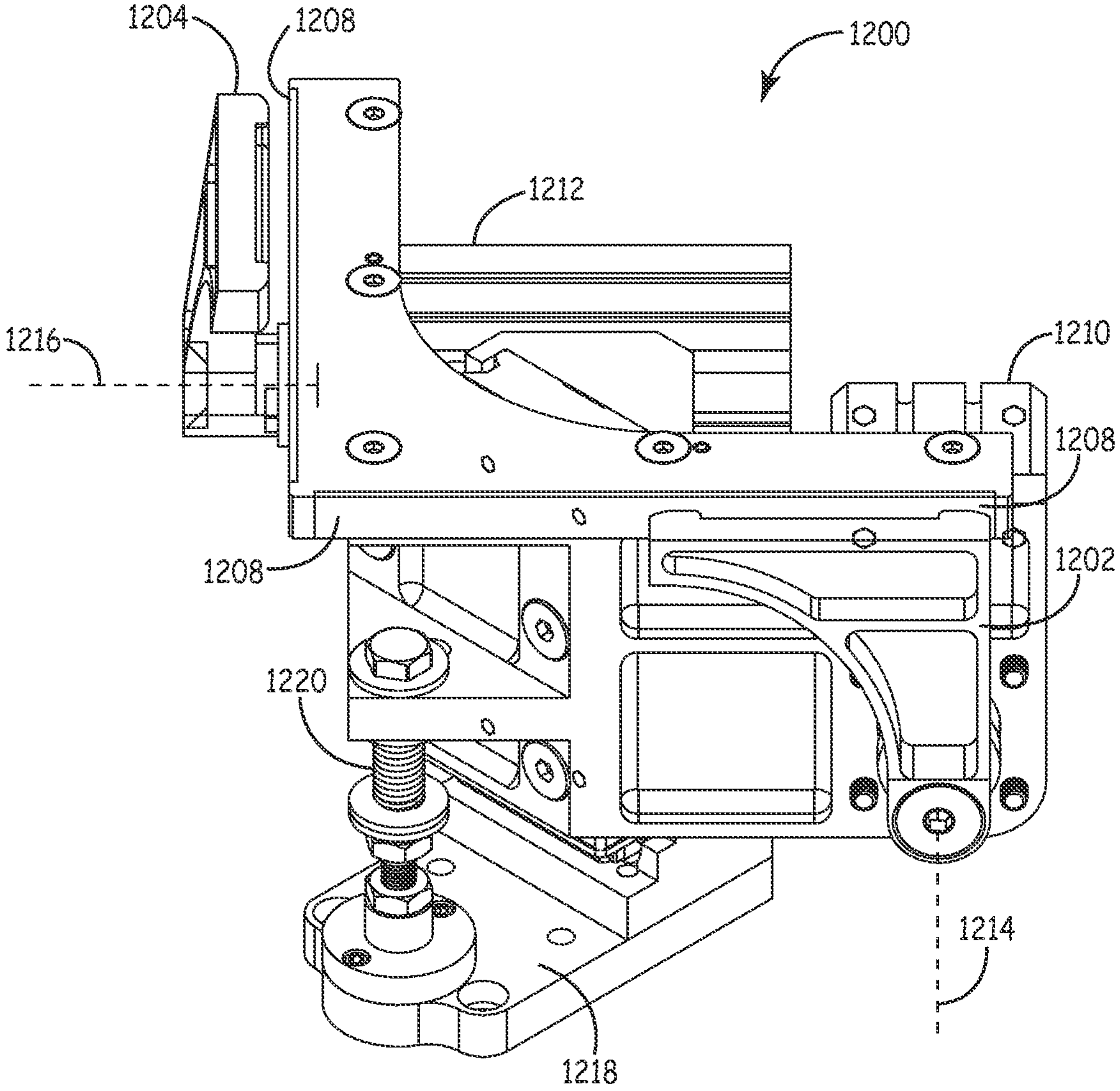
FIG. 57 depicts a perspective view of an additional embodiment of a spacer retention device.
Figure 58:
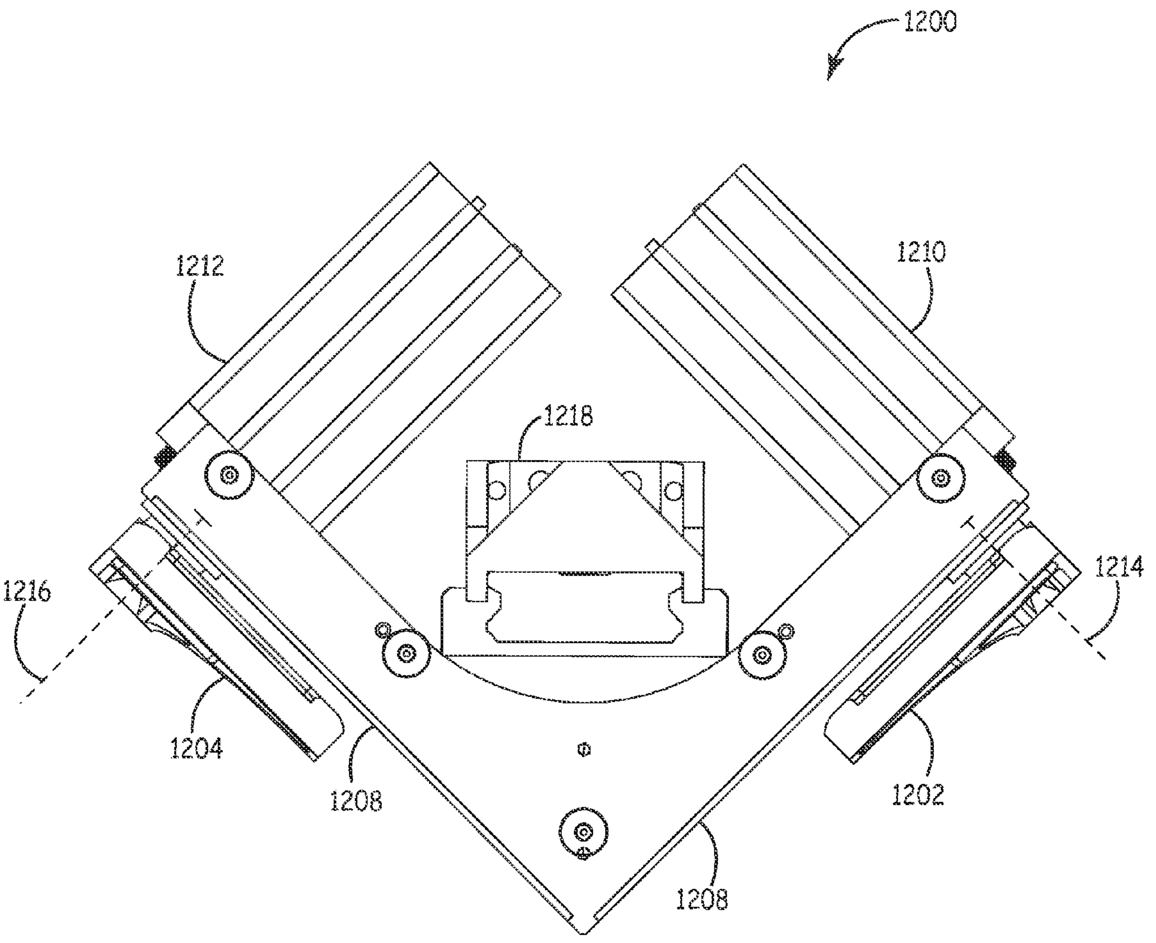
FIG. 58 depicts a top view of the spacer retention device of FIG. 57.

Referring now to FIGS. 57 and 58, yet another alternate spacer retention device 1200 is illustrated. The spacer retention device 1200 can be used as a part of the tooling of any of the spacer applicator systems described herein, or with other spacer applicator systems. The spacer retention device 1200 serves to hold spacer to the tooling as the tooling is rotated to form a spacer frame. Clamp 1202 and clamp 1204 serve to hold a spacer to an outer surface 1208 of the spacer retention device 1200.

In spacer retention device 1200, the outer surface 1208 forms a ninety degree angle. In other embodiments the outer surface of the spacer retention device forms other angles, depending on the desired corner angles of the spacer frame and window assembly.

Clamps 1202 and 1204 are controlled by actuators 1210 and 1212 respectively. The clamps 1202 and 1204 are capable of a first clamping position shown in FIGS. 57-58, where they are positioned to hold a spacer against an outer surface 1208. The clamps 1202, 1204 are moveable into a second position where they do not obstruct the outer surface 1208.

Actuators 1210 and 1212 are configured to cause the clamps 1202 and 1204 move between the first and second positions. In one embodiment, the actuators 1210, 1212 are configured to move clamps 1202, 1204 away from the outer surface 1208 along axis 1214 and axis 1216, respectively. Also, the actuators are configured to cause the clamp 1202 and clamp 1204 to rotate about axis 1214 and axis 1216 respectively, so that the outer surface 1208 is unobstructed by clamps 1202 and 1204. In one embodiment, the actuators 1210 and 1212 are pneumatic cylinders configured to provide the rotational and axial movement of the clamps between the two positions.

Spacer retention device 1200 includes a base 1218 that is configured to secure the spacer retention device to a tooling of a spacer applicator. In one embodiment, the base 1218 of is configured to secure the spacer retention device 1200 to guide rails of a spacer applicator. In one embodiment the base 1218 is secured to the second plurality of guide rails 562 shown in FIG. 34.

In one embodiment, spacer retention device 1218 includes a biasing assembly 1220 that allows for some movement of the spacer retention device 1200 along an axis of the biasing assembly. In one embodiment, biasing assembly bias the spacer retention device 1200 outwardly from the second plurality of guide rails. In one embodiment, the biasing assembly 1220 includes a spring. In another embodiment, biasing assembly 1220 includes a pneumatic cylinder. The biasing assembly allows for angular misalignment between the stand assembly 222 and the spacer applicator tooling 330 or between the spacer 100 and the first or second pane 12, 14. In one embodiment, as the spacer frame held by the plurality of spacer retention devices is brought into contact with a pane of glass, the biasing assembly is 1220 is compressed and provides a biasing force to the spacer retention device in the direction of the pane.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method of shaping a spacer length, comprising:

feeding a spacer to a tooling on a rotatable mount, wherein the rotatable mount is configured to continuously rotate about an axis in one direction, and wherein the tooling comprises a plurality of spacer retention devices;

actuating a portion of the tooling to translate the portion of the tooling;

moving apart at least some of the spacer retention devices to apply tension to a spacer frame;

rotating the mount, thereby wrapping the spacer around a portion of the tooling; and moving at least some of the spacer retention devices inwardly towards each other to disengage from the spacer when the spacer is being applied to a transparent pane.

2. The method of claim 1, wherein rotating the tooling comprises dynamically adjusting the position of the tooling by moving the tooling vertically during tooling rotation.

3. The method of claim 1, further comprising, prior to feeding the spacer to the tooling, obtaining the spacer from a spacer assembly system, the spacer defining first, second, third, and fourth lengths, the first length coupled to the second length and having a first notch therebetween, the second length coupled to the third length and having a second notch therebetween, and the third length coupled to the fourth length and having a third notch therebetween.

4. The method of claim 3, wherein feeding the spacer to the tooling includes feeding the first length of the spacer to the tooling.

5. The method of claim 4, wherein actuating the portion of the tooling and rotating the rotatable mount includes rotating the rotatable mount approximately a first ninety degrees and feeding the second length of the spacer to the tooling.

6. The method of claim 5, further comprising rotating the rotatable mount approximately a second ninety degrees and feeding the third length of the spacer to the tooling.

7. The method of claim 6, further comprising rotating the rotatable mount approximately a third ninety degrees and feeding the fourth length of spacer to the tooling.

8. The method of claim 7, further comprising joining the first and fourth lengths of the spacer to form a spacer frame.

9. The method of claim 8, further comprising:

translating the tooling towards the transparent pane in a direction approximately perpendicular to the transparent pane; and attaching the spacer frame to the transparent pane.

10. The method of claim 9, wherein the plurality of spacer retention devices comprise first, second, third, and fourth spacer retention devices configured to receive the first, second, third, and fourth lengths of the spacer, respectively, and configured to translate outwardly to apply a tension to the spacer frame.

11. The method of claim 10, further comprising translating at least one of the first, second, third, and fourth spacer retention devices inwardly to remove the tension from the spacer frame after attaching the spacer frame to the transparent pane.

12. The method of claim 9, wherein the axis is approximately parallel to a ground surface and approximately perpendicular to the transparent pane.

13. The method of claim 12, wherein the transparent pane is arranged against an assembly table at an angle offset from perpendicular to the axis.

14. The method of claim 3, further comprising translating the tooling in a direction approximately parallel to the transparent pane before rotating the rotatable mount.

15. The method of claim 14, wherein translating the tooling in the direction approximately parallel to the transparent pane is performed after obtaining the spacer and feeding the first length of the spacer to the tooling.

16. The method of claim 1, further comprising:

translating the tooling towards the transparent pane in a direction approximately perpendicular to the transparent pane; and attaching a spacer frame formed from the spacer length to the transparent pane.

17. The method of claim 16, wherein the plurality of spacer retention devices comprise first, second, third, and fourth spacer retention devices configured to receive the first, second, third, and fourth lengths of the spacer, respectively, and configured to translate outwardly to apply a tension to the spacer frame.

18. The method of claim 17, further comprising translating at least one of the first, second, third, and fourth spacer retention devices inwardly to remove the tension from the spacer frame after attaching the spacer frame to the transparent pane.

* * * * *